US005583575A

United States Patent [19]
Arita et al.

[11] Patent Number: 5,583,575
[45] Date of Patent: Dec. 10, 1996

[54] IMAGE REPRODUCTION APPARATUS PERFORMING INTERFIELD OR INTERFRAME INTERPOLATION

[75] Inventors: Eiji Arita; Hiroyuki Nakayama; Yoshiki Mizutani, all of Nagaokakyo; Masahiko Nakamura, Itami; Tomohiro Ushio, Itami; Shigehiro Tamaki, Itami; Toshiya Adachi, Nagaokakyo, all of Japan

[73] Assignee: Mitsubishi Denki Kabushiki Kaisha, Tokyo, Japan

[21] Appl. No.: 272,323

[22] Filed: Jul. 8, 1994

[30] Foreign Application Priority Data

Jul. 8, 1993 [JP] Japan .................................... 5-169053
Jul. 12, 1993 [JP] Japan .................................... 5-171402

[51] Int. Cl.[6] .................................................. H04N 7/01
[52] U.S. Cl. .......................... 348/451; 348/458; 348/441; 348/448
[58] Field of Search ...................... 348/441, 451, 348/452, 450, 449, 448, 458, 459, 427, 429, 431, 430, 445; H04N 7/01

[56] References Cited

U.S. PATENT DOCUMENTS

| | | | |
|---|---|---|---|
| 4,984,077 | 1/1991 | Uchida | 348/458 |
| 5,031,040 | 7/1991 | Maruyama | 348/458 |
| 5,070,395 | 12/1991 | Kitaura et al. | 348/458 |
| 5,128,750 | 7/1992 | Katagiri et al. | 348/458 |
| 5,132,793 | 7/1992 | Hirakata et al. | 348/449 |
| 5,247,353 | 9/1993 | Cho et al. | 348/431 |
| 5,262,857 | 11/1993 | Matsunaga | 348/441 |
| 5,294,983 | 3/1994 | Ersoz et al. | 348/427 |
| 5,327,125 | 7/1994 | Iwase et al. | 348/441 |
| 5,365,274 | 11/1994 | Seki et al. | 348/427 |
| 5,469,228 | 11/1995 | Kim et al. | 348/431 |
| 5,475,442 | 12/1995 | Matsushita et al. | 348/445 |

FOREIGN PATENT DOCUMENTS

| | | | |
|---|---|---|---|
| 61-264889 | 11/1986 | Japan | H04N 11/02 |
| 2-285897 | 11/1990 | Japan | H04N 7/01 |
| 3-6676 | 3/1991 | Japan | H04N 7/01 |

OTHER PUBLICATIONS

"Muse High Definition TV Transmission System" Yuichi Ninomiya, ed. Institute of Electronics, Information and Communication Engineers, Dec. 1, 1990 46–47.

"5–2–3 MUSE–NTSC Converter", Institute of Television Engineers of Japan Journal, 1991, vol. 45, No. 11, written by Yoshiki Mizutani.

Primary Examiner—Safet Metjahic

[57] ABSTRACT

An image reproduction apparatus which converts a sampling frequency from a first frequency to a second frequency, performs interfield interpolation at a third frequency, and converts the sampling frequency from the third frequency to the first frequency, wherein the interfield-interpolation is performed at the first frequency between signals one field apart from each other. The apparatus also converts a number of vertical scanning lines to convert a high definition TV signal of the MUSE format to a signal of NTSC format, sets a scanning period used in the vertical scanning line conversion, and generates a coefficient used in the vertical scanning line conversion.

22 Claims, 81 Drawing Sheets

FIG. 65
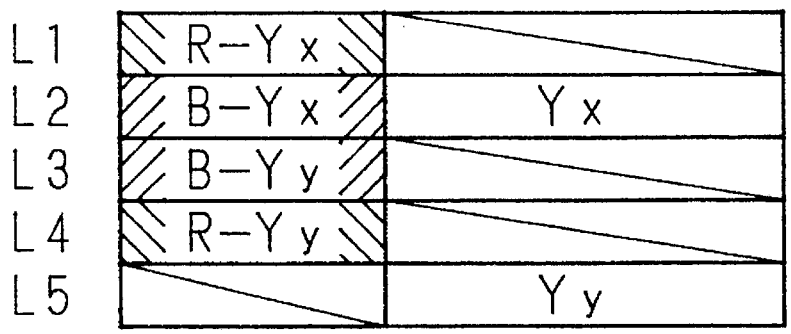
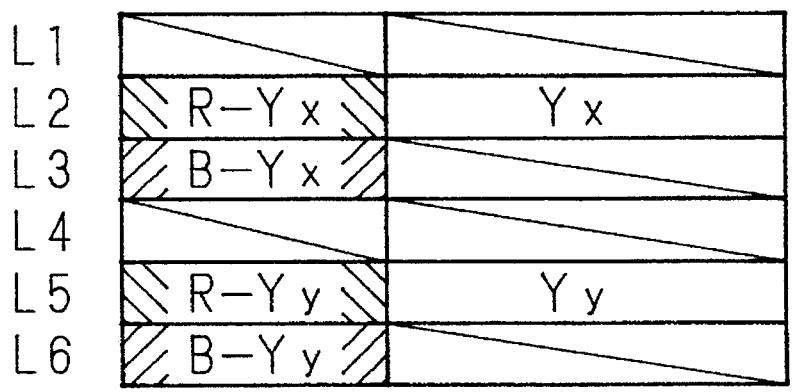
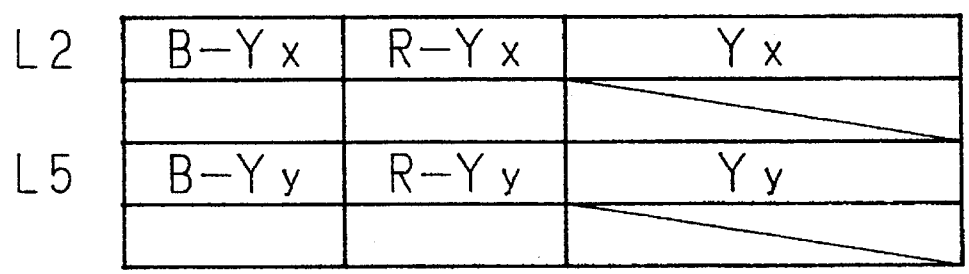

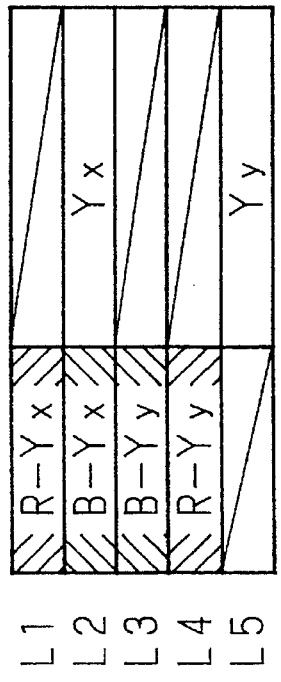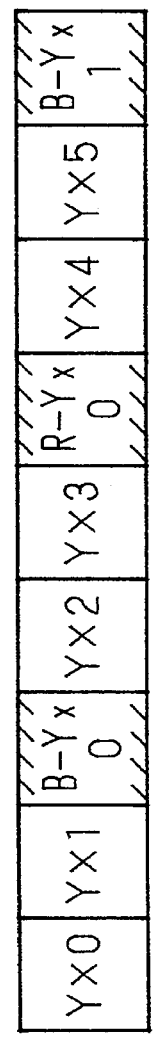
FIG. 67

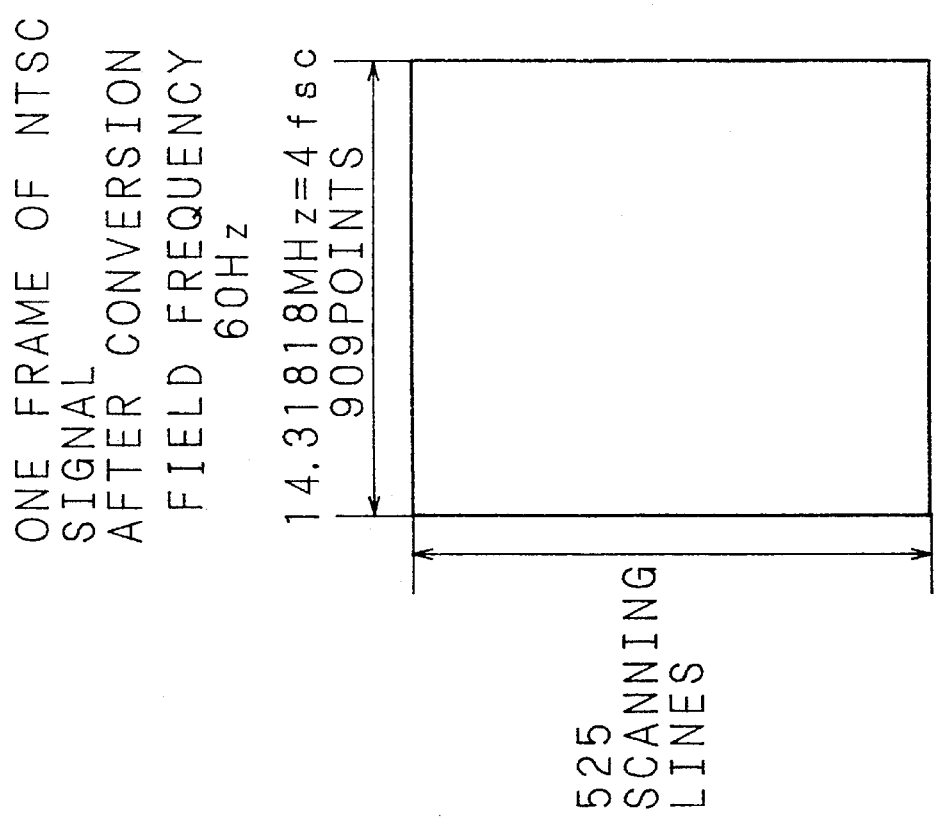
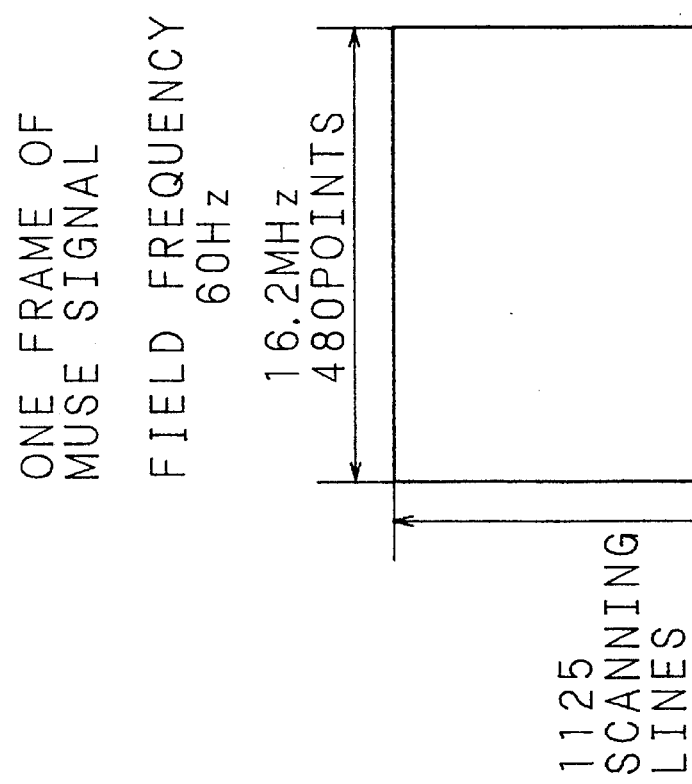
FIG. 69

IMAGE REPRODUCTION APPARATUS PERFORMING INTERFIELD OR INTERFRAME INTERPOLATION

BACKGROUND OF THE INVENTION

1. Field of the Invention

The present invention relates, for example, to an image reproduction apparatus which is a high definition TV receiver for reproducing a high definition TV signal transmitted in MUSE format.

2. Description of Related Art

FIG. 1 is a block diagram showing a configuration of a conventional high definition TV receiver (see "MUSE High Definition TV Transmission System", compiled by the Institute of Electronics, Information and Communication Engineers). In FIG. 1, reference numeral 1 designates an input processing section to de-emphasize a MUSE signal or detect a control signal. The input processing section 1 outputs the processed MUSE signal to a frame memory 2, an interframe interpolation circuit 3, a two-dimensional interpolation circuit 8 and a motion detection circuit 11. The frame memory 2 delays by one frame the video period of the MUSE signal processed by the input processing section 1, and outputs a delayed MUSE signal to the interframe interpolation circuit 3 and the motion detection circuit 11. The interframe interpolation circuit 3 interpolates the signals at the two ends of the frame memory 2 and outputs the signal thus processed to an LPF circuit 4. The LPF circuit 4 subjects the output of the interframe interpolation circuit 3 to 12-MHz low-pass filtering, and outputs the signal thus filtered to a sampling frequency conversion circuit 5. The frequency changer circuit 5 converts the output signal of 32.4-MHz in sampling frequency from the LPF circuit 4 into a 24.3-MHz sampling frequency, and outputs the signal thus converted to a field memory 6 and a 48.6-MHz interfield interpolation circuit 7. The field memory 6 delays the output of the sampling frequency conversion circuit 5 by one field and outputs the delayed signal to the 48.6-MHz interfield interpolation circuit 7. The 48.6-MHz interfield interpolation circuit 7 interpolates the signals at the two ends of the field memory 6 and outputs the resulting signal a mixer circuit 12.

The two-dimensional interpolation circuit 8 two-dimensionally interpolates the signal processed at the input processing section 1 in field dimension, and outputs the processed signal to a sampling frequency conversion circuit 9. The sampling frequency conversion circuit 9 converts the output signal of the two-dimensional interpolation circuit 8 having a sampling frequency of 32.4-MHz to a sampling frequency of 48.6-MHz, and outputs the signal thus converted to the mixer circuit 12. Also, numeral 10 designates a motion detection memory for delaying the video period of the MUSE signal by at least one frame. The motion detection circuit 11 detects a motion area from the outputs of the input processing section 1, the frame memory 2 and the memory 10, and outputs the resulting detection signal to the mixer circuit 12. The mixer circuit 12 mixes the output of the 48.6-MHz interfield interpolation circuit 7 with that of the sampling frequency conversion circuit 9 on the basis of the detection signal from the motion detection circuit 11.

Now, the operation will be explained. The MUSE signal inputted to the input processing section 1 is subjected to such input processings as de-emphasis and control signal detection. The MUSE signal thus subjected to these input processings undergoes separate processings for still and moving images and the resulting signals are mixed at the mixer circuit 12.

First, the still image processing is done in such a manner that the output of the input processing section 1 is delayed by one frame at the frame memory 2, and the signals at the ends of the frame memory 2 are temporally interpolated at the interframe interpolation circuit 3. The signal thus subjected to interframe interpolation has a sampling frequency of 32.4-MHz, but has an aliasing component of at least 12-MHz. In order to remove this aliasing component, the same signal is subjected to low-pass filtering of 12-MHz at the LPF circuit 4. The output of the LPF circuit 4 is converted to 24.3-MHz in sampling frequency at the sampling frequency conversion circuit 6. For conversion from 32.4 MHz to 24.3-MHz, the 32.4-MHz signal is zeroth-order interpolated to 97.2-MHz, and then subsampled at 24.3-MHz. The signal thus frequency-converted to 24.3-MHz is delayed at the field memory 6 by one field. The input and output signals of the field memory 6 are interpolated by the 48.6-MHz interfield interpolation circuit 7. The interfield interpolation requires two-dimensional filtering in view of the reproduction range of the MUSE signal.

In the moving image processing, on the other hand, the signal subjected to input processings at the input processing section 1 is two-dimensionally interpolated at the two-dimensional interpolation circuit 8. The output of the two-dimensional interpolation circuit 8 has a sampling frequency of 32.4-MHz. In order to match this frequency with the final sampling frequency for the still image processing, the output signal of the circuit 8 is converted to 48.6-MHz at the sampling frequency conversion circuit 9. For conversion from 32.4-MHz to 48.6-MHz, in the same way as the processing at the sampling frequency conversion circuit 5, the 32.4-MHz signal is zeroth-order interpolated to 97.2-MHz and subsampled at 48.6-MHz.

The motion detection circuit 11 for mixing the still and moving image processings detects a motion area from the outputs of the input processing section 1, the frame memory 2 and the memory 10 capable of delaying at least one frame. Normally, a motion area is detected by using a one-interframe difference signal subjected to 4-MHz low-pass filtering, a two-interframe difference signal and the same two-interframe difference signal delayed by one frame. Also, a motion vector signal is detected from the control signal multiplexed on the MUSE signal at the input processing section 1, and a dedicated memory is used for horizontal and vertical motion vectors at the motion detection circuit 11, the interframe interpolation circuit 3 and the 48.6-MHz interfield interpolation circuit 7.

On the basis of the motion area information detected by the motion detection circuit 11, the output of the 48.6-MHz interfield interpolation circuit 7 that has undergone the still image processing and the output of the sampling frequency conversion circuit 9 that has undergone the moving image processing are mixed with each other at the mixer circuit 12.

Since the conventional high definition TV receiver (image reproduction apparatus) is configured as described above, the 48.6-MHz interfield interpolation is effected for still image processing. This requires a 12-MHz LPF circuit, a sampling frequency conversion circuit and a 48.6-MHz interfield interpolation circuit, resulting in a bulky circuit. Also, a dedicated frame memory is required for motion vectors.

FIG. 2 is a block diagram showing a conventional image reproduction apparatus for down-converting the MUSE signal to the NTSC signal. (See The Institute of Television Engineers of Japan journal, 1991, Vol. 45, No. 11, "5-2-3" "MUSE-NTSC Down-Converter", written by Yoshiki Mizutani and compiled by The Institute of Television Engineers of Japan.) In FIG. 2, numeral 101 designates an input signal processing circuit for subjecting the MUSE signal to input processing. The input signal processing circuit 101 outputs the MUSE signal thus input processed to a time-axis conversion processing circuit 102 for converting the time axis from MUSE system to NTSC system. The time-axis conversion processing circuit 102 outputs the signal thus converted to a signal separation circuit 103 for separating it to be the luminance signal and the color difference signal from each other. The signal separation circuit 103 outputs the luminance signal (Y signal) to a Y scanning line conversion circuit 104 for converting 1125 scanning lines to 525 scanning lines. The color difference signal is outputted to a time expansion circuit 105 for expanding the time axis by four times. The time expansion circuit 105 outputs the expanded color difference (C) signal to a color-difference vertical filter 106 for matching the expanded color difference signal with the converted Y scanning lines. The output signal of the Y scanning line conversion circuit 104 and the output signal of the vertical filter 106 are outputted to a vertical compression circuit 107 for further compressing the number of the converted scanning lines to 2/3. The output signals of the vertical compression circuit 107, the Y scanning line conversion circuit 104 and the color-difference vertical filter 106 are outputted to an input terminal of a 2-1 selector 108 for selecting one of two signals. The output side terminal of the 2-1 selector 108 is connected to an image processing circuit 109 for processing the converted signal in various ways. The image processing circuit 109 outputs an image-processed digital signal to a D/A converter 110 for converting the digital signal into an analog signal. The luminance signal and the color difference signal are outputted from the D/A converter 110 to a predetermined device.

This conventional system further comprises a 16.2-MHz oscillator 112 as a MUSE system clock, a 14.742-MHz oscillator 113 which is a system clock having a conversion mode capable of maintaining the roundness with a 16:9 monitor (hereinafter referred to as the full mode) and another conversion mode capable of maintaining the roundness by substantially total horizontal conversion with a 4:3 monitor (hereinafter referred to as the wide mode), and a 10.08-MHz oscillator 114 which is a system clock having still another conversion mode capable of maintaining the roundness with a 4:3 monitor by discarding the horizontal conversion(hereinafter referred to as the zoom mode). The output signal of the 16.2-MHz oscillator 112 is outputted to an input signal processing circuit 101 and a time-axis conversion processing circuit 102. The 14.742-MHz oscillator 113 and the 10.08-MHz oscillator 114 are connected to the input side terminal of a 2-1 selector $S_{18}$. The output side terminal of the 2-1 selector $S_{18}$ is in turn connected to the time-axis conversion processing circuit 102, the signal separation circuit 103, the Y scanning line conversion circuit 104, the time expansion circuit 105, the color-difference vertical filter 106, the vertical compression circuit 107 and the D/A converter circuit 110.

FIG. 3 is a block diagram showing the time-axis conversion processing circuit 102 of FIG. 2. The time-axis conversion processing circuit 102 includes a line decision circuit 116 for outputting a decision signal on an odd- or even-numbered line by detecting lines from the MUSE signal, and time-axis conversion memories 117a, 117b for time-axis conversion from MUSE to NTSC signal. The time-axis conversion memory 117a is supplied with the output signal of the input signal processing circuit 101, an odd-numbered line signal from the line decision circuit 116, the output signal of the 16.2-MHz oscillator 112, and the output signal from the 14.742-MHz oscillator 113 or the 10.08-MHz oscillator 114. The time-axis conversion memory 117a produces Y&R-Y in order an odd-numbered line. The time-axis conversion memory 117b is supplied with the output signal of the input signal processing circuit 101, an even-numbered line signal from the line decision circuit 116, the output signal from the 16.2-MHz oscillator 112, and the output signal of the 14.742-MHz oscillator 113 or the 10.08-MHz oscillator 114. The time-axis conversion memory 117b outputs Y&B-Y in an even-numbered line.

FIG. 4 is a block diagram showing a specific example of the Y scanning line conversion circuit 104 shown in FIG. 2. The Y scanning line conversion circuit 104 includes fixed coefficient multipliers 118a, 118b for multiplying the fixed coefficient of the vertical filter for scanning line conversion and an adder 119.

FIG. 5 is a block diagram showing a specific example of the vertical compression circuit 107 of FIG. 2. The vertical compression circuit 107 includes two line memories 120 for delaying the input signal by one line, five fixed coefficient multipliers 118, adders 119a, 119b, a 2-1 selector $S_{19}$, and a vertical compression memory 121. The adder 119a is supplied with a signal from a fixed coefficient multiplier 118, another signal through a line memory 120 and a fixed coefficient multiplier 118, and still another signal through two line memories 120 and a fixed coefficient multiplier 118. These signals are added by the adder 119a. The adder 119b is supplied with a signal through a fixed coefficient, multiplier 118 and another signal through a line memory 120 and a fixed coefficient multiplier 118, and these signals are added by the adder 119b. The adders 119a, 119b are connected to the input, side terminal of the 2-1 selector $S_{19}$. The vertical compression memory 121 is connected to the output side terminal of the 2-1 selector $S_{19}$.

Now, the operation will be explained. The inputted MUSE signal undergoes such processings as de-emphasis, control signal detection and PLL at the input signal processing circuit 101. The signal thus subjected to input processings is processed along time axis at the time-axis conversion processing circuit 102 shown in FIG. 3. More specifically, the signal thus subjected to input processings is divided into odd- and even-numbered lines and separately inputted to the time-axis conversion memories 117a, 117b. In full or wide mode, for example, the 2-1 selector 108 selects the 14.742-MHz oscillator 113 for converting the system clock to 14.742-MHz. In zoom mode, on the other hand, the 10.08-MHz oscillator 114 is selected to convert the system clock to 10.08-MHz. The signal converted along time axis is separated into the luminance signal and the color difference signal at the signal separation circuit 103. The luminance signal is inputted to the Y scanning line conversion circuit 104, and the color difference signal to the time expansion circuit 105.

With regard to the luminance signal, the Y scanning line conversion circuit 104 converts the number of MUSE effective scanning lines from 1032 to 516. In other words, one scanning line is produced from each two MUSE scanning lines. As shown in FIG. 4, in the Y scanning line conversion circuit 104, the odd- and even-numbered line signals separated by the signal separation circuit 103 and containing only the luminance signal component are inputted to the fixed coefficient multiplier circuits 118a, 118b respectively and multiplied by a predetermined fixed coefficient and added at the adder 119. FIG. 6 is a diagram showing the Y scanning conversion as a model at sampling points. As shown in FIG. 6, one scanning line is produced from each two scanning lines. In the case of FIGS. 4 and 5, the fixed coefficient is ½. Although the simplest example was explained above, the vertical filter (Y scanning line conversion circuit 104) for producing 516 scanning lines from 1032 scanning lines may double as a two-dimensional interpolation circuit in some cases in view of the fact that conversion with many scanning lines permits conversion with a minimal aliasing distortion.

The color difference signal is transmitted with the MUSE signal compressed along time axis to ¼ at the signal separation circuit 103 and therefore is time expanded by four times at the time expansion circuit 105. In case of the block diagram under consideration, two time expansion circuits are required for processing the odd-numbered line color difference signal and the even-numbered line color difference signal separately from each other. The color difference signal thus expanded along time axis is filtered for matching the vertical position with the scanning line of the luminance signal through a color difference signal vertical filter. The color difference signals are transmitted at intervals of 516 scanning lines. Therefore, the scanning lines are not, changed, but each color difference signal is filtered separately to assure vertical phase coincidence between the luminance signal and the color difference signal. The luminance signal converted in scanning lines or the color difference signal whose the vertical phase coinciding with the luminance signal is selected at the 2-1 selector 108, and through the image processing circuit 109, given to the D/A converter 110 in full or zoom mode.

In wide mode, the effective vertical scanning lines are converted to ⅔ by the vertical compression circuit 107. FIG. 7 is for explaining the vertical compression at the vertical compression circuit 107 with reference to a model at sampling points. As shown in FIG. 5, after delaying operation at a line memory 120, a three-line adder 119a and a two-line adder 119b are switched by the 2-1 selector $S_{19}$ thereby to produce two scanning lines from three scanning lines. Every signal passing through each line is multiplied by a fixed coefficient at the fixed coefficient multiplier 118. The fixed coefficient of the fixed coefficient multiplier 118 shown in FIG. 5 is the same ½ for the lower two units using two lines, while the corresponding figures for the upper three units using three lines are differentiated at ¼, ½ and ¼ respectively. The effective scanning lines cannot be reduced to ⅔ simultaneously but the vertical conversion to ⅔ can be effected by sequential output of the calculation results after being temporarily stored in the vertical compression memory 121. In the configuration shown in FIG. 2, the circuit of FIG. 5 is required for each of the luminance signal and the color difference signal.

The signals thus converted in full, zoom or wide mode are converted into an analog signal at the D/A converter 110 after undergoing image processing such as contour correction at the image processing circuit 109.

The conventional image reproduction apparatus for down-converting the MUSE signal to the NTSC signal as shown in FIG. 2 is configured as described above. In full and zoom modes, the number of the elective scanning lines of the MUSE signal is converted from 1032 to 516. The monitor for receiving the signal having been converted to the NTSC signal is capable of displaying only 483 lines which is the number of effective scanning lines smaller than 516. As a result, the top and bottom formation on the screen disappear. In wide mode, therefore, another scanning line conversion circuit is required. Further, a scanning line conversion circuit and a vertical filter are required for the luminance signal and the color difference signal respectively, thereby leading to the problem of an increased circuit size.

Also, three memories are required for time-axis conversion and vertical compression. The requirement of two system clock oscillators in full, wide and zoom mode poses the problems not only of a higher cost due to an increased circuit size but also of the adverse effect that high harmonics with a plurality of system clock frequencies and a beat signal have on the TV tuner circuit, etc.

SUMMARY OF THE INVENTION

The present invention has been devised in order to obviate the above-mentioned problems, and an object thereof is to provide an image reproduction apparatus for performing processes including sampling frequency conversion from a first frequency (32.4-MHz) to a second frequency (24.3-MHz), interfield interpolation at a third frequency (48.6-MHz) and sampling frequency conversion from the third frequency (48.6 MHz) to the first frequency (32.4-MHz), using linear interpolation or zeroth-order holding means, with the result that the interfield interpolation is made possible at the first frequency (32.4-MHz). Also, the motion vector requirement is met by the use of a first-in first-out memory and a line memory of at least six lines.

The above and further objects and features of the invention will more fully be apparent from the following detailed description with accompanying drawings.

BRIEF DESCRIPTION OF THE DRAWINGS

FIG. 65 is a timing chart for the embodiment 34.

FIG. 67 is a timing chart for the 35th embodiment.

FIG. 69 is a diagram for explaining the comparison between one frame of the MUSE signal and one frame of the NTSC signal after conversion according to the embodiment 36.

DESCRIPTION OF THE PREFERRED EMBODIMENTS

Embodiments of the invention will be described below in detail with reference to the accompanying drawings.

Figure 1:
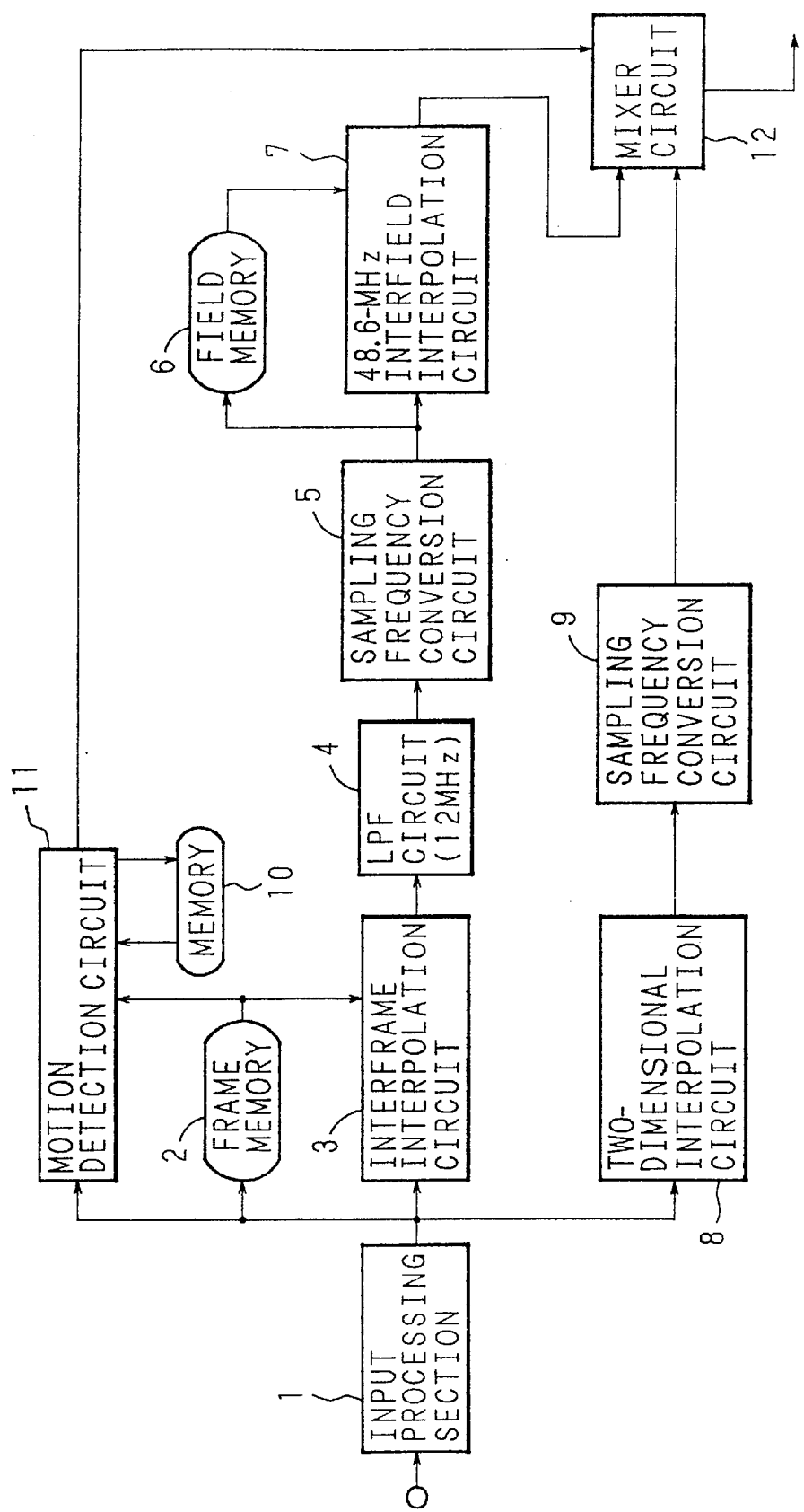
FIG. 1 is a block diagram showing a configuration of a conventional high definition TV receiver.
Figure 2:
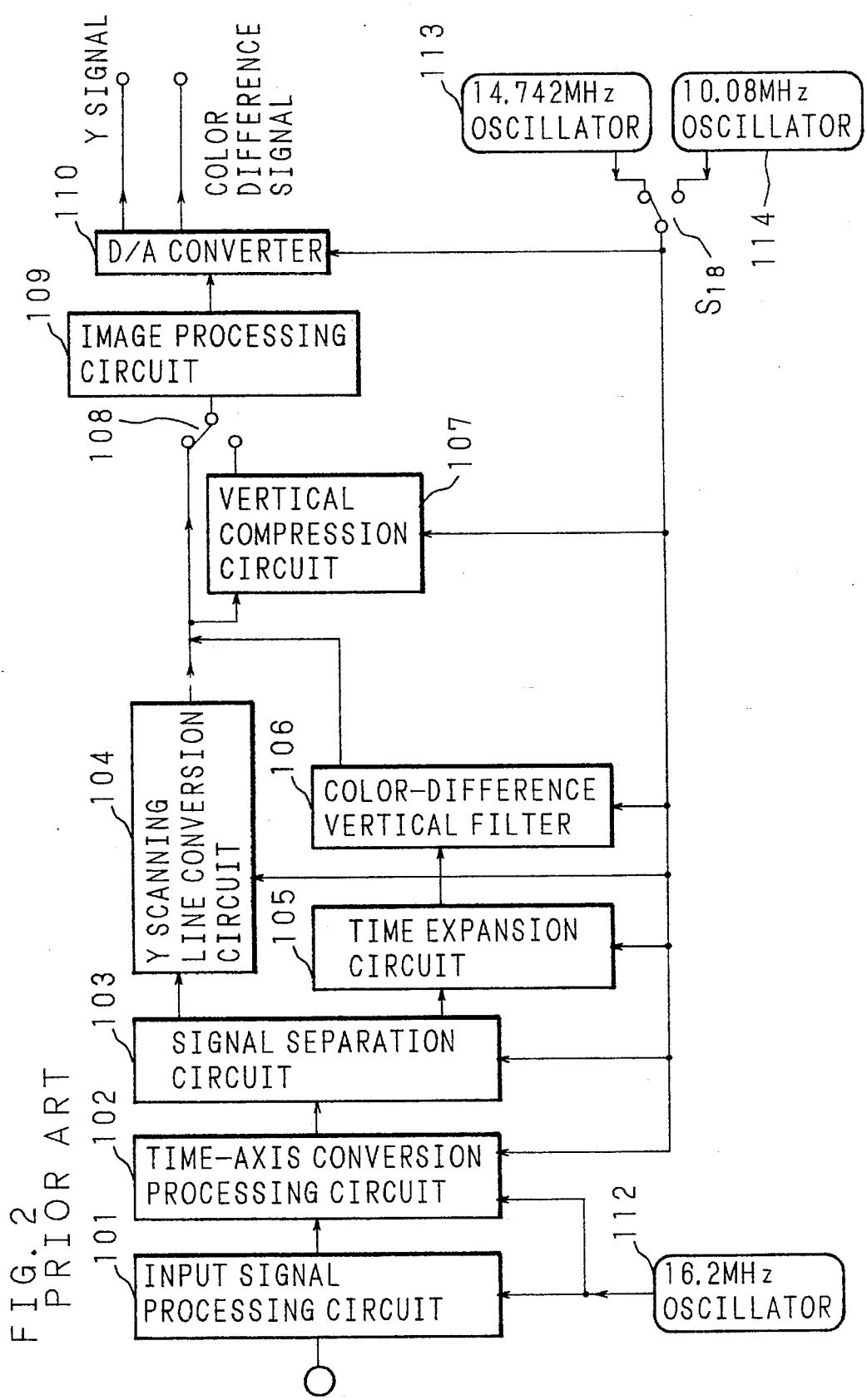
FIG. 2 is a block diagram showing a configuration of a conventional M-N converter.
Figure 3:
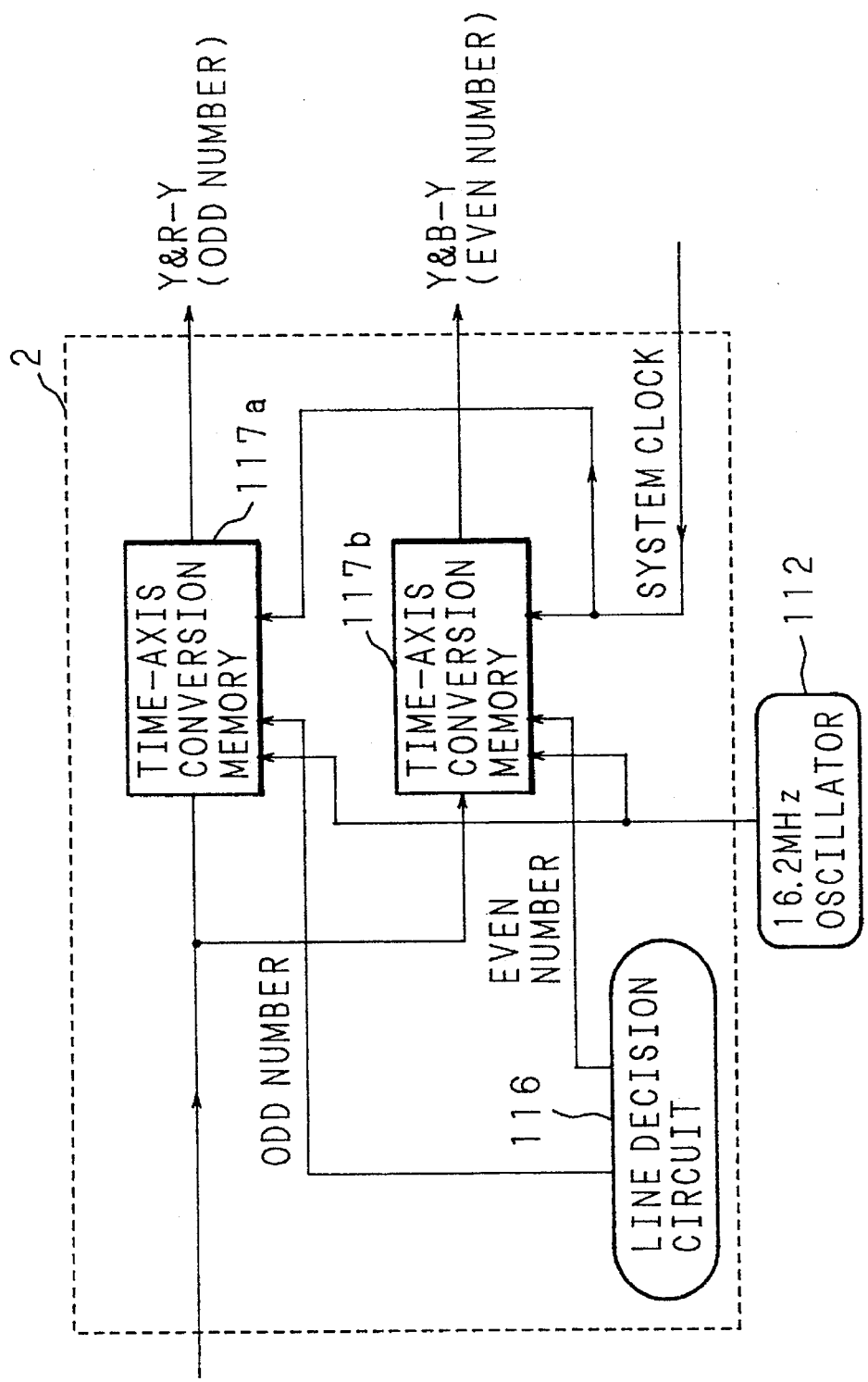
FIG. 3 is a block diagram showing a configuration of a time-axis conversion circuit shown in FIG. 2.
Figure 4:
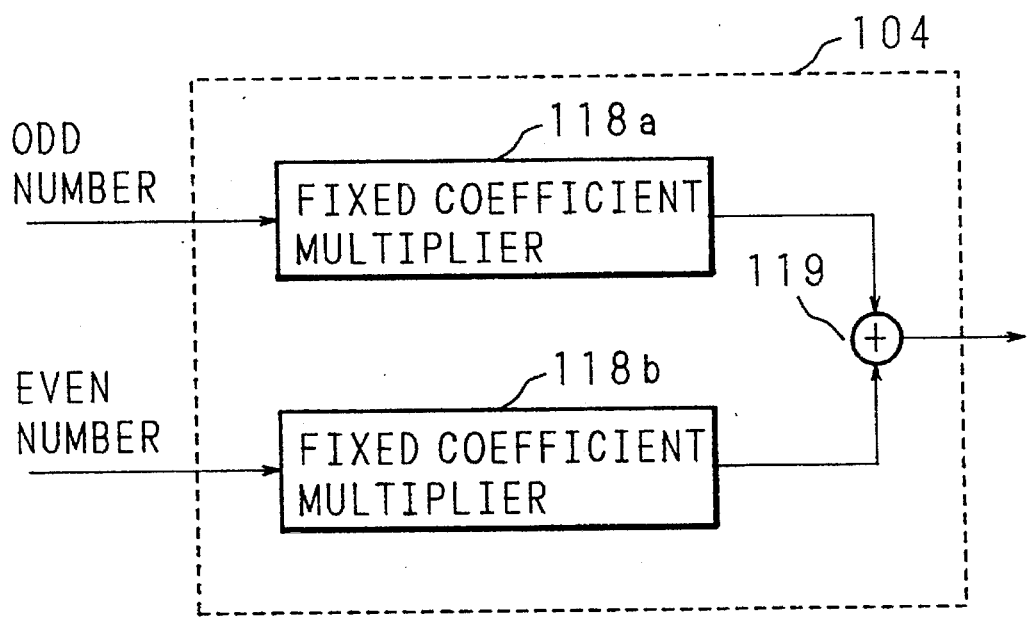
FIG. 4 is a block diagram showing a configuration of a Y scanning line conversion circuit shown in FIG. 2.
Figure 5:
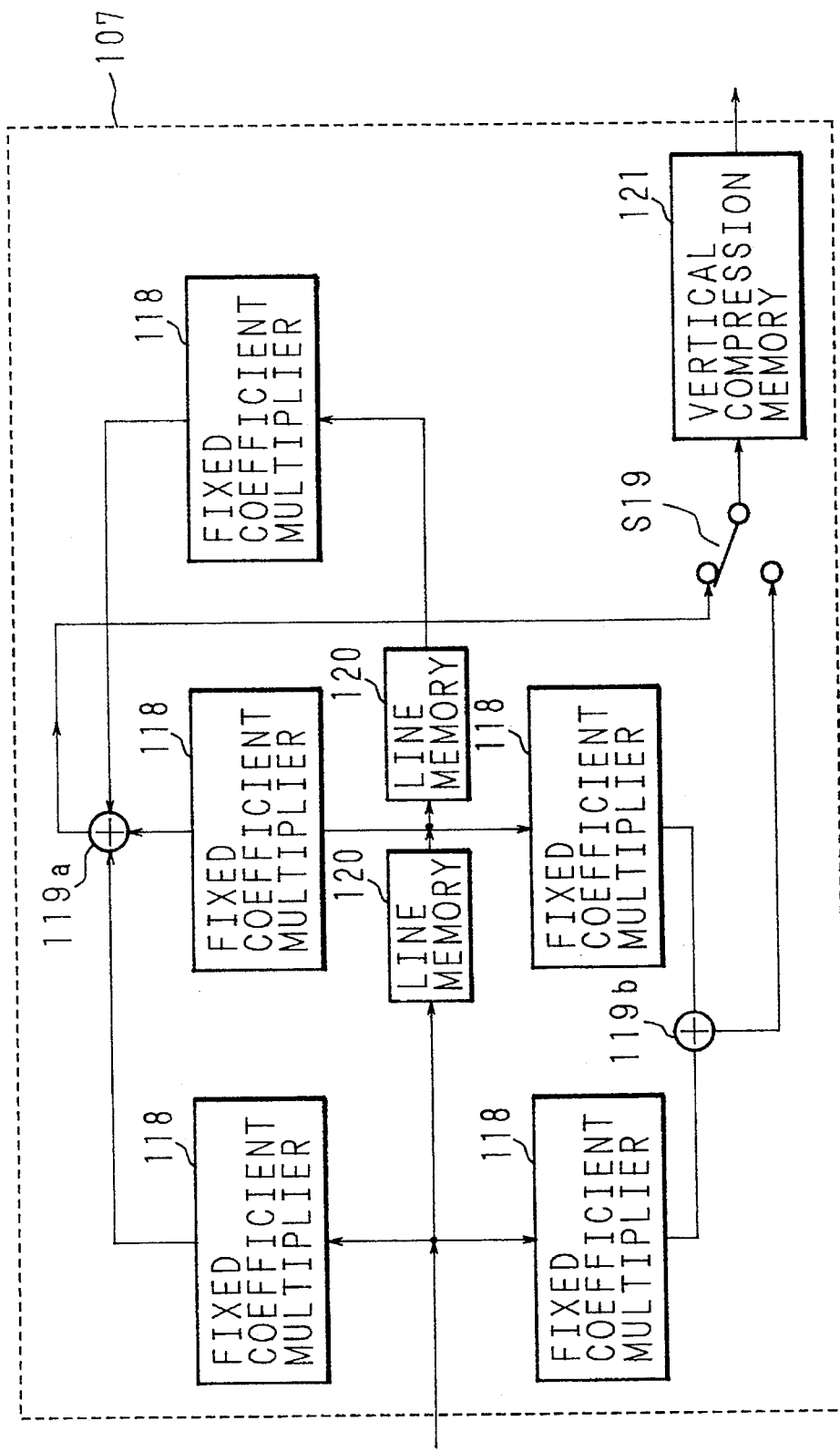
FIG. 5 is a block diagram showing a wide-mode configuration of a vertical compression circuit shown in FIG. 2.
Figure 6:
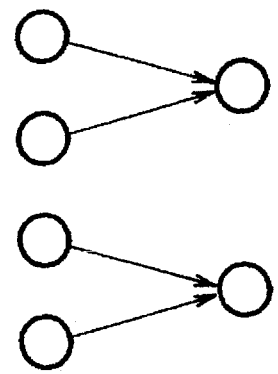
FIG. 6 is a diagram showing a model of sampling points in the Y scanning line conversion circuit shown in FIG. 4.
Figure 7:
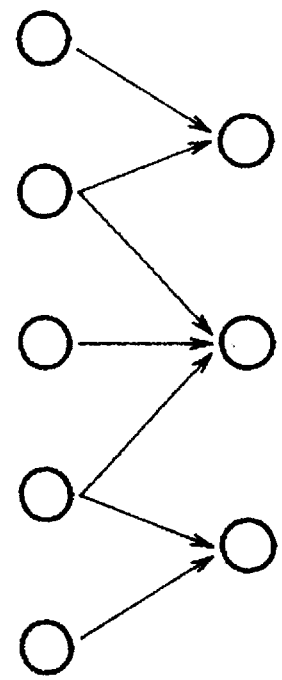
FIG. 7 is a model diagram showing sampling points in the vertical compression circuit shown in FIG. 5.
Figure 8:
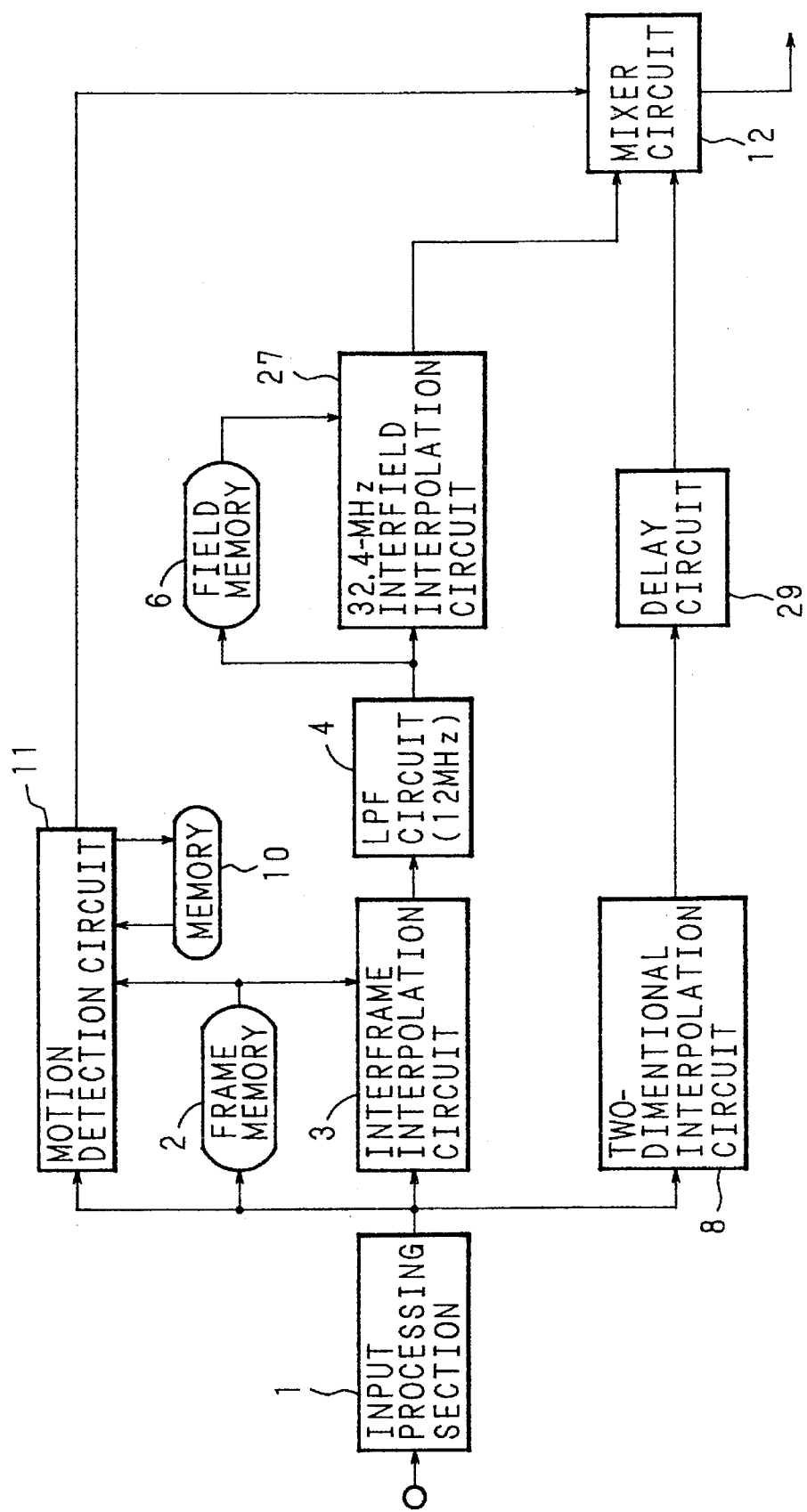
FIG. 8 is a block diagram showing a configuration of a high definition TV receiver according to an embodiment, 1 of the invention.

Embodiment 1:

FIG. 8 is a block diagram showing a configuration of an image reproduction apparatus according to the invention. The shown case is a high definition TV receiver. In FIG. 8, numeral 1 designates an input processing section for performing such processings as de-emphasis of the MUSE signal or control signal detection. The input processing section 1 outputs the MUSE signal thus processed to a frame memory 2, an interframe interpolation circuit 3, a two-dimensional interpolation circuit 8 and a motion detection circuit 11. The frame memory 2 delays the video period of the MUSE signal processed in the input processing section 1 by one frame, and outputs the MUSE signal thus delayed to the interframe interpolation circuit 3 and the motion detection circuit 11. The interframe interpolation circuit 3 interpolates the signals at the two ends of the frame memory 2, and outputs tile processed signal to an LPF circuit 4. The LPF circuit 4 subjects the output of the interframe interpolates circuit 3 to a 12-MHz low-pass filtering. The signal thus filtered is outputted to a field memory 6 and a 32.4-MHz interfield interpolation circuit 27. The field memory 6 delays the output of the LPF circuit 4 by one field and outputs it to the 32.4-MHz field interpolation circuit 27. The 32.4-MHz interfield interpolation circuit 27 interpolates the signals at the two ends of the field memory 6, and outputs the resulting signal to a mixer circuit 12.

The two-dimensional interpolation circuit two-dimensionally interpolates the signal from the input processing section 1 in the field dimension, and outputs the processed signal to a delay circuit 29. The delay circuit 29 delays the output of the two-dimensional interpolation circuit 8 by the amount of delay in the 32.4-MHz interfield interpolation circuit 27, and outputs the delayed signal to the mixer circuit 12. Numeral 10 designates a motion detection memory for delaying the video period of the MUSE signal by at least one frame. The motion detection circuit 11 detects a motion area from the outputs of the input processing section 1, the frame memory 2 and the memory 10, and outputs the signal thus detected to the mixer circuit 12. The mixer circuit 12 mixes the still image processing signal output of the 32.4-MHz interfield interpolation circuit 27 with the moving image processing signal output of the delay circuit 29 in accordance with the detection signal from the motion detection circuit 11.

Figure 9:
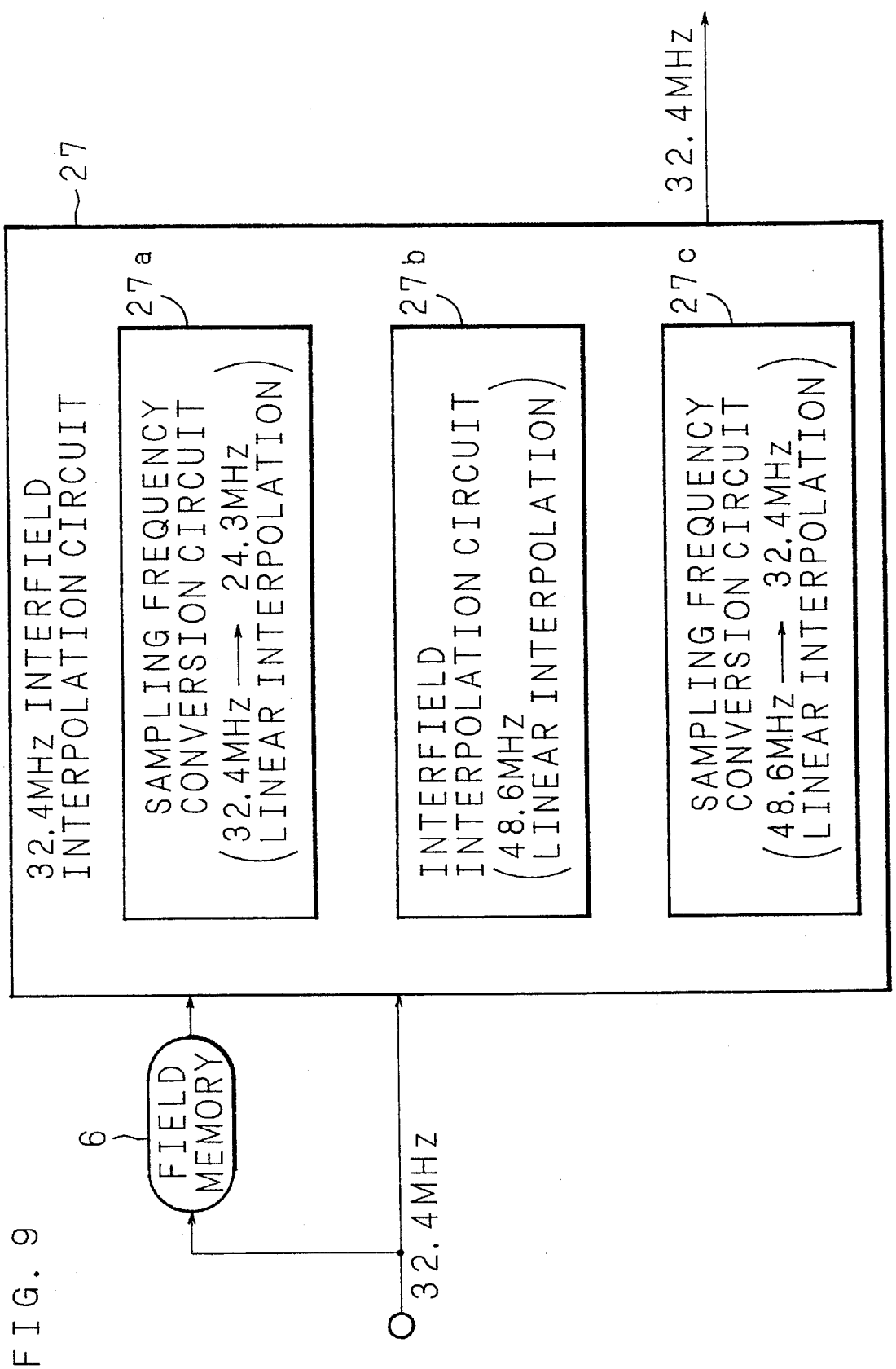
FIG. 9 is a block diagram showing a configuration of a 32.4-MHz interfield interpolation circuit according to the embodiment 1.

FIG. 9 is a block diagram schematically showing the 32.4-MHz interfield interpolation circuit 27. The 32.4-MHz interfield interpolation circuit 27 includes a sampling frequency conversion circuit 27a for performing the sampling frequency conversion from 32.4-MHz to 24.3-MHz by linear interpolation approximation, an interfield interpolation circuit 27b for performing interfield interpolation at 48.6 MHz by linear interpolation approximation, and a sampling frequency conversion circuit 27c for performing the sampling frequency conversion from 48.6-MHz to 32.4-MHz by linear interpolation approximation.

Figure 10:
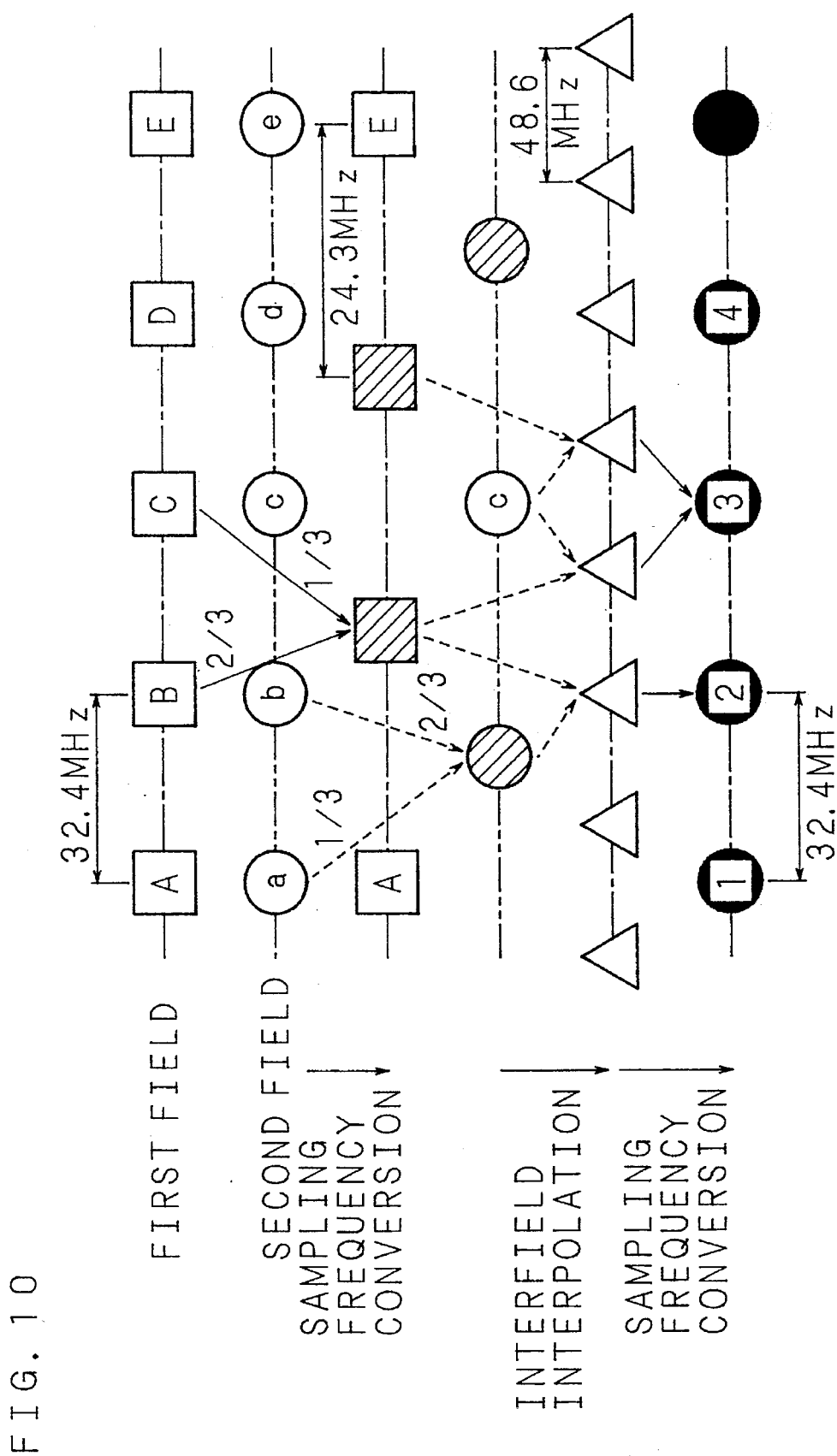
FIG. 10 is a diagram showing a sampling model according to the embodiment 1.

FIG. 10 is a diagram for explaining a model of sampling points in the process of arithmetic operation at the 32.4-MHz interfield interpolation circuit 27 described above. In the diagram, alphabetical characters in squares denote sampling points of a first field, and those in circles sampling points of a second field. The hatched squares and circles represent the result of linear interpolation of the sampling frequency conversion. The triangular points represent the result, of linear interpolation of the 48.6-MHz sampling frequency conversion. The black circle designates the final output of the 32.4-MHz interfield interpolation circuit 27.

Now, the operation will be explained. The MUSE signal inputted to the input processing section 1 is subjected to such input processings as de-emphasis and control signal detection. The MUSE signal thus subjected to input processings is processed separately for moving and still images, and the resulting signals are mixed at the mixer circuit 12.

First, the still image processing is performed in such a manner that the output of the input processing section 1 is delayed by one frame at the frame memory 2, and the signals at the two ends of the frame memory 2 are temporally interpolated by the interframe interpolation circuit 3. The signal thus interframe-interpolated, which has a sampling frequency of 32.4-MHz, contains an aliasing component of 12 MHz or more. In order to remove this aliasing component, the signal is subjected to low-pass filtering at 12-MHz by the LPF circuit 4. The output of the LPF circuit 4 undergoes a sampling frequency conversion to 24.3-MHz at the sampling frequency conversion circuit 5. For conversion from 32.4-MHz to 24.3-MHz, the signal of 32.4-MHz is zeroth-order interpolated into 97.2-MHz, and subsampled at 24.3 Mhz. The signal thus frequency-converted to 24.3-MHz is delayed by one field at the field memory 6. The input and output signals of the field memory 6 are interpolated at the 48.6-MHz interfield interpolation circuit 7. The interfield interpolation requires a two-dimensional filtering in view of the reproduction range of the MUSE signal.

In the moving image processing, on the other hand, the signal subjected to input processing at the input processing section 1 is two-dimensionally interpolated at the two-dimensional interpolation circuit 8. This output, which has a sampling frequency of 32.4-MHz, is converted to 48.6-MHz at the sampling frequency conversion circuit 9 in order to match with the final sampling frequency for still image processing. In the conversion from 32.4-MHz to 48.6-MHz, in the same way as in the processing at the sampling frequency conversion circuit 5, the 32.4-MHz frequency is zeroth-order interpolated to 97.2-MHz, and the resulting signal is subsampled at 48.6-MHz.

The motion detection circuit 11 for mixing the still image processing and the moving image processing detects a motion area from the output of the frame memory 2 and the output of the memory 10 capable of delaying one frame or more. Normally, a motion area is detected by using a one frame difference signal subjected to 4-MHz low-pass filtering, a two-frame difference signal and the same two-frame difference signal delayed by one frame. A motion vector signal is detected from the control signal multiplexed on the MUSE signal at the input processing section 1. A dedicated memory is used for handling horizontal and vertical motion vectors at the motion detection circuit 11, the interframe interpolation circuit 3 and the 48.6-MHz interfield interpolation circuit 7.

The motion area information detected at the motion detection circuit 11 is used to mix the output of the 48.6-MHz interfield interpolation circuit 7 subjected to the still image processing with the output of the sampling frequency conversion circuit 9 subjected to the moving image processing at the mixer circuit 12.

The output signal of the LPF circuit 4 and the same signal delayed by one field at the field memory 6 are inputted to the 32.4-MHz interfield interpolation circuit 27. These two signals are processed as shown in FIG. 10 to provide a 32.4-MHz interfield-interpolated signal. The first sampling frequency conversion, the interfield interpolation and the second sampling frequency conversion are executed according to the linear interpolation means shown in the schematic block diagram of FIG. 9, with the result that a 32.4-MHz interfield-interpolated signal is synthesized. First, the signal applied to the 32.4-MHz sampling frequency conversion circuit 27a is designated by the alphabetical characters in the squares and circles in FIG. 10. The sampling frequency is 32.4-MHz. The linear interpolation approximation of the sampling frequency conversion of this signal from 32.4-MHz to 24.3-MHz at the sampling frequency conversion circuit 27a is performed in the following manner. Specifically, as shown in FIG. 10, B is reduced to ⅔ and C to ⅓ and they are added to perform linear interpolation, thereby approximating the 24.3-MHz sampling point denoted by the hatched square between points B and C. Now, the linear Interpolation approximation of the 48.6-MHz interfield interpolation at the interfield interpolation circuit 27b shown in FIG. 9 is performed in the following manner. Specifically, this approximation process is performed in such a manner that the 24.3-MHz sampling points designated by a hatched square and circle in FIG. 10 are linearly interpolated or averaged between two nearest interfield points. The result is the sampling points interfield-interpolated at 48.6-MHz as denoted by triangles. Finally, the sampling Frequency conversion from 48.6-MHz to 32.4-MHz is effected at the sampling frequency conversion circuit 27c in FIG. 9 in the following manner. Specifically, this approximation is represented by the very sampling point interfield-interpolated at 48.6-MHz or the average of two sampling points as shown in FIG. 10.

The arithmetic operations at these circuits 27a, 27b, 27c are not effected each time, but may be performed by advance calculations in several stages through the operation with a 32.4-MHz clock alone. The point indicated by the black circle 2 in FIG. 10, for example, can be represented as a/6+2×b/6+2×B/6+C/6, and that indicated by the black circle 3 as c/2+B/6+C/6+D/6. In this case, only these two types of coefficients are used for basic arithmetic operation, provided that the same arithmetic operation is performed for four horizontal samples and the phase change in field subsampling. As a result, the 32.4-MHz interfield interpolation is realized by controlling a very simple arithmetic circuit by a field subsampling along horizontal direction.

In the explanation above, the simplest linear interpolation between two points was employed. When the approximation by linear interpolation at more sampling points is used for calculations of sampling frequency conversion from 32.4 MHz to 24.3-MHz, interfield interpolation at 48.6-MHz and the sampling frequency conversion from 48.6-MHz to 32.4-MHz, however, the degradation of the frequency characteristics is reduced in spite of a somewhat increased size of the arithmetic circuit for the approximation.

Figure 11:
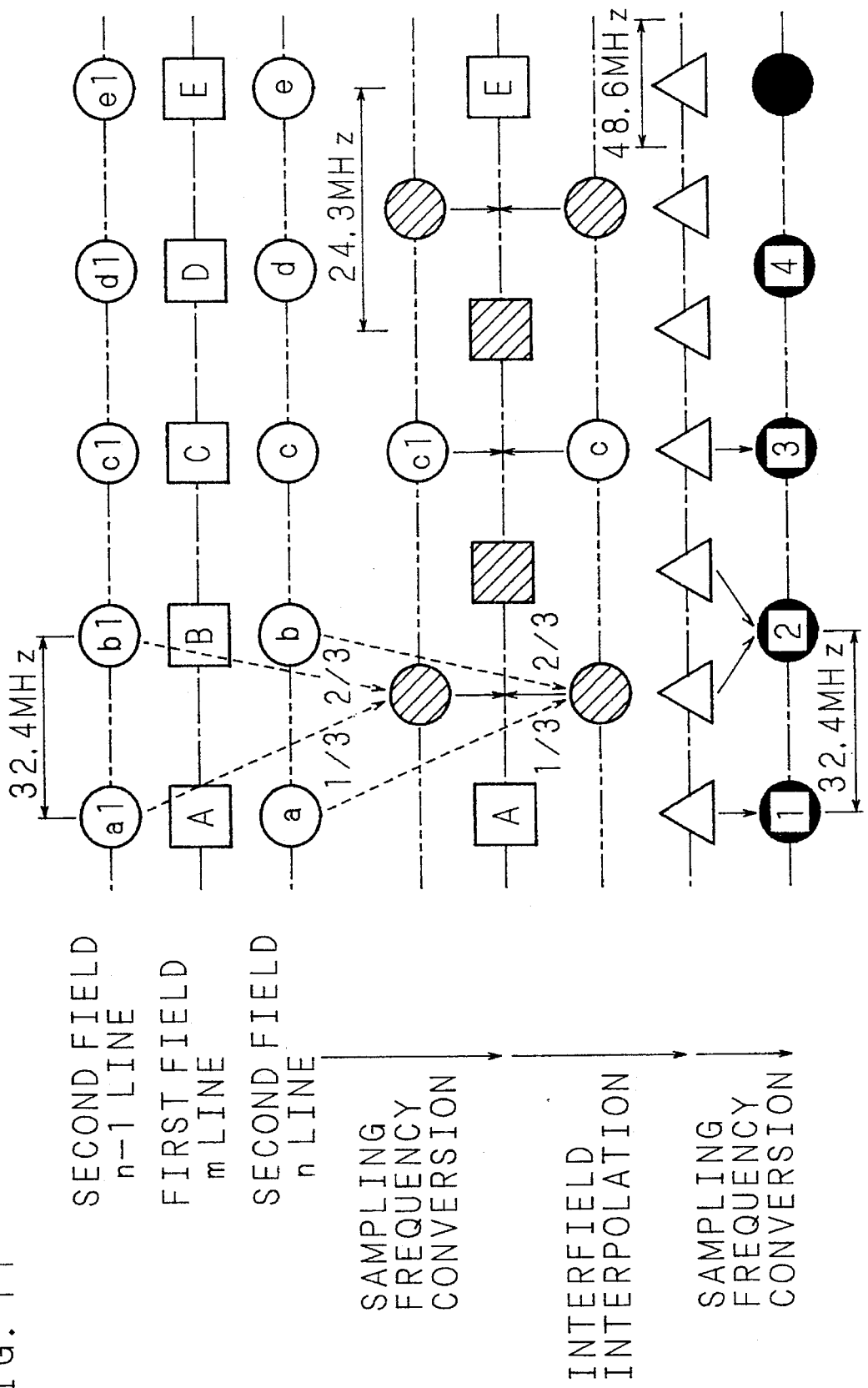
FIG. 11 is a diagram showing another sampling model according to the embodiment 1.

Another example of the embodiment will be explained. FIG. 11 shows a model of sampling points for explaining the 48.6-MHz interfield interpolation at the 32.4-MHz interfield interpolation circuit 27 according to this embodiment, which is performed using another means. In this embodiment, the field-delayed signal is delayed by a line memory, and the signals before and after the delay are averaged for sampling conversion and embedded in the middle after sampling conversion of the signal before field delay, thereby performing the 48.6-MHz sampling frequency conversion. According to this method, the filters along horizontal direction are decreased by one so that the degradation of the horizontal resolution is suppressed for achieving linear approximation. Since a line memory is required, however, the circuit size is increased.

Embodiment 2:

Now, an embodiment 2 (claim 2) will be explained. Explanation will be made only about a 32.4-MHz interfield interpolation circuit 27 which is different from the embodiment 1. The general configuration of the high definition TV receiver according to the embodiment 2 is similar to that of the embodiment 1 (FIG. 8) and therefore will not be described further.

Figure 12:
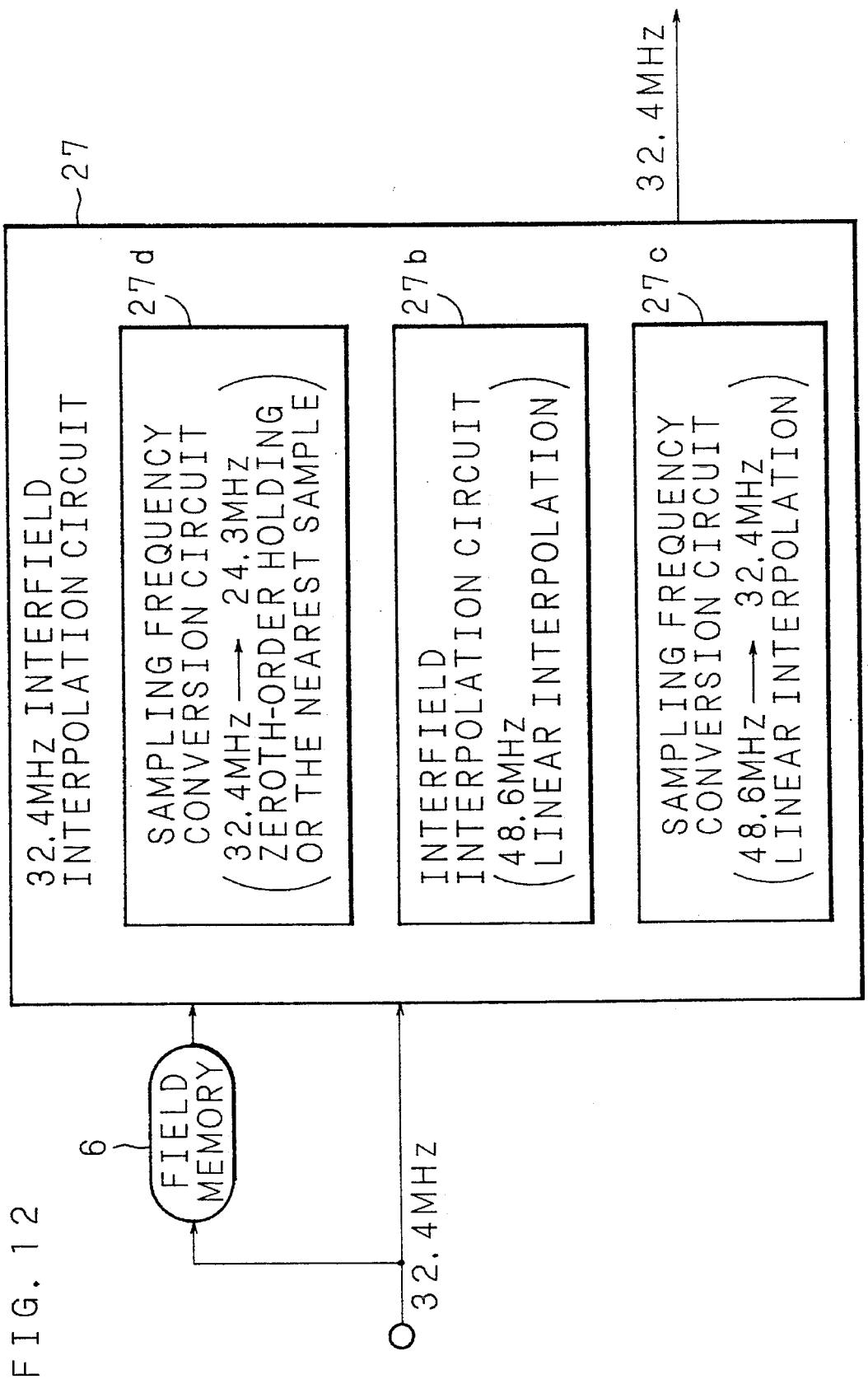
FIG. 12 is a block diagram showing a configuration of a 32.4-MHz interfield interpolation circuit according to an embodiment 2 of the invention.

FIG. 12 is a block diagram schematically showing the 32.4-MHz interfield interpolation circuit 27 according to the embodiment 2. This circuit includes a sampling frequency conversion circuit 27d for converting the sampling frequency from 32.4-MHz to 24.3-MHz by approximation with zeroth-order holding or the nearest sample, an interfield interpolation circuit 27b and a sampling frequency conversion circuit 27c similar to the corresponding component parts in the embodiment 1.

Figure 13:
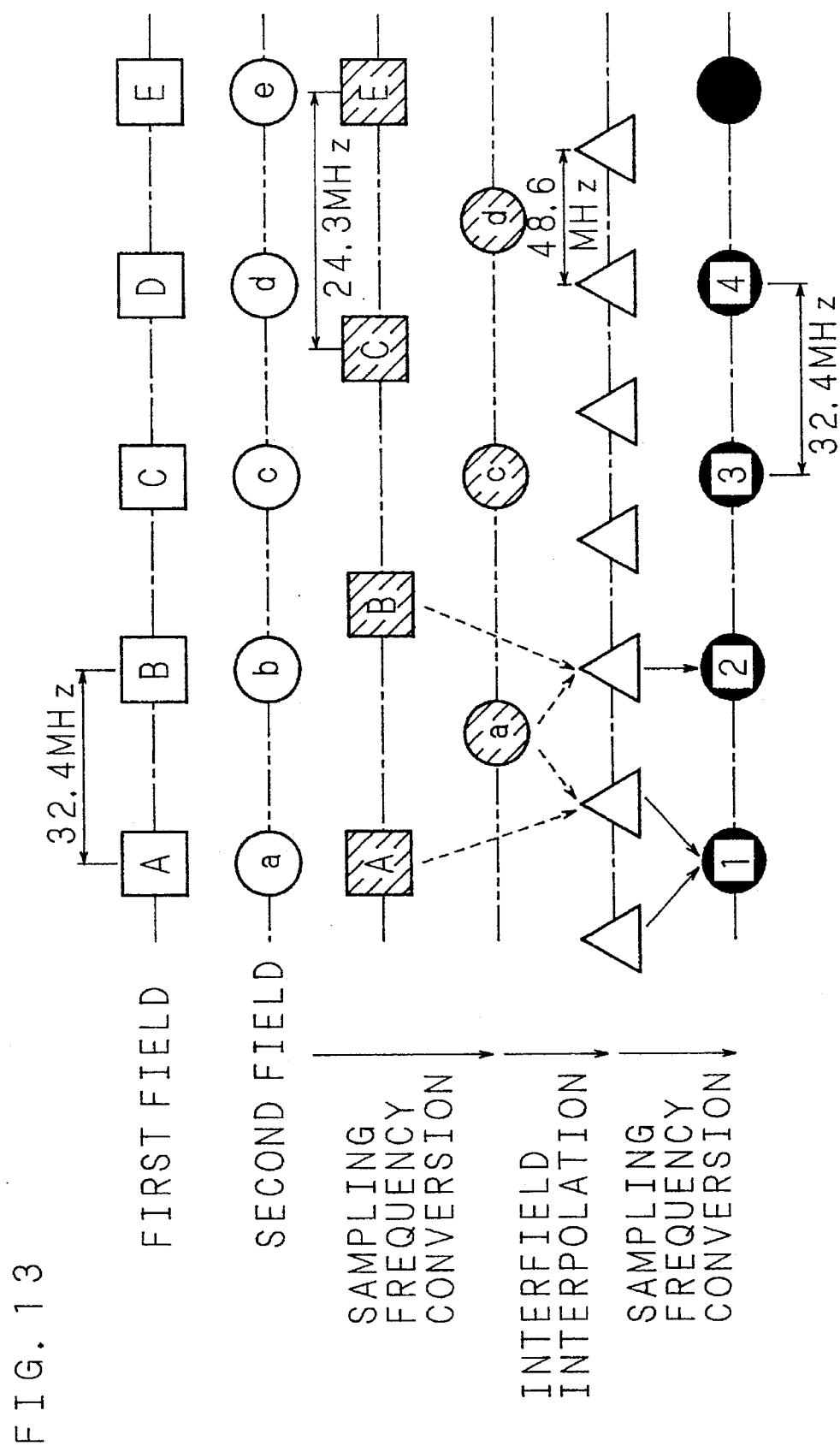
FIG. 13 is a diagram showing a sampling model according to the embodiment 2 of the invention.
Figure 14:
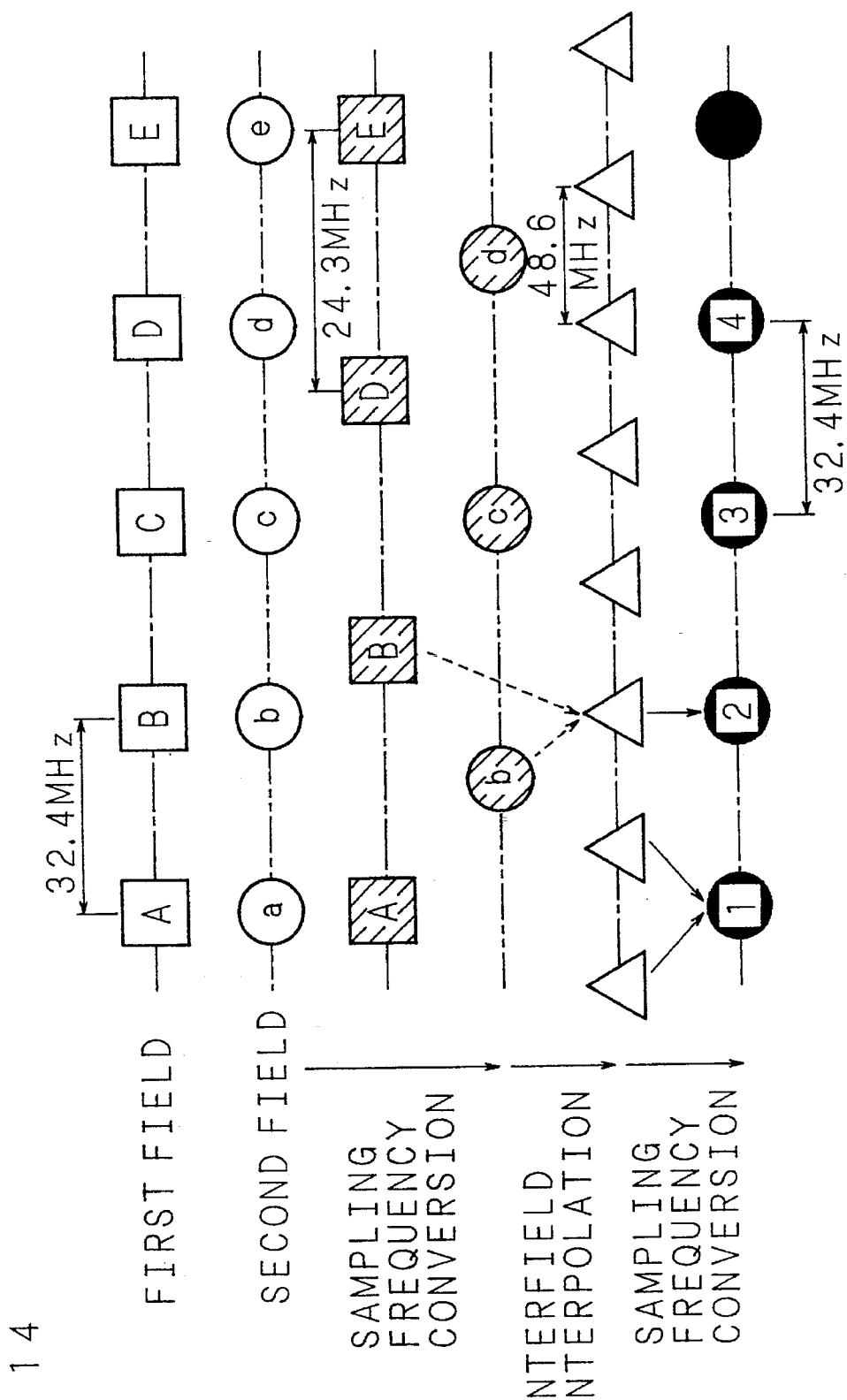
FIG. 14 is a diagram showing another sampling model according to the embodiment 2.

FIGS. 13 and 14 are diagrams for explaining the arithmetic operation of the 32.4-MHz interfield interpolation circuit 27 according to this embodiment with reference to a model of sampling points. The diagram of FIG. 13 corresponds to the case in which the sampling frequency conversion from 32.4-MHz to 24.3-MHz is approximated by zeroth-order holding, and FIG. 14 the case in which the sampling frequency conversion from 32.4-MHz to 24.3-MHz is approximated by the nearest sample. In FIGS. 13 and 14, the alphabetical characters in squares represent sampling points in a first field, and those in circles sampling points in a second field. The hatched squares and circles indicate the result of approximation of the sampling frequency conversion by zeroth-order holding or with the nearest sample. The triangular points represent the result of linear interpolation of the 48.6-MHz sampling frequency conversion. The black circle represents the final output of the 32.4-MHz interfield interpolation circuit 27.

Now, the operation will be explained. The signal inputted to the 32.4-MHz interfield interpolation circuit 27, which is indicated by the alphabetical characters in circles and squares in FIGS. 13 and 14, has a sampling frequency of 32.4-MHz. In the approximation by zeroth-order holding of the sampling frequency conversion from 32.4-MHz to 24.3-MHz effected at the sampling frequency conversion circuit 27d, as shown in FIG. 13, four points A, B, C, D are approximated by three 24.3-MHz points A, B, C. According to the approximation by the nearest sample, on the other hand, as shown in FIG. 14, the four points A, B, C, D are approximated by the three 24.3-MHz points A, B, C. In the approximation by the 48.6-MHz interfield linear interpolation at the interfield interpolation circuit 27b shown in FIG. 12, on the other hand, the 24.3-MHz sampling points designated by hatched squares and circles in FIGS. 13 and 14 are linearly interpolated or averaged between the nearest two interfield points. Thus the sampling points subjected to 48.6-MHz interfield interpolation are obtained as indicated by triangles. Finally, the sampling frequency conversion from 48.6 MHz to 32.4-MHz at the sampling frequency conversion circuit 27c shown in FIG. 12 is performed, as shown in FIGS. 13 and 14, are represented by the very sampling point subjected to 48.6-MHz interfield interpolation or the average of two sampling points as shown in FIGS. 13 and 14.

When the arithmetic operation at these circuits 27d, 27b, 27 c is not performed each time but in advance, the calculation can be performed in several stages by the operation with only 32.4-MHz clocks. In FIG. 13, the point represented by black circle 2, for example, is expressed as a/2+B/2, and the point of black circle 3 as c/2+B/4+C/4. Also, in FIG. 14, the point of black circle 2 is given as b/2+B/2, and the point of black circle 3 as c/2+B/4+D/4. In this case, the coefficients for basic arithmetic operation are limited to these two types, with the result, that the same arithmetic operation is used for four horizontal samples and the field subsample phase is changed. The result is a very simple arithmetic operation circuit, which is controlled by horizontal field subsampling thereby to realize a 32.4-MHz interfield interpolation.

Although the explanation above employs the simplest linear interpolation between two points, a calculation made in advance for linear interpolation approximation of the 48.6-MHz interfield interpolation and the sampling frequency conversion from 48.6-MHz to 32.4-MHz at more sampling points makes possible an approximation accompanied by a small degradation of the frequency characteristics at the cost of a somewhat increased size of the arithmetic circuit.

The zeroth-order holding process and the use of the nearest sample lead to the same arithmetic equation in applications to an interfield interpolation circuit in spite of different sampling points since the filters of the same characteristics are used for the two operations.

Embodiment 3:

Now, an embodiment 3 (claims 3 and 4) will be explained. Explanation will be limited to the 32.4-MHz interfield interpolation circuit 27 different from the embodiment 1. The general configuration of the high definition TV receiver according to the embodiment 3 is similar to that of the embodiment 1 (FIG. 8), and therefore will not be described further.

Figure 15:
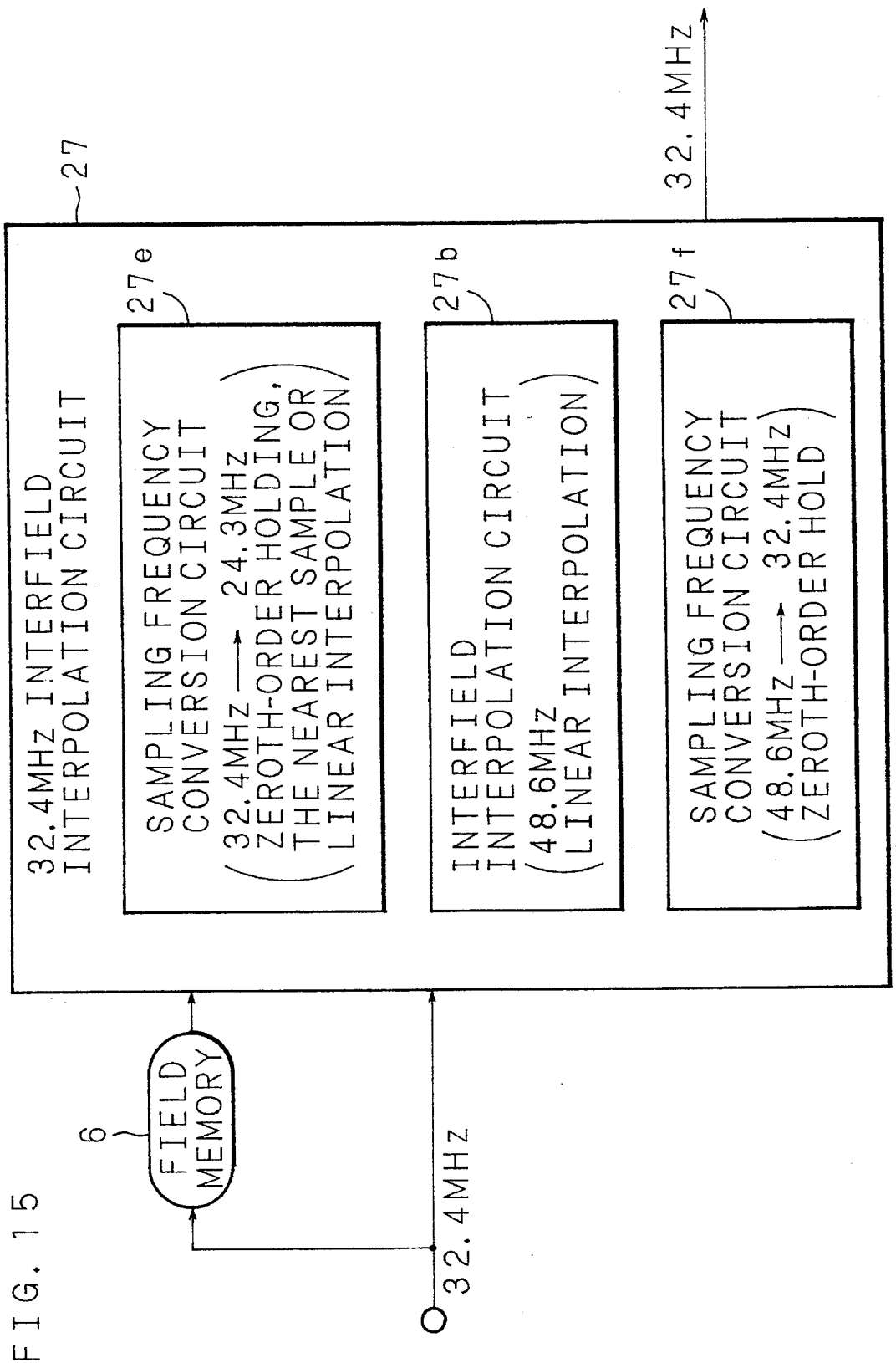
FIG. 15 is a block diagram showing a configuration of a 32.4-MHz interfield interpolation circuit according to an embodiment 3 of the invention.

FIG. 15 is a block diagram schematically showing the 32.4-MHz interfield interpolation circuit 27 according to the embodiment 3. This 32.4-MHz interfield interpolation circuit 27 includes a sampling frequency conversion circuit 27e for converting the sampling frequency from 32.4-MHz to 24.3-MHz by the approximation using zeroth-order holding, the nearest sample or the linear interpolation, an interfield interpolation circuit 27b similar to the embodiment 1, and a sampling frequency conversion circuit 27f for converting the sampling frequency from 48.6-MHz to 32.4-MHz by approximation in zeroth-order holding.

Figure 16:
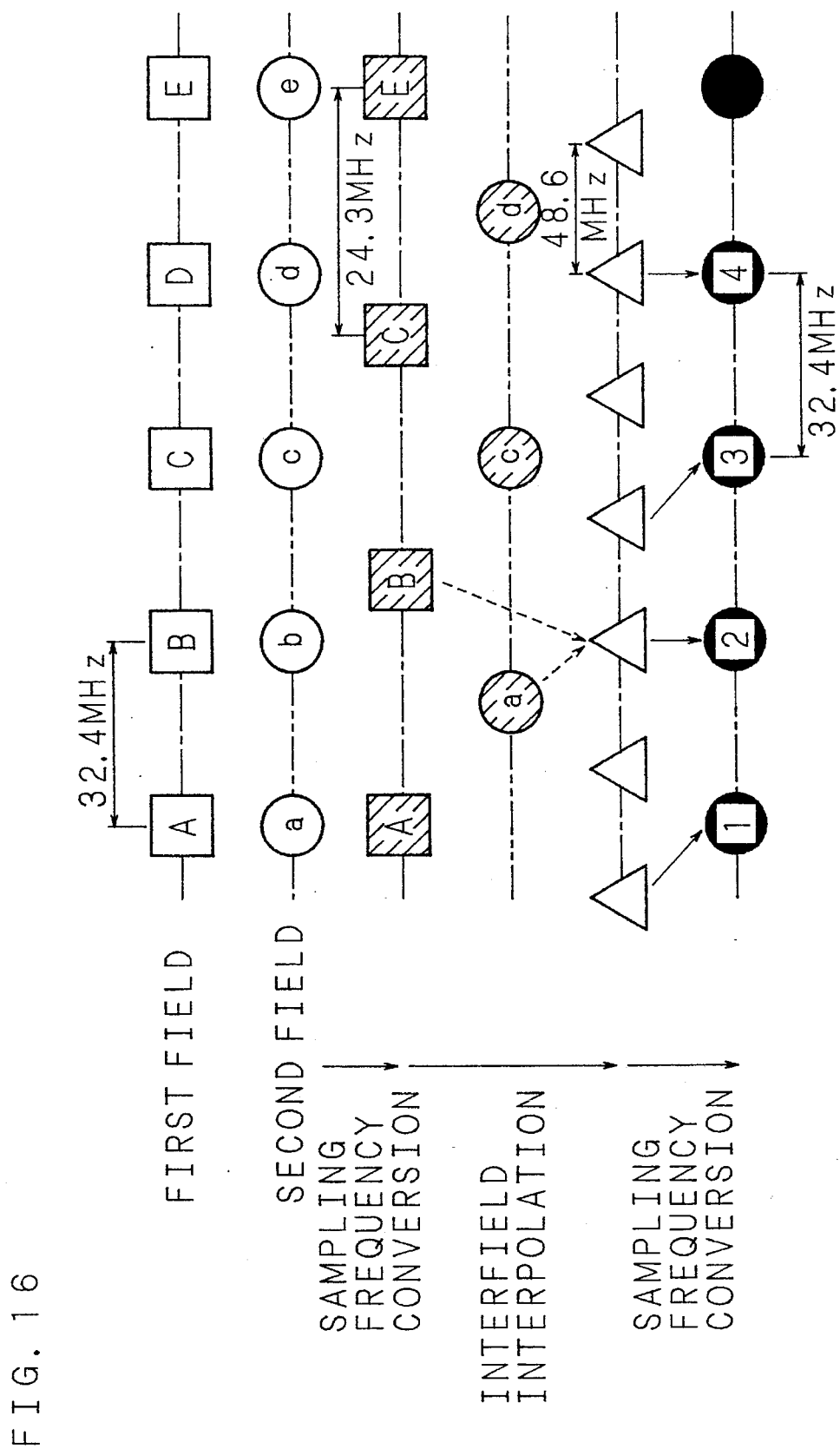
FIG. 16 is a diagram showing a sampling model according to the embodiment 3.

FIG. 16 is a diagram for explaining the arithmetic operation of the 32.4-MHz interfield interpolation circuit 27 with reference to a model of sampling points. In FIG. 16, the alphabetical characters in squares denote the sampling points in a first field, and those in circles the sampling points in a second field. The hatched squares and circles represent the result of zeroth-order holding of the sampling frequency conversion. The triangular points represent the result of linear interpolation of the 48.6-MHz sampling frequency conversion. The black circle obtained by zeroth-order holding the above-mentioned sampling frequency conversion represents the final output of the 32.4-MHz interfield interpolation circuit 27.

Now, the operation will be explained. The signal inputted to the 32.4-MHz interfield interpolation circuit 27 is represented by the alphabetical characters in squares and circles in FIG. 16. The sampling frequency is 32.4-MHz. The sampling frequency conversion of this signal from 32.4-MHz to 24.3-MHz at the sampling frequency conversion circuit 27e is approximated by zeroth-order holding in such a manner that four points A, B, C, D are approximated by three 24.3-MHz points A, B, C as shown in FIG. 16. Then, the approximation by the 48.6-MHz interfield linear interpolation at the interfield interpolation circuit 27b in FIG. 15 is performed in such a manner that the 24.3-MHz sampling points in hatched squares and circles in FIG. 16 are linearly interpolated or averaged between two nearest interfield points. Then, sampling points subjected to 48.6-MHz interfield interpolation are obtained as indicated by triangles. Finally, the sampling frequency conversion from 48.6-MHz to 32.4-MHz in the sampling frequency conversion circuit 27f in FIG. 15 is performed, as shown in FIG. 16, by zeroth-order holding the sampling points subjected to interfield interpolation at 48.6-MHz.

When the arithmetic operations of these circuits 27e, 27b, 27f are not effected each time, but calculations beforehand desirably limit the arithmetic operation to several stages only with 32.4-MHz clocks. The point at black circle 2 in FIG. 16, for example, is expressed as a/2+B/2, and the point of black circle 3 as B/2+c/2. In the shown case, the coefficients for the basic calculations are limited to these two types, with tile result that the phase undergoes a change with a field subsampling and the same arithmetic operation is involved for each four samples in horizontal direction. The resulting provision of a very simple arithmetic circuit, which is controlled by field subsampling along horizontal direction, can realize a 32.4-MHz interfield interpolation.

Although the linear interpolation between two points which is simplest has been explained in the foregoing description, advance calculations for approximation by 48.6-MHz linear interfield interpolation at more sampling points permits an approximation with a smaller degradation in frequency characteristics in spite of a somewhat increased size of the arithmetic circuit.

Embodiment 4:

Now, an embodiment 4 (claims 5 and 6) will be explained. Explanation will be limited to the 32.4-MHz interfield interpolation circuit 27 different from the embodiment 1. The general configuration including other component parts of the high definition TV receiver according to the embodiment 4 is similar to that of the embodiment 1 (FIG. 8), and will not be explained further.

Figure 17:
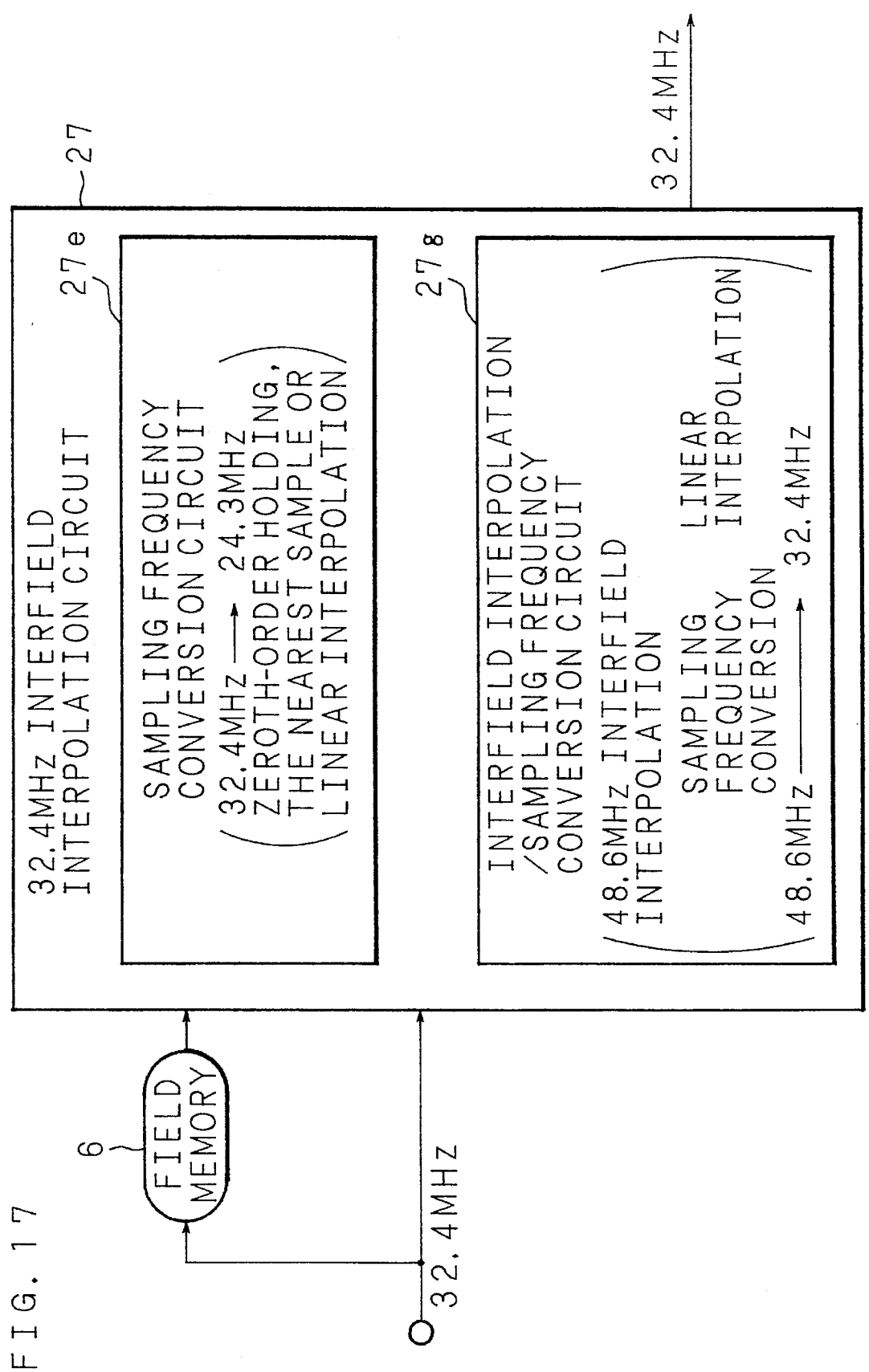
FIG. 17 is a block diagram showing a configuration of a 32.4-MHz interfield interpolation circuit according to an embodiment 4 of the invention.

FIG. 17 is a block diagram schematically showing the 32.4-MHz interfield interpolation circuit 27 according to the embodiment 4. The 32.4-MHz interfield interpolation circuit 27, includes a sampling frequency conversion circuit. 27e being the same one as in the embodiment 4 and an interfield-interpolation/sampling frequency conversion circuit 27g for approximating the interfield interpolation at 48.6 MHz and the sampling frequency conversion from 48.6-MHz to 32.4-MHz collectively by linear interpolation.

Figure 18:
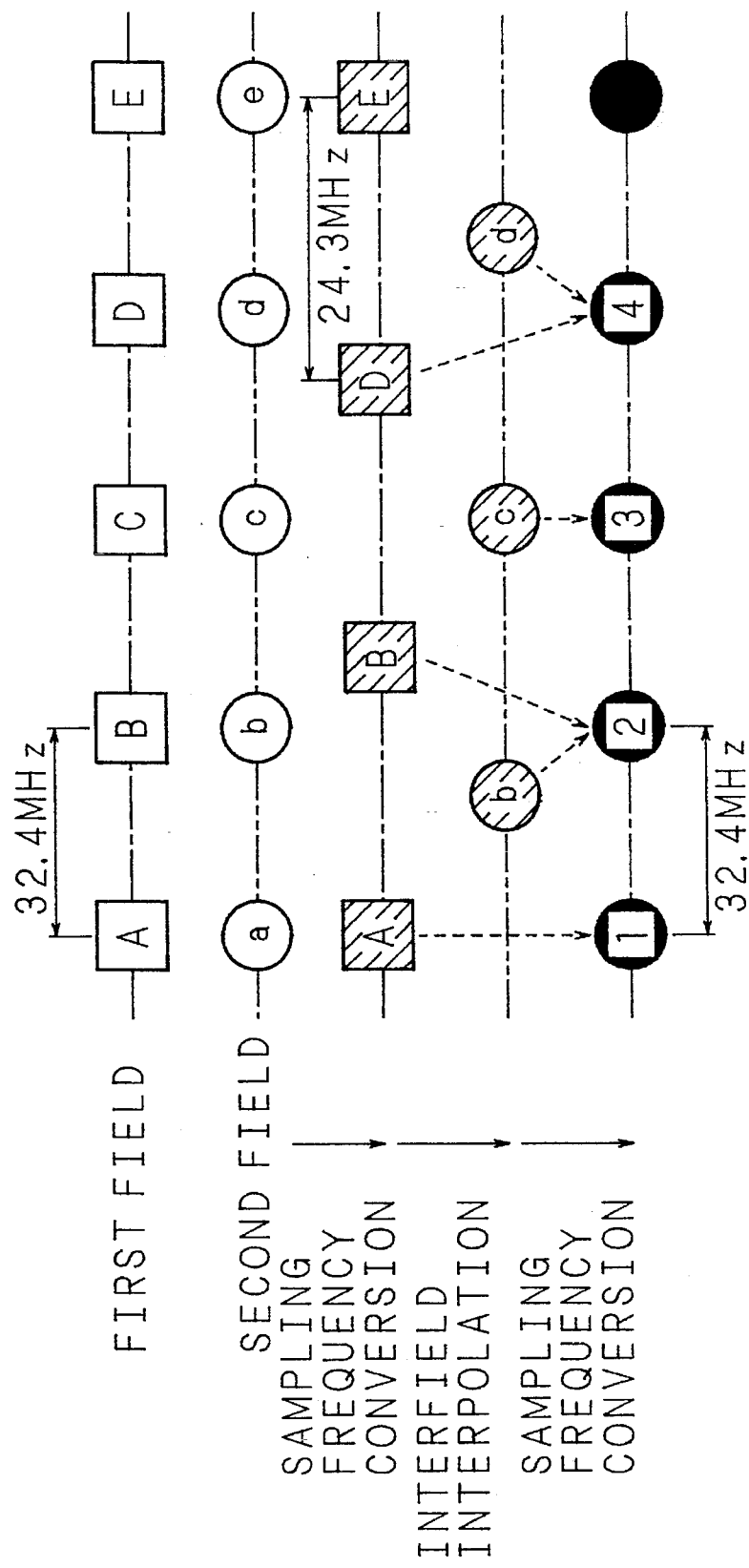
FIG. 18 is a diagram showing a sampling model according to the embodiment 4.

FIG. 18 is a diagram for explaining the arithmetic operation of the 32.4-MHz interfield interpolation circuit 27 according to the embodiment 4 with reference to a model of sampling points. In FIG. 18, the alphabetical characters in squares designate sampling points in a first field, and those in circles sampling points in a second field. Also, the hatched squares and circles represent the result of zeroth-order holding of the sampling frequency conversion. The black circles representing the collective linear interpolation of the sampling frequency conversion from the zeroth-order held result to 48.6-MHz and from 48.6-MHz to 32.4-MHz is the final output of the 32.4-MHz interfield interpolation circuit 27.

Now, the operation will be explained. The signal inputted to the 32.4-MHz sampling frequency conversion circuit 27 is designated by the alphabetical characters in the squares and circles in FIG. 18, the sampling frequency being 32.4-MHz. The approximation by the nearest sample of the sampling frequency conversion from 32.4-MHz to 24.3-MHz performed at the sampling frequency conversion circuit 27e is effected from four points A, B, C, D to three 24.3-MHz points A, B, C as shown in FIG. 18. Then, the approximation by collective linear interpolation of the 48.6-MHz interfield interpolation and the sampling frequency conversion from 48.6-MHz to 32.4-MHz at the interfield interpolation/sampling frequency conversion circuit. 27g in FIG. 17 is performed by using the 24.3-MHz sampling points designated by hatched squares and circles in FIG. 18 intact or by averaging the two points.

The arithmetic operation for these circuits 27e, 27g may not be performed each time but calculations beforehand desirably limit the arithmetic operation to several stages only with the 32.4-MHz clocks. For example, the point of the black circle 2 is represented as b/2+B/2 and the point designated by the black circle 3 as c. In the shown case, this coefficient is the only one for basic arithmetic operations, and the approximation can be performed with the sole result that the calculation is made or a sample value obtained for each output sample and the field subsample undergoes a phase change. As a result, a very simple arithmetic circuit can be employed and controlled by a field subsample in horizontal direction thereby to realize a 32.4-MHz interfield interpolation.

Although the linear interpolation between two points has been explained above as the simplest method an approximation with a small degradation of the frequency characteristics is possible in spite of a somewhat increased size in the arithmetic circuit, if calculations are made in advance For approximation by linear interpolation collectively at more sampling points for the 48.6-MHz interfield interpolation and the sampling frequency conversion from 48.6-MHz to 32.4-MHz.

Figure 19:
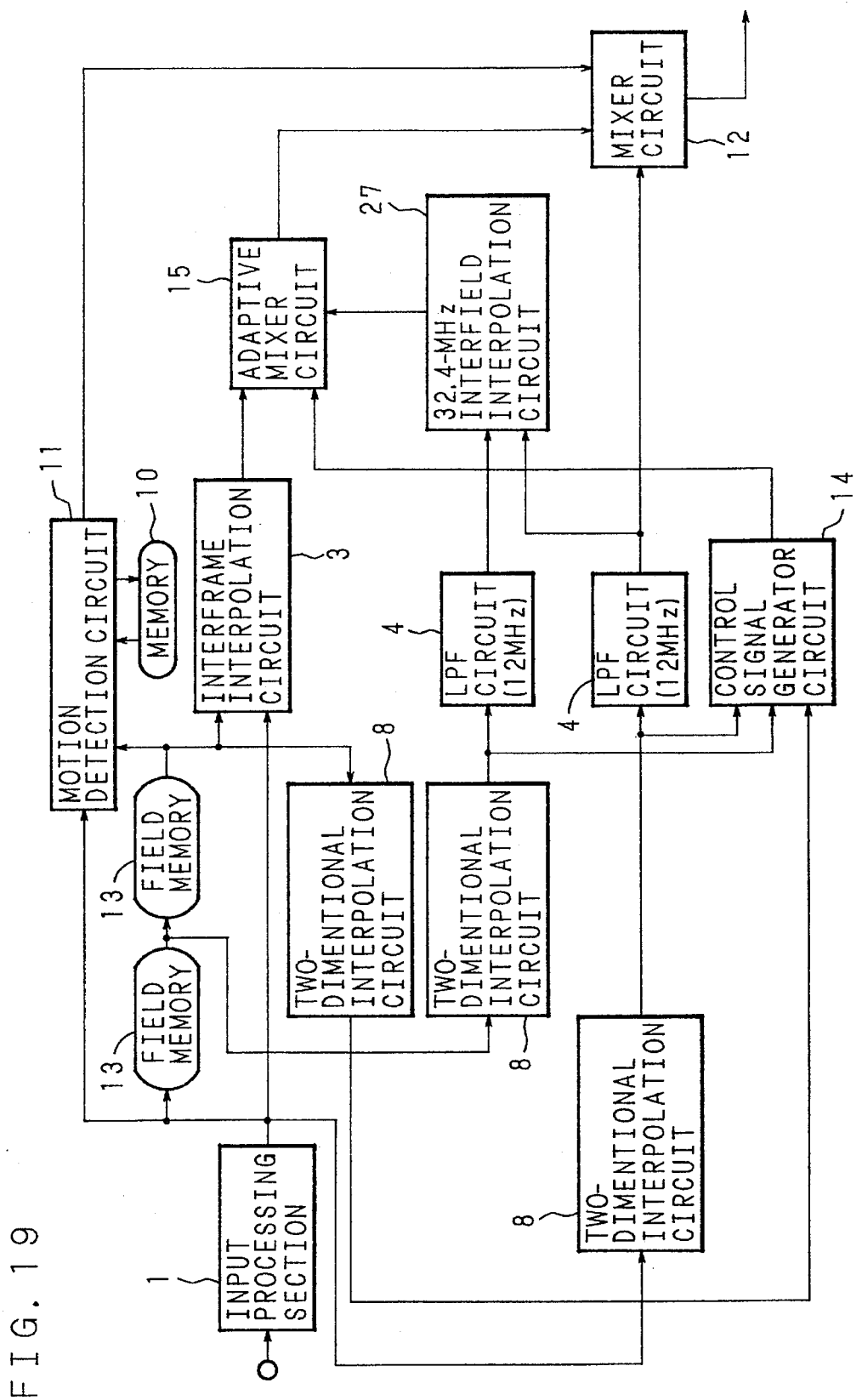
FIG. 19 is a block diagram showing a configuration of a high definition TV receiver according to an embodiment 5 of the invention.

Embodiment 5:

Now, an embodiment 5 (claim 7) will be explained. FIG. 19 is a block diagram showing the configuration of a high definition TV receiver according to the fifth embodiment. In FIG. 19, the input processing section 1, the interframe interpolation circuit 3, the LPF circuit 4, the two-dimensional interpolation circuit 8, the memory 10, the motion detector circuit 11 and the mixer circuit 12 are identical to those described in the embodiment 1 respectively shown in FIG. 8 and will not be described again. Numeral 13 designates a field memory for delaying the input signal by one field. Numeral 14 designates a control signal generator circuit for generating a control signal for subsequent stages from the signal of the input processing section 1 two-dimensionally interpolated by the two-dimensional interpolation circuit 8, a signal field-delayed at a field memory 13 and two-dimensionally interpolated at another two-dimensional interpolation circuit 8 and a signal frame-delayed by two series-connected field memories 13, 13 and two-dimensionally interpolated by still another two-dimensional interpolation circuit 8. Numeral 15 designates an adaptive mixer circuit for mixing the output of the interframe interpolation circuit 3 and the output of the 32.4-MHz interfield-interpolation circuit 27 shown in the embodiments 1–4 with each other adaptively by a control signal.

Now, the operation will be explained. The signal subjected to input processings at the input processing section 1 is delayed by one frame at the two field memories 13, 13, and the signals before and after the delay are subjected to interframe interpolation at the interframe interpolation circuit 3. Also, the input-processed signal and the signal field-delayed at the field memories 13 are two-dimensionally interpolated at the two-dimensional interpolation circuits 8 respectively, and these signals are band-limited to 12-MHz at the LPF circuits 4, 4. The two signals thus band-limited are subjected to interfield interpolation at the 32.4-MHz interfield interpolation circuit 27 shown in the embodiments 1–4. Of the signals thus interpolated, the interframe-interpolated signal contains a field aliasing component, and the interfield-interpolated signal a frame aliasing component. As far as one of the two signals is used as a signal for still image processing, therefore, the frame or field aliasing component is visible as an interference in the still image.

In order to obviate this interference, first, three signals are generated: One by two-dimensionally interpolating the output of the input processing section i at the two-dimensional interpolation circuit 8, a second signal by field-delaying the output of the input processing section 1 at the field memories 13, 13 anti two-dimensionally interpolating them at the two-dimensional interpolation circuit 8, and the last signal by frame-delaying the output of the input processing section 1 at the two series-connected field memories 13, 13 and two-dimensionally interpolating them at the two-dimensional interpolation circuit 8. These three two-dimensionally interpolated signals are compared in magnitude, for example, for each sample at the control signal generator circuit 14, so that the frame or field aliasing component is decided on thereby to generate a control signal. An adaptive mixer circuit 15 is used, in which the signal synthesis ratio is changed adaptively according to the interframe or interfield interpolation by performing the interframe or interfield interpolation in the presence of a frame or field aliasing component respectively. This mixer circuit 15 is thus used for mixing with a moving image processing signal. In this way, the above-mentioned interference is prevented, and with a performance equivalent to the configuration shown in the embodiment 1 (FIG. 8), the number of field memories can be saved as compared with the embodiment shown FIG. 8, thereby reducing the system cost.

Figure 20:
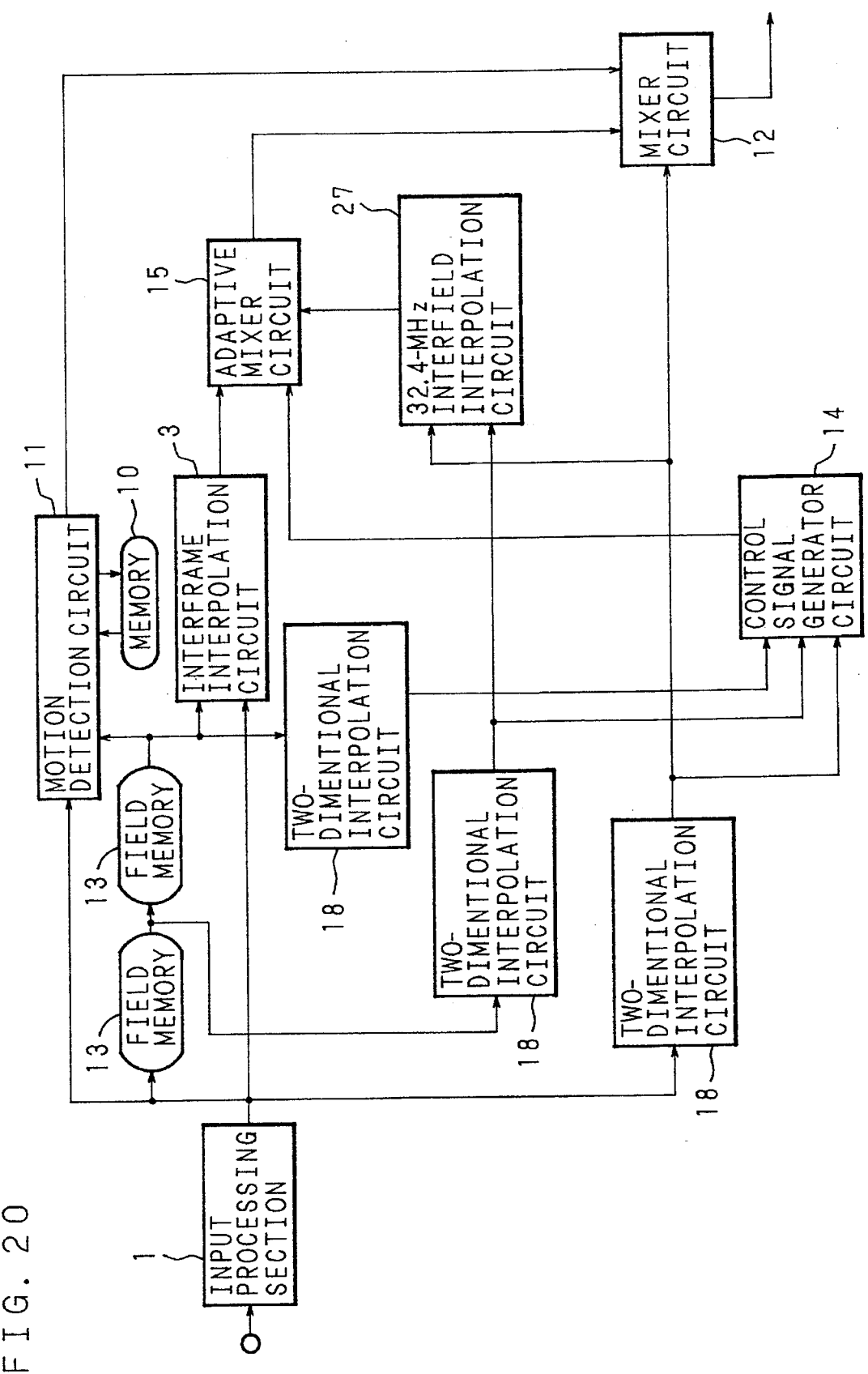
FIG. 20 is a block diagram showing a configuration of a high definition TV receiver according to an embodiment 6 of the invention.

Embodiment 6:

Now, an embodiment 6 (claim 8) will be explained. FIG. 20 is a block diagram showing the configuration of a high definition TV receiver according to the embodiment 6. In FIG. 20, the LPF circuit 4 of the fifth embodiment in FIG. 19 is eliminated, and instead, a two-dimensional interpolation circuit 18 identical to or different from the two-dimensional interpolation circuit 8 in FIG. 19 is inserted at the output of the input processing section 1 and the field memory 13 respectively.

Now, the operation will be explained. The components of 12-MHz or higher, when not removed from the input of tile 32.4-MHz interfield interpolation circuit 27, are undesirably reproduced as an aliasing after interfield interpolation. In view of this, in case of FIG. 19, the 12-MHz LPF circuit 4 is inserted to attenuate the components of 12-MHz or higher.

According to the embodiment 6 under consideration (FIG. 20), in contrast, the two-dimensional interpolation circuit 18 has a filtering characteristic making the components of 12-MHz or higher as a cut-off region. Without the LPF circuit 4 shown in FIG. 19, therefore, the aliasing components of 12-MHz or higher can be suppressed. Strictly, the 12-MHz attenuation characteristic is required to be complementary with the characteristic on the encoder side. However, this would result in a large LPF circuit. An LPF circuit which cannot have such a complementary characteristic would be an extraneous circuit. By attenuating the 12-MHz or higher frequency components at the two-dimensional interpolation circuit 18, therefore, the most part of the aliasing components can be suppressed with a reduced circuit size.

Although not described in detail in this invention, the signal two-dimensionally interpolated from the present signal and each delayed signal through a two-dimensional interpolation circuit is used normally in the motion detection circuit 11. The two-dimensional interpolation circuit can therefore double as a motion detection circuit by appropriate circuit design.

Figure 21:
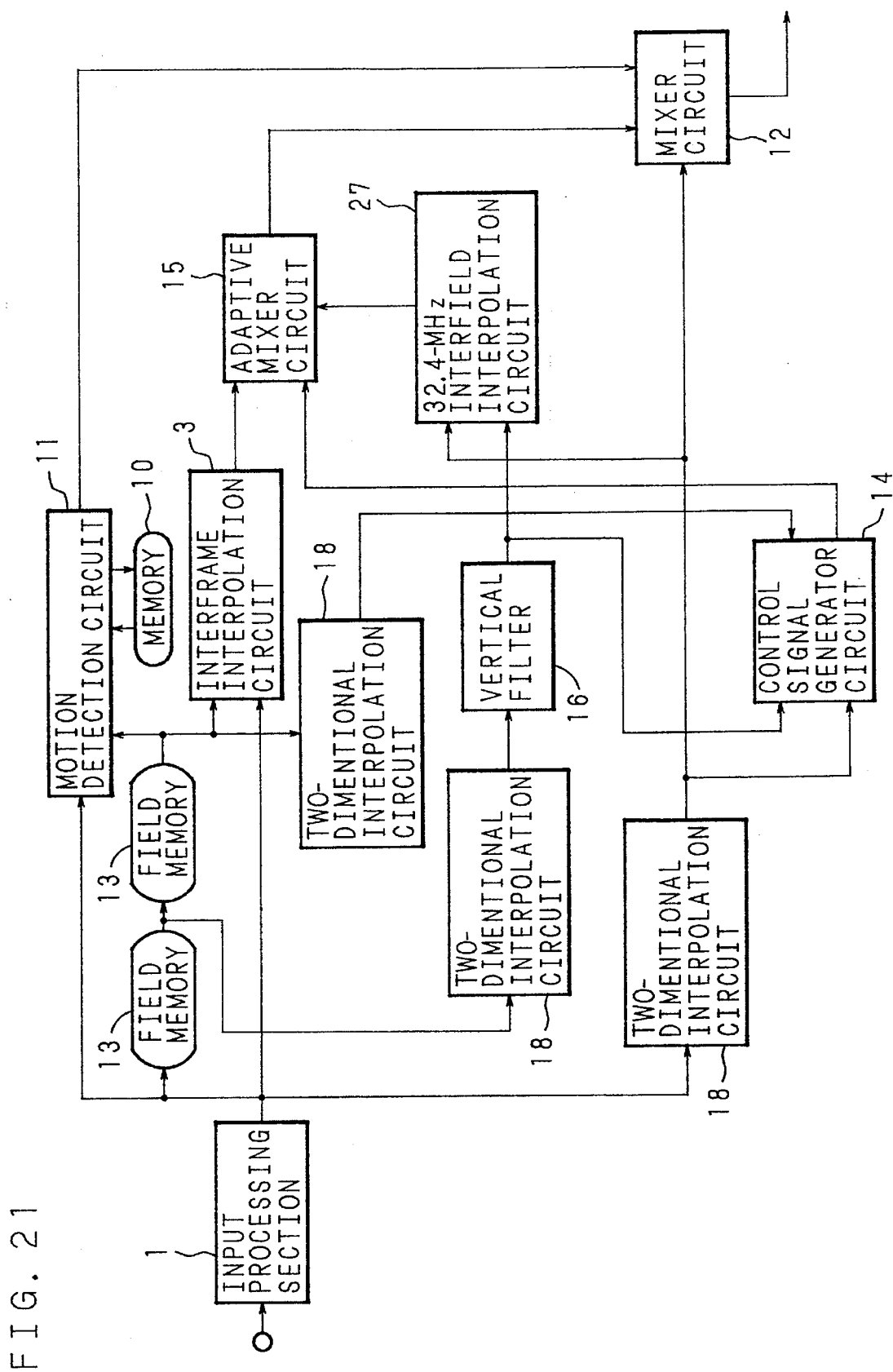
FIG. 21 is a block diagram showing a configuration of a high definition TV receiver according to an embodiment 7 of the invention.

Embodiment 7:

Now, an embodiment 7 (claim 9) will be explained. FIG. 21 is a block diagram showing the configuration of a high definition TV receiver according to the embodiment 7. In FIG. 21, a vertical filter 16 is added in series to the two-dimensional interpolation circuit 18 for two-dimensionally interpolating the signal delayed through the field memory 13 in FIG. 20 of the embodiment 6. The output of the vertical filter 16 is connected to a control signal generator circuit 15 and a 32.4-MHz interfield interpolation circuit 27.

The operation of the embodiment 7 will be explained. The signal processed at the input, processing section 1 and the signal frame-delayed the two series-connected field memories 13 and 13 two-dimensionally interpolated at the two-dimensional interpolation circuit 18 have uniform vertical and horizontal positions. The signal field-delayed at one field memory 13 and two-dimensionally interpolated at the two-dimensional interpolation circuit 18, however, is displaced by one line in vertical direction due to the interlace. When a one-frame difference and a one-field difference are determined to generate a control signal by comparison under this condition, a faulty operation would be likely to occur for signals of high vertical frequencies.

The faulty operation at high vertical frequency signals can be reduced by matching the vertical position of the signal field-delayed at the one field memory 13 and two-dimensionally interpolated with that of the remaining two signals through a vertical filter 16. The simplest example of the vertical filter can be realized by inserting a line memory in series to the two-dimensional interpolation circuit 18 and adding the signals at the two ends of the line memory. The use of more line memories complicating coefficients can further reduce the faulty operations.

Figure 22:
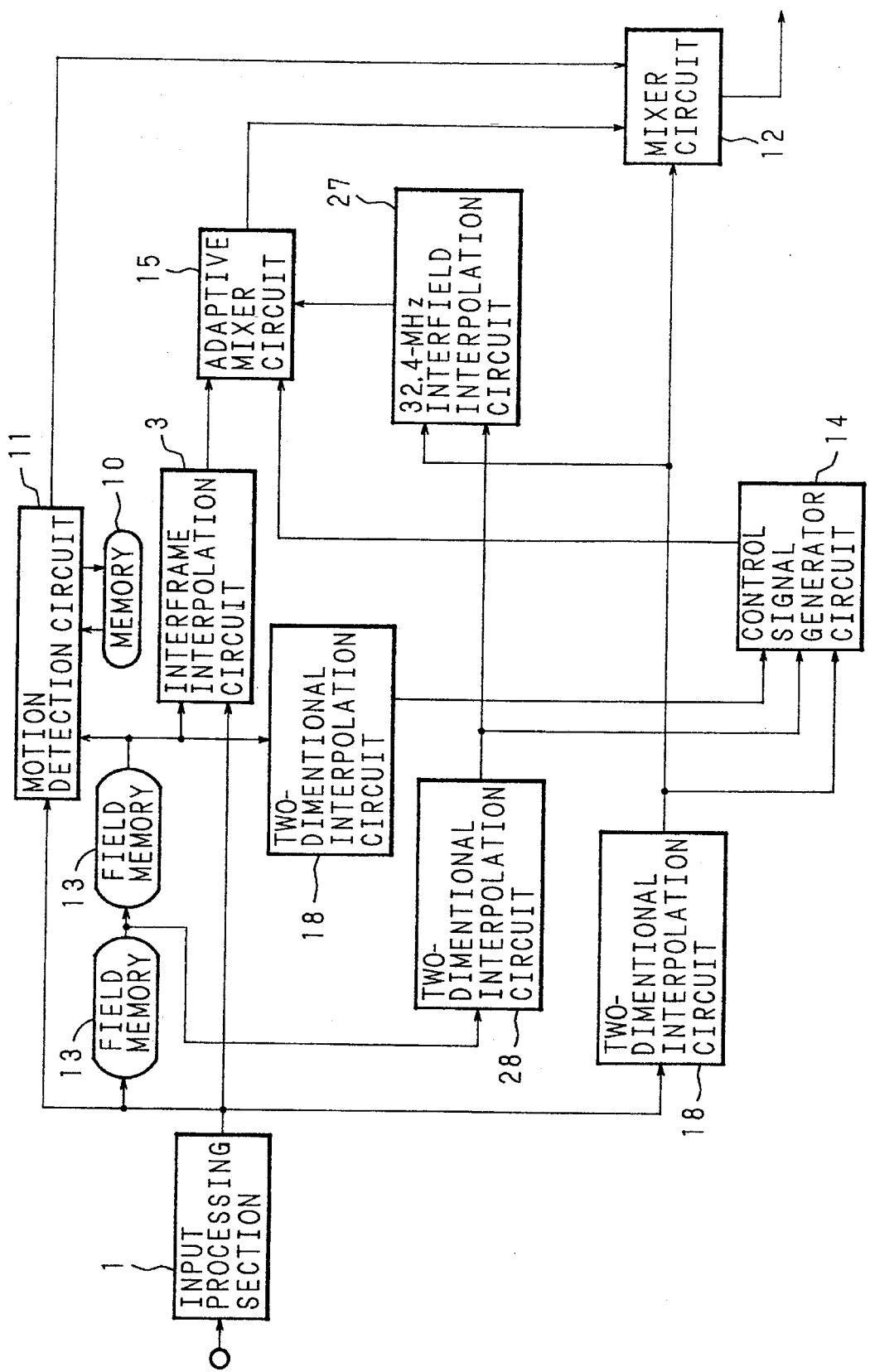
FIG. 22 is a block diagram showing a configuration of a high definition TV receiver according to an embodiment 8 of the invention.

Embodiment 8:

Now, an embodiment 8 (claim 10) will be explained. FIG. 22 is a block diagram showing the configuration of a high definition TV receiver according to the embodiment 8. The embodiment 8 (FIG. 22) which is configured substantially the same way as the embodiment 6 (FIG. 20) comprises a two-dimensional interpolation circuit 28 including at least one more line memory than the two-dimensional interpolation circuit 18 for two-dimensionally interpolating the other present signal and the frame-delayed signal, which circuit 28 two-dimensionally interpolates the signal field-delayed at the field memory 13.

Now, the operation of this embodiment 8 will be explained. As described with reference to the embodiment 7, in the case where the signal two-dimensionally interpolated from the present signal and the frame-delayed signal and a field-delayed signal, are two-dimensionally interpolated at the same two-dimensional interpolation circuit. 18 the control signal is liable to cause a faulty operation at high vertical frequency signal.

According to the embodiment 8, the two-dimensional interpolation circuit 28 including at least one or more line memories than the other two-dimensional interpolation circuits 18 is used in two-dimensionally interpolating the signal field-delayed at the field memory 13. In this way, the same vertical position is secured as the other two-dimensionally interpolated signals, thereby reducing the faulty operation of the control signal at high vertical frequencies. This function is equivalent to that of the embodiment 7 using the vertical filter 16. The embodiment under consideration, however, is further reduced in circuit size as compared with the embodiment using the vertical filter 16.

Figure 23:
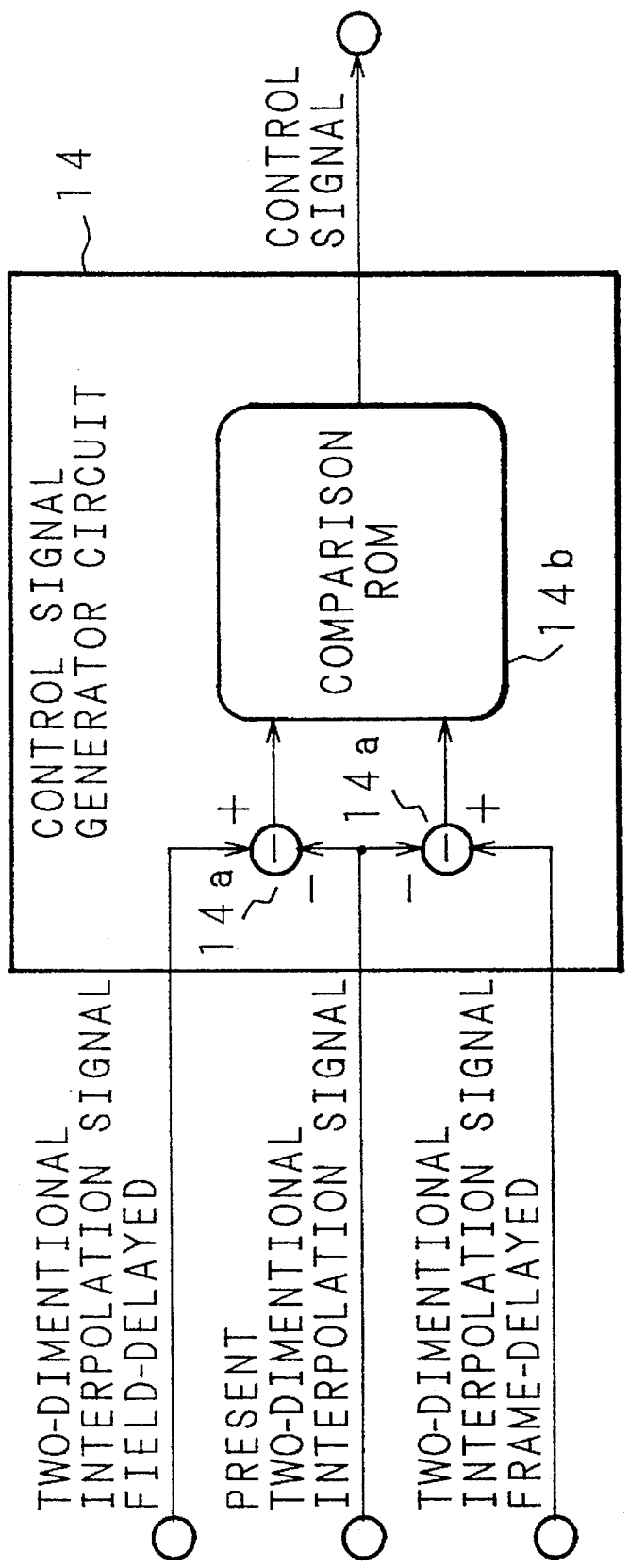
FIG. 23 is a block diagram showing a configuration (ninth embodiment) of a control signal generator circuit of a high definition TV according to the embodiments 7 and 8.

Embodiment 9:

Now, an embodiment 9 (claim 11) will be explained. FIG. 23 is an internal block diagram of the control signal generator circuit 14 according to the embodiments 7 and 8 (FIGS. 21, 22). In FIG. 23, numeral 14a designates a subtractor for subtracting one signal from the other of two signals according to the sign attached to them, and numeral 14b a comparison ROM for outputting a control signal or the output of the subtractor 14a.

The operation of the embodiment 9 will be explained.

The present signal processed in the input processing section 1, the signal field-delayed at the field memories 13, 13 and the signal frame-delayed, as shown in the embodiments 7 and 8, are supplied to the control signal generator circuit 14, the present signal and the frame-delayed signal as two-dimensionally interpolated at the same two-dimensional interpolation circuit 18, and the field-delayed signal as a two-dimensionally interpolated signal with uniform vertical phase. These three signals are grouped into two signals including a frame difference signal obtained by subtracting the two-dimensionally interpolated present signal from the frame-delayed two-dimensionally interpolated signal at a subtractor 14a and a field difference signal obtained by subtracting the two-dimensionally interpolated present. signal from the field-delayed two-dimensionally interpolated signal at another subtractor 14a, the resulting two signals being inputted to the comparison ROM 14b. Since the field difference signal and tile frame difference signal obtained by subtraction at the subtractor 14a, 14b are inputted to the comparison ROM 14b, the difference between the two difference signals is present in the vicinity of zero due to the characteristics of a video signal, and therefore the comparison ROM 14b can be reduced in size. The use of the comparison ROM 14b thus facilitates generation of a control signal.

Figure 24:
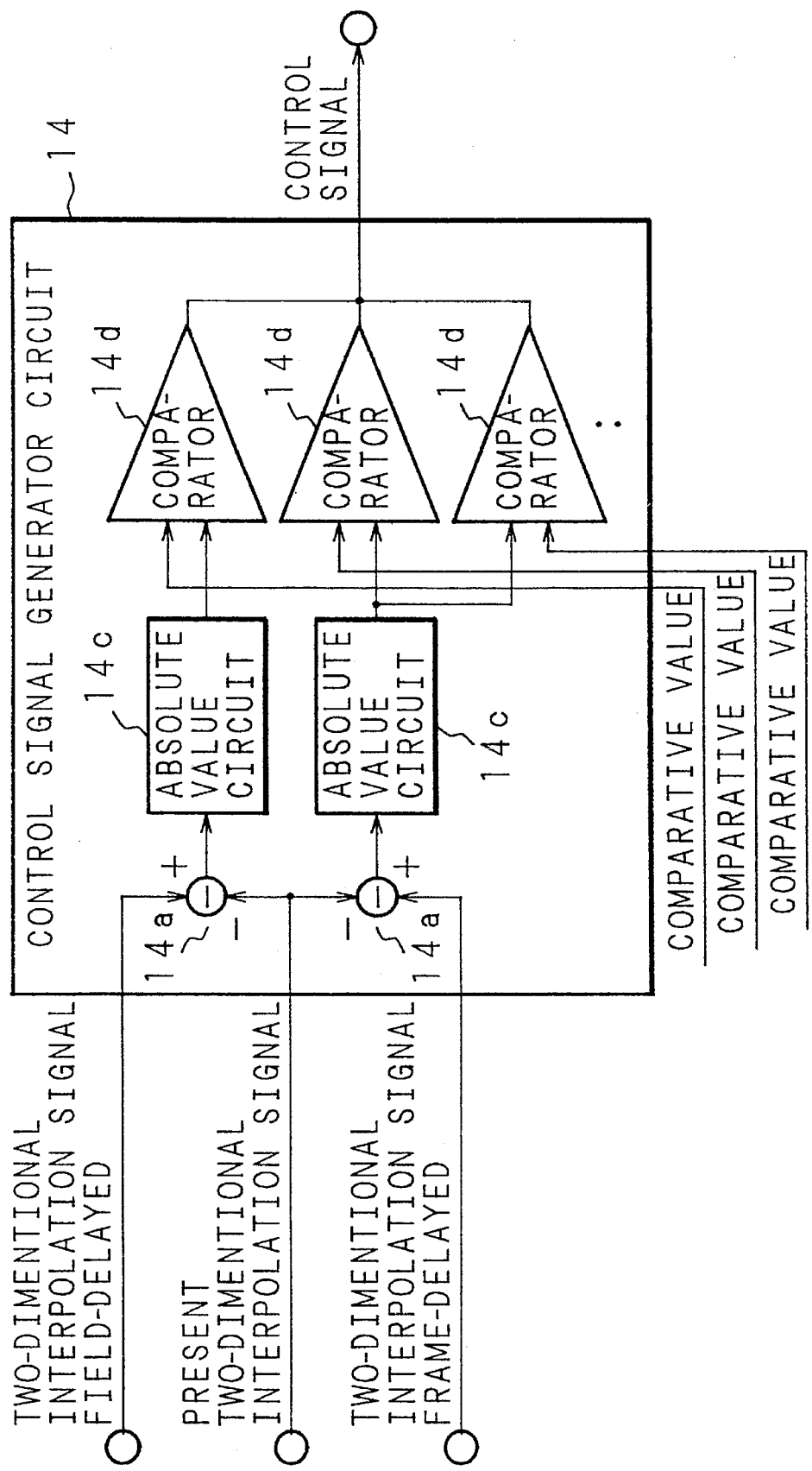
FIG. 24 is a block diagram showing another configuration (tenth embodiment) of a control signal generator circuit of a high definition TV receiver according to the embodiments 7 and 8.

Embodiment 10:

Now, an embodiment 10 (claim 12) will be explained. FIG. 24 is an internal block diagram showing the control signal generator circuit 14 according to the embodiments 7 and 8 (FIGS. 21, 22). In FIG. 24, numeral 14a designates a subtractor for subtracting one signal from the other of two signals in accordance with the sign, numeral 14c an absolute value circuit for determining the absolute value of the output of the subtractor 14a, and numeral 14d a comparator for comparing the output of the absolute value circuit 14c with an externally-settable arbitrary value.

The operation of this embodiment will be explained. The frame difference signal obtained by subtracting the two-dimensionally interpolated present signal from the frame-delayed two-dimensionally interpolated signal at a subtractor 14a and the field difference signal obtained by subtracting the two-dimensionally interpolated present signal from the field-delayed two-dimensionally interpolated signal at the other subtractor 14a are converted into absolute values at the absolute value circuits 14c respectively. Each of the outputs of the absolute value circuits 14c is compared with an externally-settable arbitrary value at each comparator 14d. The output of these comparators 14d is used as a control signal. By setting one input to the comparator 14d as an externally-settable arbitrary value, in the event that the ratio of the MUSE input signal is low, for instance, the arbitrary set value used for comparison with the field difference signal can be changed. In this way, the control signal is generated in such a manner as not to mix the output of the 32.4-MHz interfield interpolation circuit 27 as far as possible, and the apparent ratio of the final output can thus be improved.

In the embodiment 9 described above, a similar effect is attained by switching the outputs of several ROMs in parallel by means of a selector in response to an external signal or by switching the most significant bits of the ROM in response to an external signal.

Figure 25:
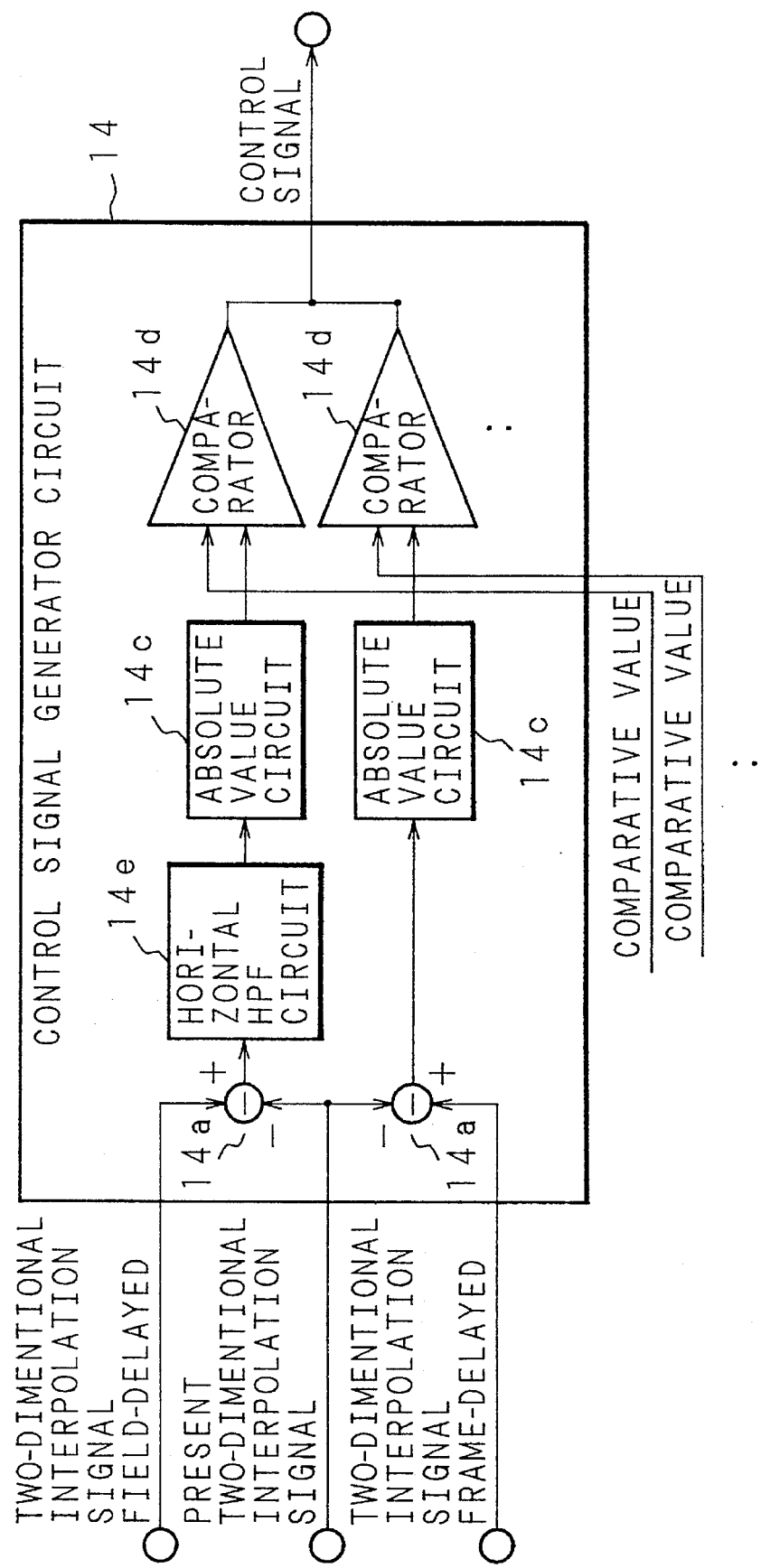
FIG. 25 is a block diagram showing still another configuration (11th embodiment) of the control signal generator circuit of a high definition TV receiver according to the embodiments 7 and 8.

Embodiment 11:

Now, an embodiment 11 (claim 13) will be explained. FIG. 25 is an internal block diagram showing the control signal generator circuit 14 according to the embodiments 7 and 8 (FIGS. 21, 22). In FIG. 25, numeral 14a designates a subtractor for subtracting one from the other of two signals in accordance with the sign, numeral 14e a horizontal HPF for horizontal high-pass filtering the field difference signal, numeral 14c absolute value circuits for determining the absolute value of the outputs of the subtractors 14a, and numeral 14d a comparator for comparing the output of each absolute value circuit 14c with an externally-settable arbitrary value.

The operation of the embodiment 11 will be explained. According to the ninth and embodiments 10, the field difference signal is adjusted in vertical phase by two-dimensionally interpolating of a field-delayed signal and applying the resulting signal to a vertical filter or by the use of a two-dimensional interpolation circuit having at least one more line. The field difference thus becomes conspicuous at high vertical frequencies and distinction from the horizontal high-frequency components is difficult. In order to solve this problem, the field difference signal is applied to the horizontal HPF 14e to remove the horizontal low-frequency component from the vertical high-frequency components. The control signal is thus easily generated at the comparator 14d (or the comparison ROM 14b).

Figure 26:
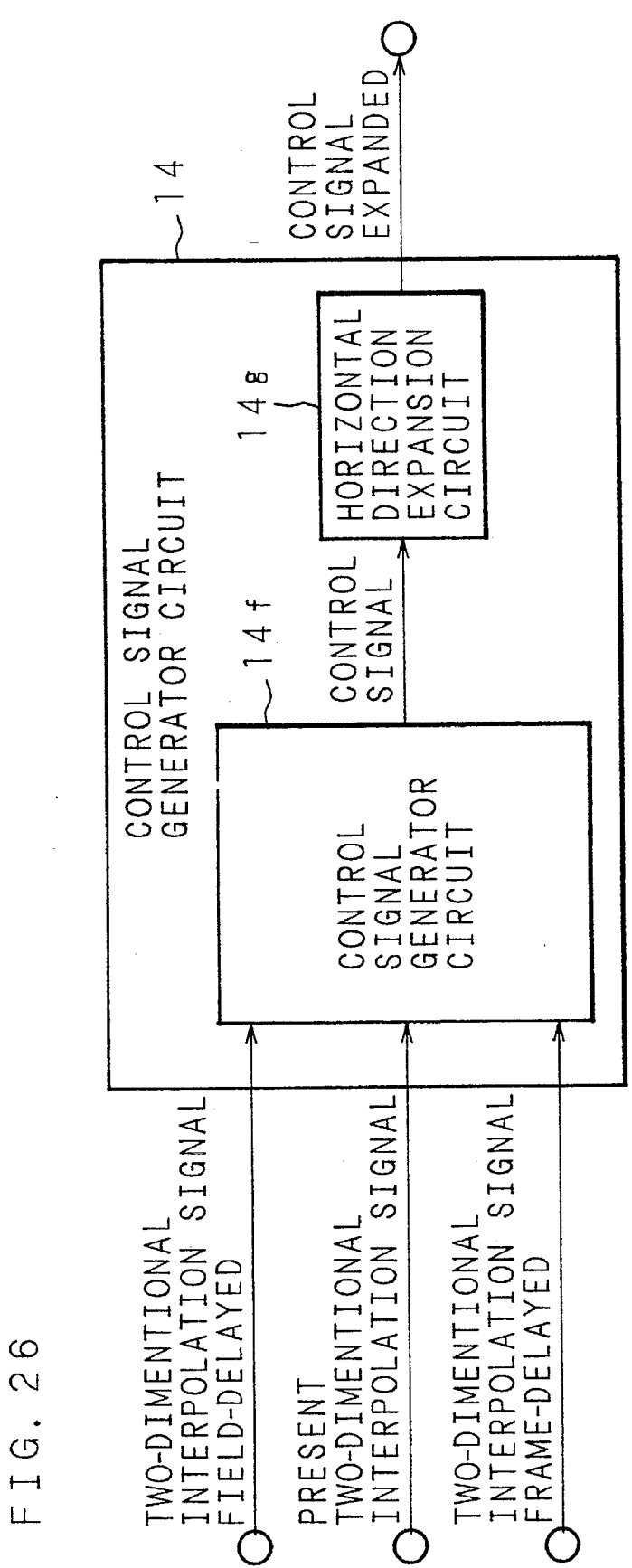
FIG. 26 is a block diagram showing a further configuration (12th embodiment) of the control signal generator circuit of a high definition TV receiver according to the embodiments 7 and 8.

Embodiment 12:

Now, an embodiment 12 (claim 14) will be explained. FIG. 26 is an internal block diagram showing the control signal generator circuit 14 according to the embodiments 7 and 8 (FIGS. 21, 22). In FIG. 26, numeral 14f designates a control signal generator circuit shown in the embodiments 9–11, and numeral 14g a horizontal expansion circuit for expanding the output of the control signal generator circuit 14f in horizontal direction.

The operation of this embodiment will be explained. The output of the control signal generator circuit shown in the embodiments 9–11 is produced in sample units, i.e., in units of 32.4-MHz. In the case where horizontal high-frequency components are existent in succession, for instance, assume that comparison between the frame difference signal and the field difference signal shows the presence of the two and that at a minor level. The control signal is switched in units of 32.4-MHz, and therefore as described above, a field aliasing occurs in the interframe interpolation, and a frame aliasing in the interfield interpolation. As a result, when the control signal is switched in units of 32.4-MHz, the aliasing may be emphasized. In view of this, the control signal is expanded in horizontal direction and is fixed at either the interframe interpolation or the interfield interpolation for a predetermined period. The aliasing can thus be removed stably.

Figure 27:
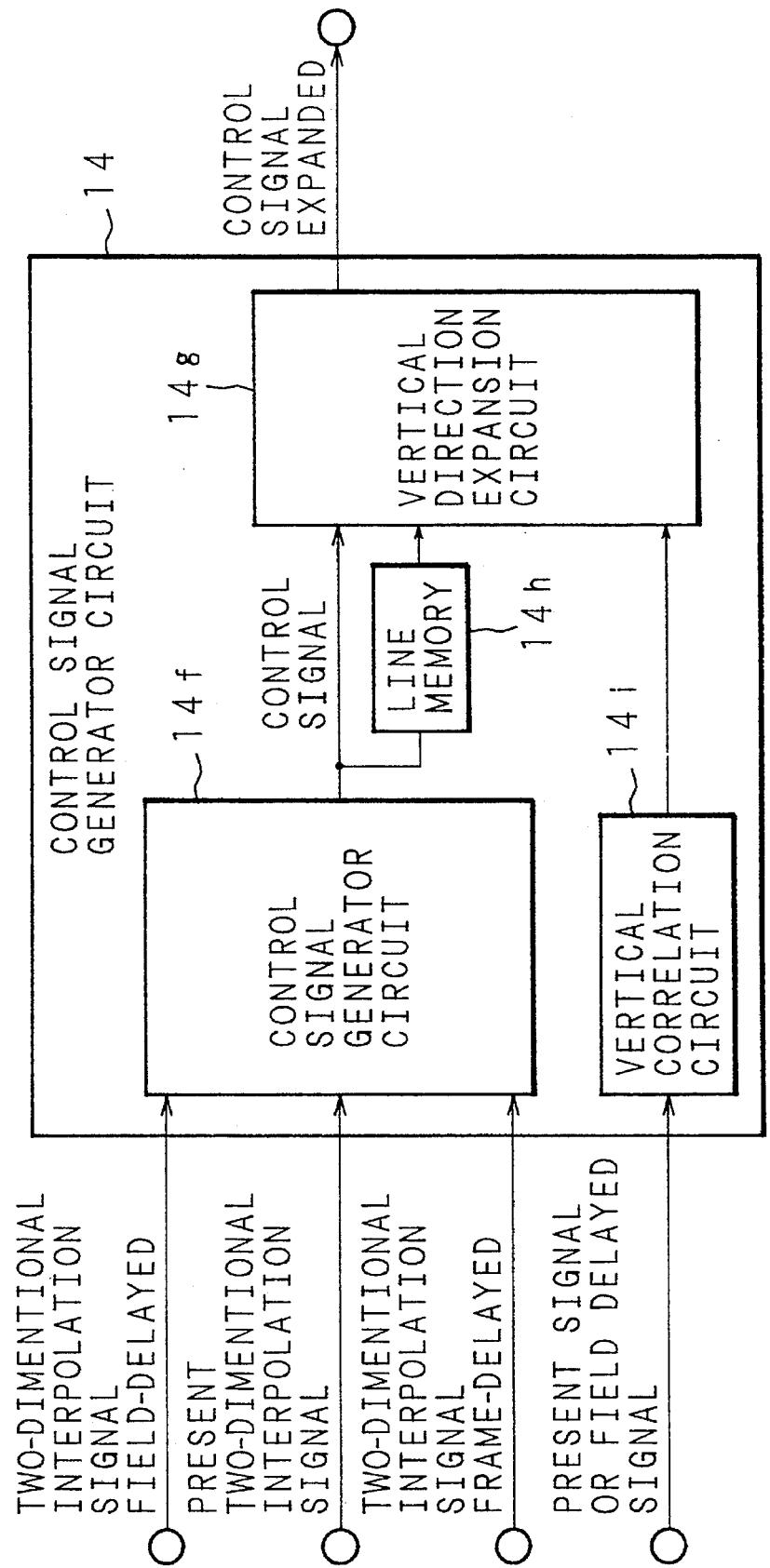
FIG. 27. is a block diagram showing a still further configuration (13th embodiment) of the control signal generator circuit of a high definition TV receiver according to the embodiments 7 and 8.

Embodiment 13:

Now, an embodiment 13 (claim 15) will be explained. FIG. 27 is an internal block diagram showing the control signal generator circuit 14 according to the embodiments 7 and 8 (FIGS. 21, 22). In FIG. 27, numeral 14f designates a control signal generator circuit shown in the embodiments 9–11, numeral 14h a line memory having at least one line, numeral 14i a vertical correlation circuit for determining the vertical correlationship from the present signal or the field-delayed signal, and numeral 14j a vertical direction expanding circuit for enlarging the output of the control signal generator circuit, 14f in vertical direction.

The operation of the embodiment 13 will be described. The control signal generator circuit 14f shown in the embodiments 9–11 is supplied with the two-dimensionally interpolated present signal, the field-delayed two-dimensionally interpolated signal and the frame-delayed two-dimensionally interpolated signal for generating a control signal. The control signal thus generated is delayed by at least one line and the vertical correlationship of the control signal is detected. When the correlationship is high, the control signal is expanded in vertical direction. In this way, when the ratio of the input signal is low, for example, the faulty operation which otherwise might be caused by the noise mixed in the field difference or frame difference signal is prevented by taking the line correlationship. The system performance can of course be improved by taking the correlationship with a greater number of line memories.

Delaying the control signal through a line memory is equivalent to increasing the number of line memories. Since the circuit size is thus increased, the vertical correlationship can be determined from line delay in two-dimensionally interpolating the present signal. This process occurs before the two-dimensional interpolation, and therefore the output represents the correlationship between each two lines and a 16.2-MHz correlationship output. The problem, however, can be obviated by using the horizontal enlarging circuit shown in the embodiment 12. In similar fashion, the correlationship can be detected by the filed-delayed signal. In particular, the field-delayed signal contributes to the detection of the vertical correlationship in view of the many line memories due to the two-dimensional interpolation or vertical filter as shown in the embodiments 7, 8.

Figure 28:
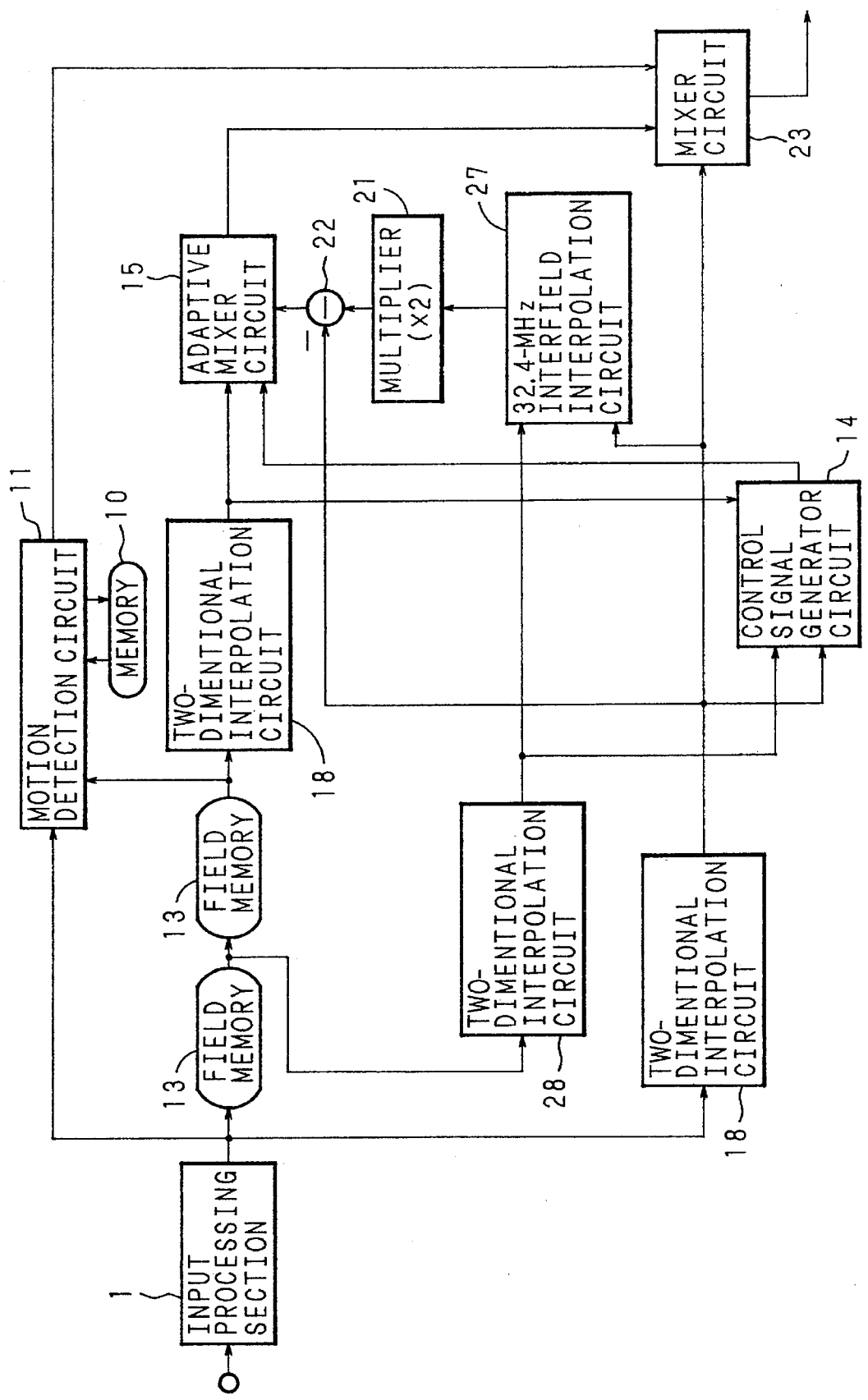
FIG. 28 is a block diagram showing a configuration of a high definition TV receiver according to an embodiment 14 of the invention.

Embodiment 14:

Now, an embodiment 14 (claim 16) will be explained. FIG. 28 is a block diagram showing the configuration of a high definition TV receiver according to the embodiment 14. In FIG. 28, the input processing section 1, the field memories 13, the two-dimensional interpolation circuit 18, the two-dimensional interpolation circuits 28 with many line memories, the control-signal generator circuit 14, the memory 10, the motion detection circuit 11, the 32.4-MHz interfield interpolation circuit 27 and the adaptive mixer circuit 15 are similar to the corresponding component parts in FIG. 22 (embodiment 8), and therefore will not be described further. Numeral 21 designates a double multiplier by bit shift, numeral 22 a subtractor for subtracting the two-dimensionally interpolated present signal from the output; of the multiplier 21, and numeral 23 a mixer circuit for mixing up to the average of the two-dimensionally interpolated present signal and the output of the adaptive mixer circuit 15 from the two-dimensionally interpolated present signal.

The operation of this embodiment will be explained. According to the embodiment 8, the output of the interframe interpolation circuit 3 and the output of the 32.4-MHz interfield interpolation circuit 27 are mixed with each other at the adaptive mixer circuit 15. The control signal used for this mixing is generated at the control signal generator circuit 14 on the basis of the signal obtained by two-dimensionally interpolating the present signal, the field-delayed signal and the frame-delayed signal at the two-dimensional interpolation circuits 18, 28. For this reason, both the interframe interpolation circuit 3 and the two-dimensional interpolation circuit 18 for frame delay are required leading to an increased circuit size. According to the embodiment; 14, the interframe interpolation is performed in such a manner that the present signal and the frame-delayed signal are two-dimensionally interpolated at the two-dimensional interpolation circuit: 18, and are mixed with the two-dimensionally interpolated present signal up to the average between the two-dimensionally interpolated present signal and the frame-delayed two-dimensionally interpolated signal at the mixer circuit 23. The average between the two-dimensionally interpolated present signal and the frame-delayed two-dimensionally interpolated signal is equivalent to the signal obtained by interframe interpolation and two-dimensional filtering. The aliasing component of the frame can thus be removed. Nevertheless, the frequency characteristic is deteriorated by an amount corresponding to the two-dimensional filtering. This configuration reduces the circuit size thereby making possible of interframe interpolation.

When the output of the 32.4-MHz interfield interpolation circuit 27 is used for a still image using the mixer circuit 23, the average is taken with the present signal. In the case where the output of the 32.4-MHz interfield interpolation circuit 27 is doubled and the present signal is subtracted, therefore, the output of the mixer circuit 23 becomes the 32.4-MHz interfield-interpolated output with the average taken with the present signal. By the way, the average between the present signal and the output of the adaptive mixer circuit 25 is taken at the mixer circuit 23 when a still image is detected by the motion detection circuit 11.

Figure 29:
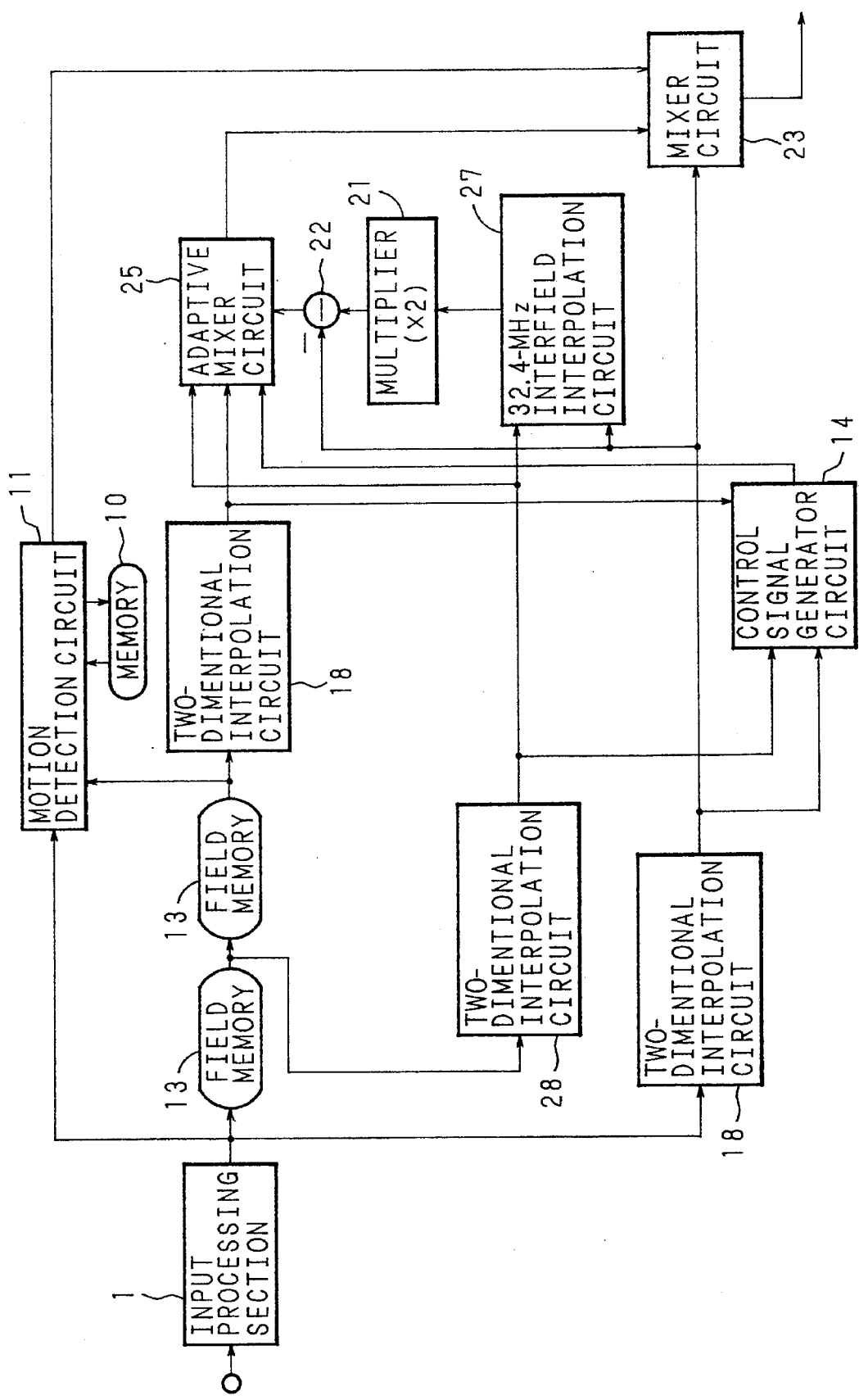
FIG. 29 is a block diagram showing a configuration of a high definition TV receiver according to an embodiment 15 of the invention.

Embodiment 15:

Now, an embodiment 15 (claim 17) will be explained. FIG. 29 is a block diagram showing the configuration of a high definition TV receiver according to the embodiment 15. In FIG. 29 (embodiment 15), the difference from the embodiment of FIG. 28 (embodiment 14) lies in that the signal field-delayed at a field memory 13 and two-dimensionally interpolated at the two-dimensional interpolation circuit 28 with many line memories is inputted to the adaptive mixer circuit 25.

Now, the operation will be explained. In the case where the signal field-delayed at the field memory 13 and two-dimensionally interpolated at the two-dimensional interpolation circuit 28 with many line memories is averaged with the signal two-dimensionally interpolated from the present signal, the field aliasing can be removed, although the horizontal high-frequency components cannot be removed. Taking advantage of this fact, the adaptive mixer circuit 25 is supplied with the 32.4-MHz interfield-interpolated signal doubled and subtracted from by the present two-dimensionally interpolated signal, the signal frame-delayed and two-dimensionally interpolated, and the field-delayed signal two-dimensionally interpolated. Further, the field-delayed two-dimensionally interpolated signal is inserted, while switching to the 32.4-MHz interfield-interpolated signal doubled and subtracted from by the two-dimensionally interpolated present signal and the frame-delayed two-dimensionally interpolated signal As a result, the interframe interpolation can be smoothly switched to the interfield interpolation with substantially the same circuit size.

Figure 30:
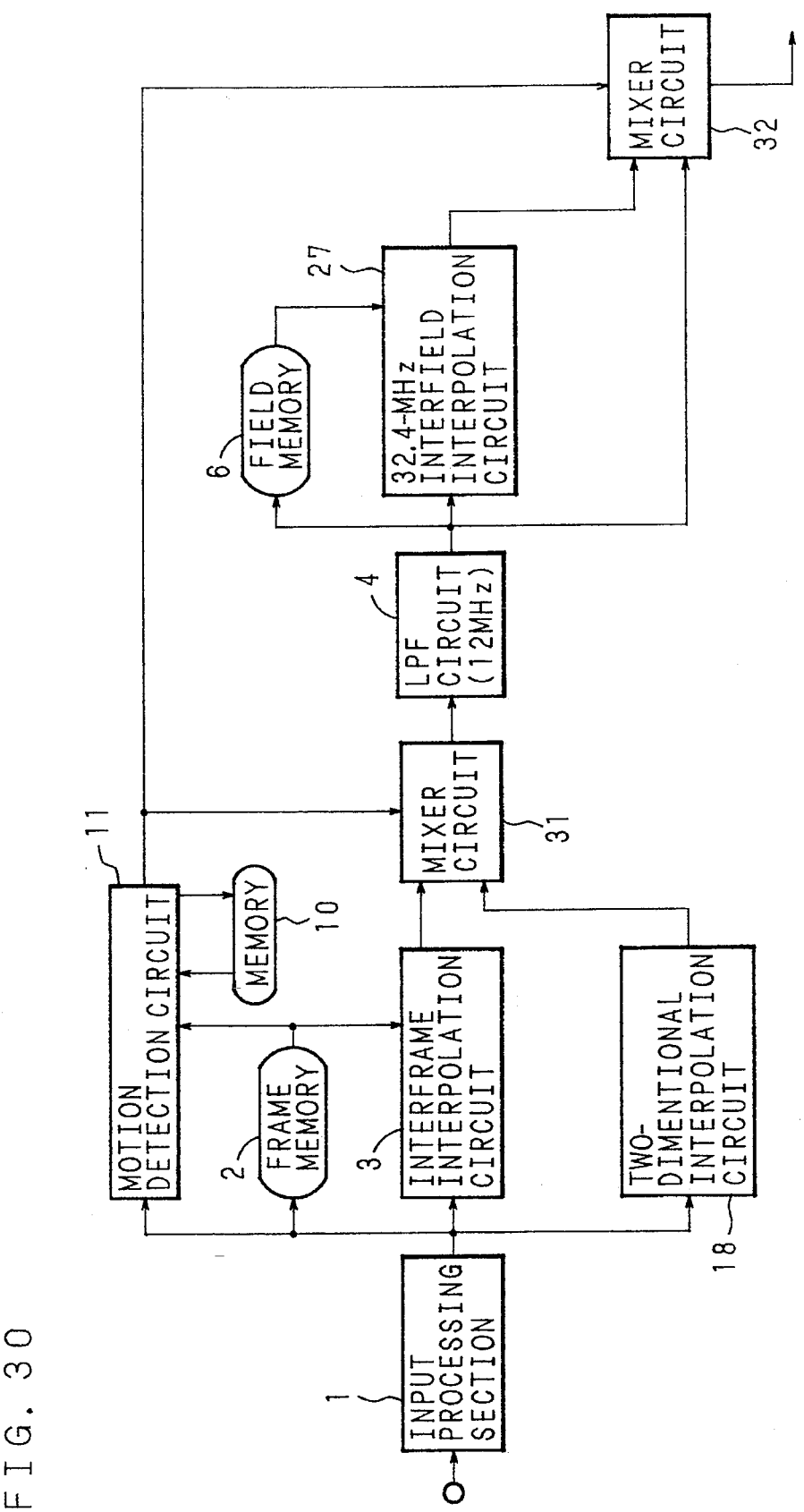
FIG. 30 is a block diagram showing a configuration of a high definition TV receiver according to an embodiment 16 of the invention.

Embodiment 16:

Now, an embodiment 16 (claim 18) will be explained. FIG. 30 is a block diagram showing the configuration of a high definition TV receiver according the embodiment 16. In FIG. 30, the input processing section 1, the frame memory the interframe interpolation circuit, 3, the two-dimensional interpolation circuit 18, the memory 10, the motion detection circuit 11, the LPF circuit 4, the field memory 6, and the 32.4-MHz interfield interpolation circuit 27 are similar to the corresponding component parts respectively in the aforementioned embodiments and therefore will not be described any further. Numeral 31 designates a mixer for mixing the two-dimensionally interpolated present signal with the interframe-interpolated signal in accordance with the output of the motion detection circuit 11, and numeral 32 a mixer for mixing the output of the LPF circuit 4 with the output of the 32.4-MHz interfield interpolation circuit 27 in accordance with the output of the motion detection circuit 11.

The operation of the embodiment 16 will be explained. First, the signal processed in the input processing section 1 is frame-delayed at the frame memory 2, and the signals before and after the delay are subjected to interframe interpolation at the interframe interpolation circuit 3. The signal input-processed in the input processing signal 1 is also two-dimensionally interpolated at the two-dimensional interpolation circuit 18. The interframe-interpolated signal is mixed with the two-dimensionally interpolated signal at the mixer 31 in accordance with the output of the motion detection circuit 11. The signal thus mixed is processed for moving and still images. For the still image, all the information reproducible between frames is reproduced without any aliasing.

Next, the high-frequency component of 12-MHz or higher is removed from the output of the mixer 31 at the LPF circuit 4, the output of which is outputted to the field memory 6 and the 32.4-MHz interfield interpolation circuit 27. The resulting signal and the signal field-delayed at the field memory 6 are subjected to 32.4-MHz interfield interpolation at the 32.4-MHz interfield interpolation circuit 27 as according to the embodiments 1–4. The signal thus interfield-interpolated is mixed with the output signal of the LPF circuit 4 in accordance with the output of the motion detection circuit 11. The mixing operation at the mixer 32 finishes all the MUSE processings including interfield processing of still images.

Figure 31:
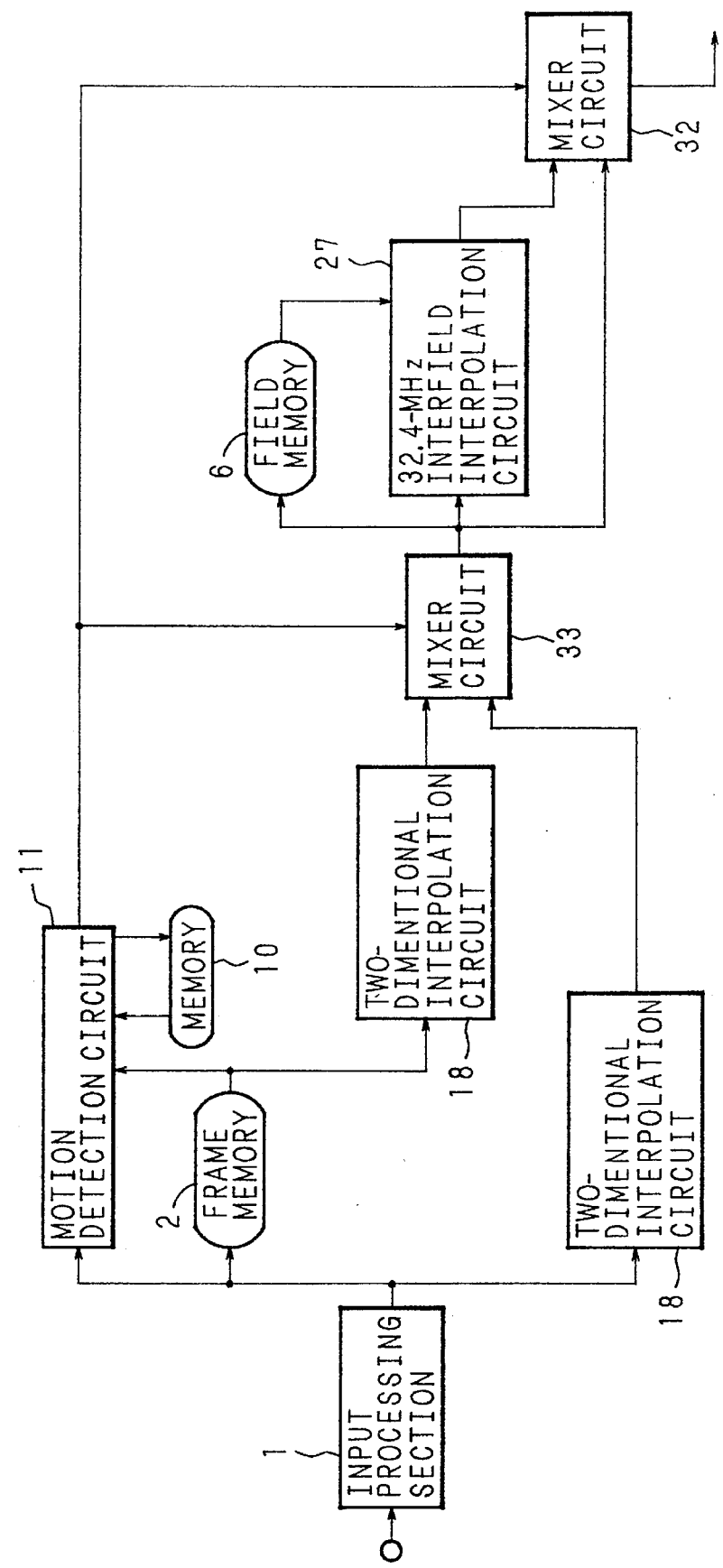
FIG. 31 is a block diagram showing a configuration of a high definition TV receiver according to an embodiment 17 of the invention.

As compared with the prior art, the embodiment under consideration saves the sampling frequency conversion circuit and subjects the interframe-interpolated signal mixed with the moving image signal to interfield interpolation. Therefore, the interfield interpolation circuit can be easily segmented facilitating an LSI configuration Embodiment 17:

Now, an embodiment 17 (claim 19) will be explained. FIG. 31 is a block diagram showing the configuration of a high definition TV receiver according to the embodiment 17. In FIG. 31 (embodiment 17), the difference from FIG. 30 (embodiment 16) resides in that the interframe interpolation circuit 3 is removed, the frame-delayed signal is outputted through the two-dimensional interpolation circuit 18, the mixer 31 is replaced by a mixer 33 for mixing up to the average between the two-dimensionally interpolated present signal and the frame-delayed two-dimensionally interpolated signal from the two-dimensionally interpolated present signal, and the LPF circuit 4 is also removed.

The operation of this embodiment will be explained. The present signal and the frame-delayed signal are two-dimensionally interpolated at the same two-dimensional interpolation circuits 18, 18, and the mixer 33 mixes from the two-dimensionally interpolated present signal up to the average between the two-dimensionally interpolated present, signal and the frame-delayed two-dimensionally interpolated signal. Then the average between the two-dimensionally interpolated present signal and the frame-delayed two-dimensionally interpolated signal is equivalent to the signal subjected to interframe interpolation and the two-dimensional filtering. As a result, the output of the mixer 33 becomes an output that has been interframe interpolated and two-dimensionally filtered. Also, by substituting the interframe interpolation circuit 3 for the two-dimensional interpolation circuit 18, the output thereof can be utilized also for the motion detection circuit 11 thereby to reduce the circuit size.

The output of the mixer 33 is two-dimensionally filtered all the time. When the frequency characteristic of the two-dimensional interpolation circuit 18 is rendered equivalent to the characteristic of the LPF circuit 4 or such as to cut off the frequencies of 12-MHz or higher, therefore, the LPF circuit 4 can be done without, thereby leading to a reduced circuit size.

Figure 32:
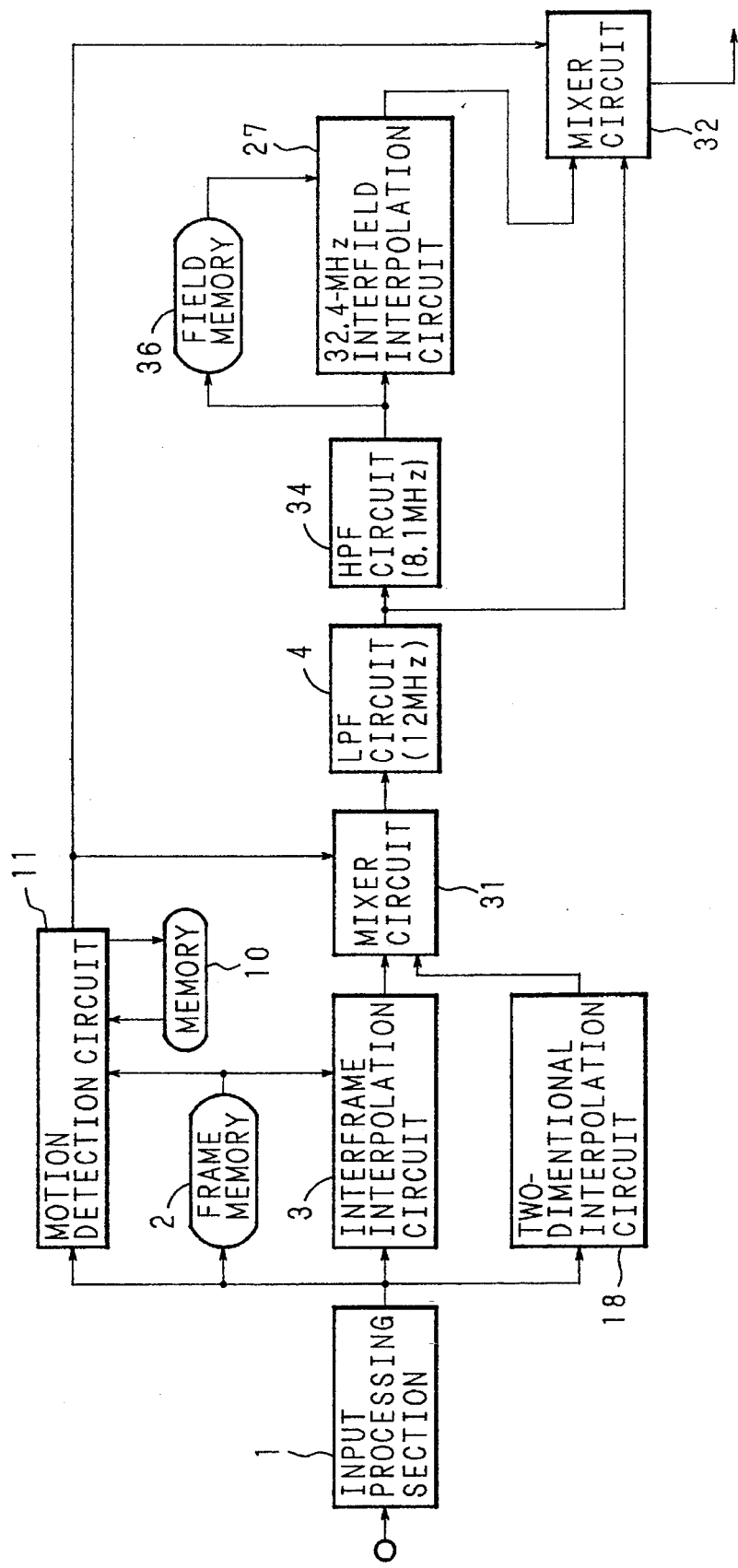
FIG. 32 is a block diagram showing a configuration of a high definition TV receiver according to an embodiment 18 of the invention.

Embodiment 18:

Now, an embodiment 18 (claim 20) will be explained. FIG. 32 is a block diagram showing the configuration of a high definition TV receiver according to the embodiment 18. In FIG. 32 (embodiment 18), the system is different from that of FIG. 30 (embodiment 16) in that an HPF circuit 34 with a threshold frequency of 8.1-MHz is inserted between the LPF circuit 4 and the 32.4-Hz interfield interpolation circuit 27, and the field memory 6 is replaced by a field memory 36 For delaying one field from 8.1-MHz to 12.15-MHz.

The operation of this embodiment will be explained. The signal subjected to interframe interpolation at the interframe interpolation circuit 3 is mixed at a mixer 31 with the signal subjected to two-dimensional interpolation at the two-dimensional interpolation circuit 18. In the signal with the components of 12-MHz or more removed at the LPF circuit 4, the components reproducible as high-frequency components at the 32.4-MHz interfield interpolation circuit 27 are those of 8.1-MHz or higher. It is therefore meaningless to input the components of 8.1-MHz or less to the 32.4-MHz interfield interpolation circuit 27 and the field memory 36. Thus the HPF circuit 34 is inserted after the LPF circuit 4 to remove the components of 8.1-MHz or lower. In view of the fact that the components of 8.1-MHz or lower have been removed at the HPF circuit 34, the band required for field delay is 8.1-MHz to 12.15-MHz. The required band is thus reduced to 1/3 as compared with the prior art. The use of the field memory 36 for delaying one field from 8.1 MHz to 12.15-MHz saves the memory capacity to one third of that of the conventional memories.

A similar effect is obtained by using a field memory for field-delaying from 8.1-MHz to 16.2-MHz, in which case the memory capacity is reduced to one half. Further, the interframe interpolation circuit 3 which was used in the embodiment 17 may be removed, two-dimensional interpolation circuits 18, 18 are inserted for the interframe delay signal and the present signal respectively, and the LPF circuit 4 may be removed with an HPF circuit 34 newly inserted to make up a system having the same effect.

Figure 33:
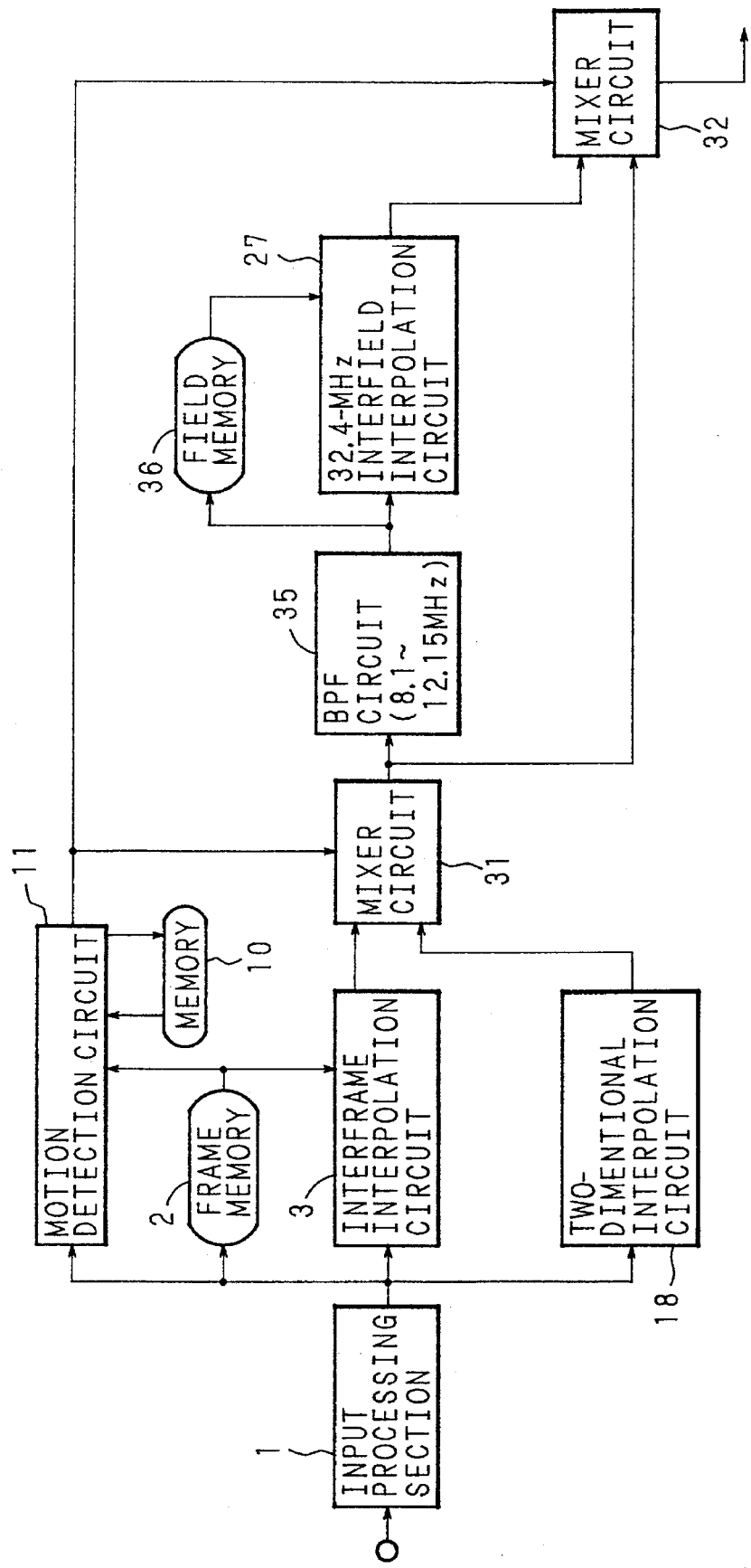
FIG. 33 is a block diagram showing a configuration of a high definition TV receiver according to an embodiment 19 of the invention.

Embodiment 19:

Now, an embodiment 19 (claim 21) will be explained. FIG. 33 is a block diagram showing the configuration of a high definition TV receiver according to the embodiment 19. In FIG. 33 (embodiment 19), the difference from FIG. 30 (embodiment 16) lies in that the LPF circuit 4 is removed, a BPF circuit 35 for passing the band from 8.1-MHz to 12.15 MHz is inserted between the mixer 31 and the 32.4-MHz interfield interpolation circuit 27, and the field memory 6 is replaced by a field memory 36 for delaying one field from 8.1-MHz to 12.15-MHz.

The operation of this embodiment will be explained. As described with reference to the embodiment 18, the components reproducible as high-frequency components at the 32.4-MHz interfield interpolation circuit 27 are those from 8.1 MHz to 12.15-MHz. Once the components from 8.1-MHz to 12.15 MHz have been extracted by the BPF circuit 35, therefore, the field memory 36 can be used for delaying one field from 8.1-MHz to 12.15-MHz thus saving the memory capacity to one third as compared with the prior art.

Also, the same effect can be obtained by using a field memory for field-delaying from 8.1-MHz to 16.2-MHz, in which case the memory capacity saved is one half. Further, a system as shown in the embodiment 17 has a similar effect if a BPF circuit 35 is inserted therein for passing the band from 8.1-MHz to 12.15-MHz.

Figure 34:
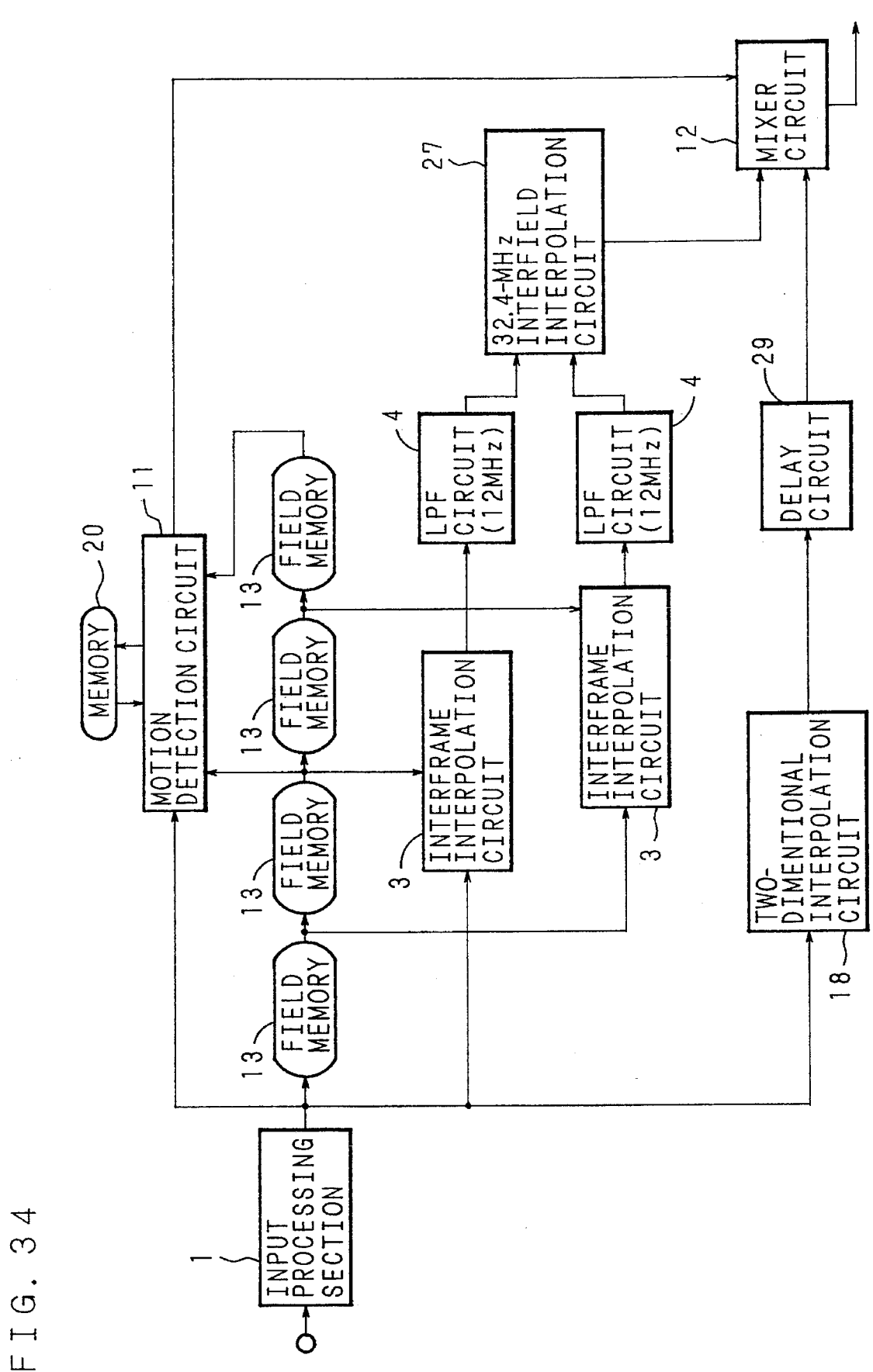
FIG. 34 is a block diagram showing a high definition TV receiver according to an embodiment 20 of the invention.

Embodiment 20:

Now, an embodiment 20 (claim 22) will be explained. FIG. 34 is a block diagram showing the configuration of a high definition TV receiver according to the embodiment 20. In FIG. 34, the input processing section 1, the field memory 13, the interframe interpolation circuit 3, the two-dimensional interpolation circuit 18, the LPF circuit. 4, the 32.4-MHz interfield interpolation circuit 27, the delay circuit 29, the motion detection circuit 11 and the mixer 12 are similar to the corresponding component parts in the above-mentioned embodiments, and therefore will not be described again. The motion detection memory 20, however, has a smaller capacity than the memory 10.

The operation of this embodiment will be explained. Three field memories 13, 13, 13 in series operate in such a manner that a one-field delayed signal, a one-frame delayed signal and a one-field plus one-frame delayed signal are obtained from the signal processed at the input processing section 1. The interframe interpolation circuits 3, 3 perform interframe interpolation between the present signal anti the one-frame delayed signal one the one hand and between the one-field delayed signal and the one-field plus one-frame delayed signal on the other. These two interframe-interpolated signals, which are one field apart from each other, are passed through the LPF circuits 4, 4 thereby to remove the components of 12-MHz or higher, followed by interfield interpolation at the 32.4-MHz interfield interpolation circuit 27.

In this configuration, the field memories 13 have a sampling frequency of only 16.2-MHz as for the present signal. Unlike in the conventional configurations requiring one-field delay at 32.4-MHz for 32.4-MHz interfield interpolation, therefore, the 4M-bit memory of the field memory 6 is done without.

Also, as shown in FIG. 34, all the outputs of the field memory 13 are inputted to the motion detection circuit 11, and the one-frame difference and the two-frame difference can be detected from these outputs for motion detection, thus permitting the field memory 13 to double as the above-mentioned motion detection memory 10. The motion detection memory 20 according to the embodiment 20, therefore, is very compact as compared with the prior art and can thus reduce the memory capacity thereof.

Figure 35:
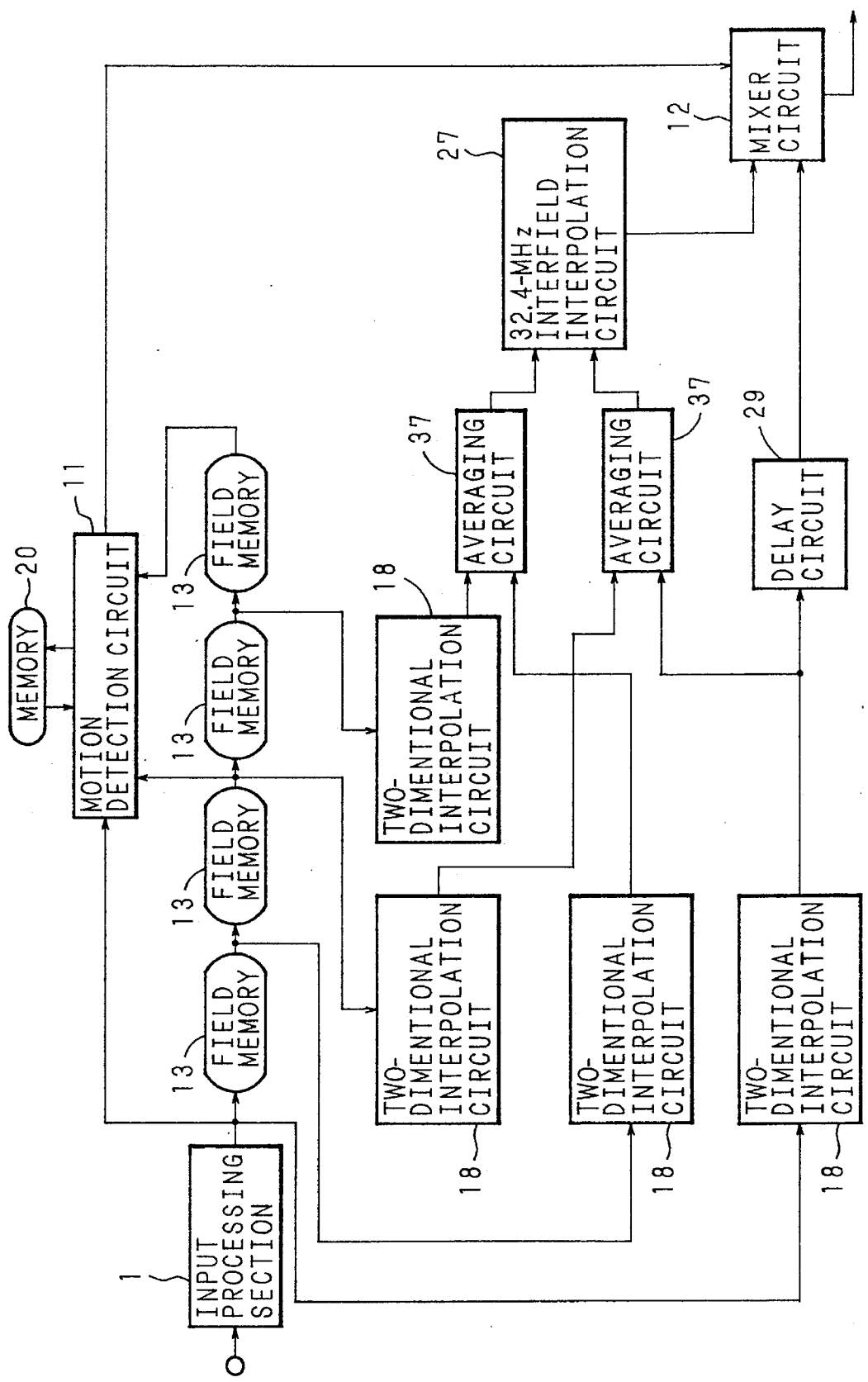
FIG. 35 is a block diagram showing a high definition TV receiver according to an embodiment 21 of the invention.

Embodiment 21:

Now, an embodiment 21 (claim 23) will be explained. FIG. 35 is a block diagram showing the configuration of a high definition TV receiver according to the embodiment 21. In FIG. 35 (embodiment 21), the difference from FIG. 34 (embodiment 20) lies in that the interframe interpolation circuit 3 and the LPF circuit 4 are removed. Instead, two-dimensional interpolation circuits 18, 18, 18, 18 are connected at the output side of the three field memories 13 and the input processing section 1, together with two averaging circuits 37, 37 for averaging the outputs of the two-dimensional interpolation circuits 18, 18, 18, 18. The outputs of the averaging circuits 37, 37 are inputted to the 32.4-MHz interfield interpolation circuit 27.

The operation of this embodiment will be described. As in the embodiment 20, a one-field delayed signal, a one-frame delayed signal and a one-field plus one-frame delayed signal are produced. These signals and the present signal are two-dimensionally interpolated at the two-dimensional interpolation circuits 18, 18, 18, 18. The averaging circuits 37, 37 determine the average between the two-dimensionally interpolated present signal and the one-frame delayed two-dimensionally interpolated signal, and the average between the one-field delayed two-dimensionally interpolated signal and the one-field plus one-frame delayed two-dimensionally interpolated signal. This averaging process is equivalent to two signals being interframe-interpolated and two-dimensionally filtered. Since these two signals are one field apart, they are subjected to interfield interpolation at the 32.4-MHz interfield interpolation circuit 27.

When the two-dimensional interpolation circuits 18 are equivalent in characteristics to the LPF circuit 4 or have characteristics to cut off 12-MHz or higher frequencies, the LPF circuit 4 is done without, thereby reducing the circuit dimensions. Also, in view of the fact that the field memory 13 described with reference to the embodiment 20 is operated with 16.2-MHz, it can double as a motion detection memory. Thus a small-capacity memory 20 can be used for a reduced cost.

Figure 36:
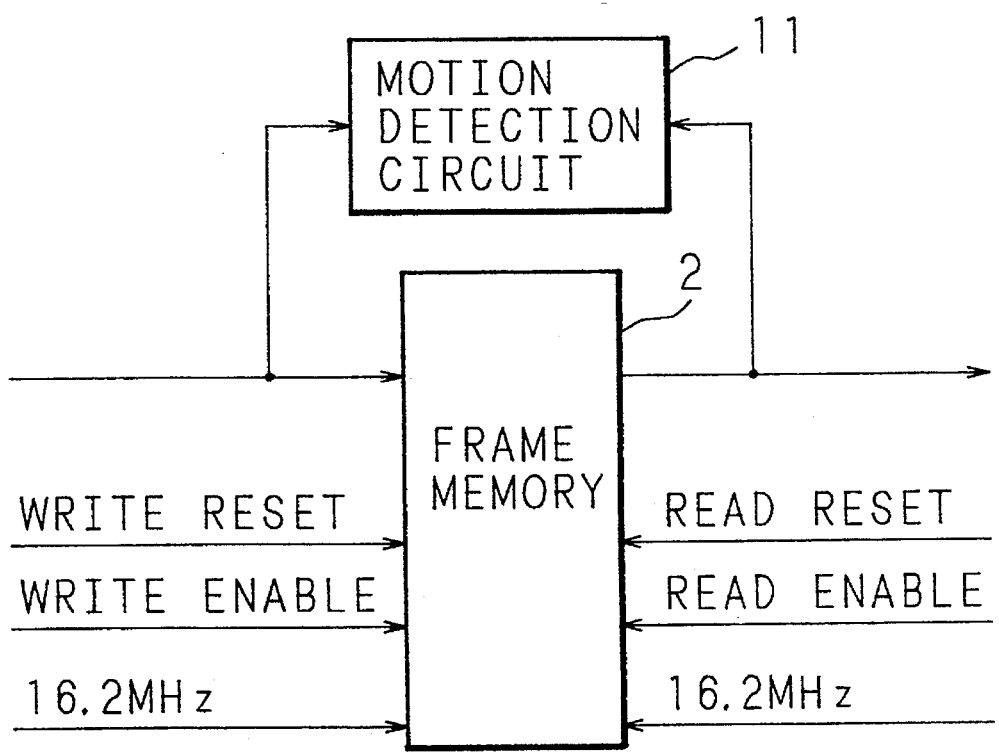
FIG. 36 is a block diagram showing a circuit configuration for motion vector correction of a high definition TV receiver according to an embodiment 22 of the invention.
Figure 37:
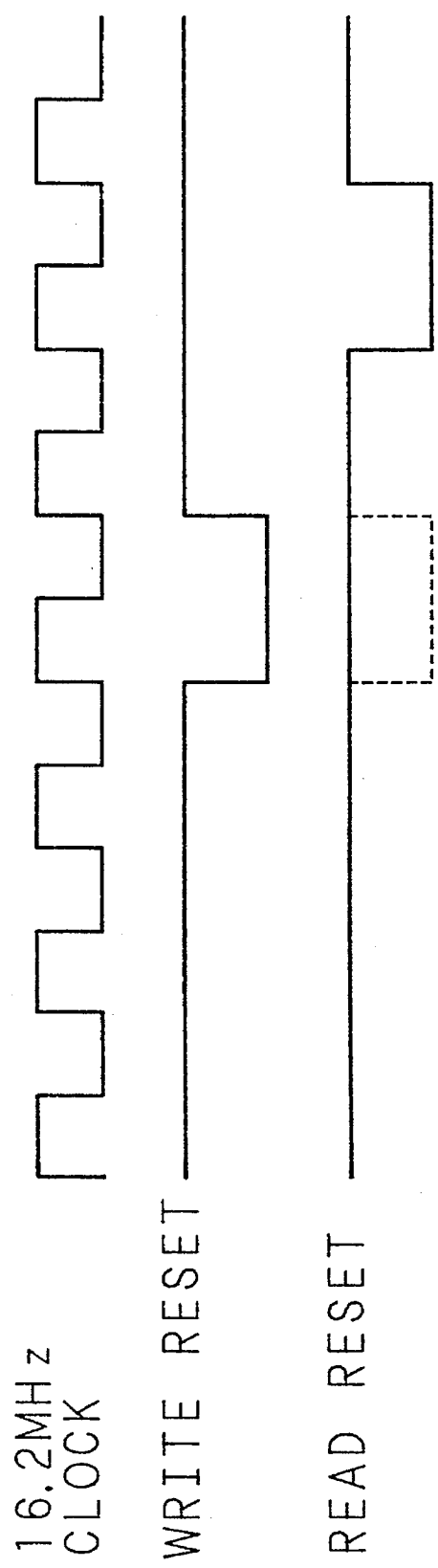
FIG. 37 is a timing chart for motion vector correction of a high definition TV receiver according to the embodiment 22.
Figure 38:
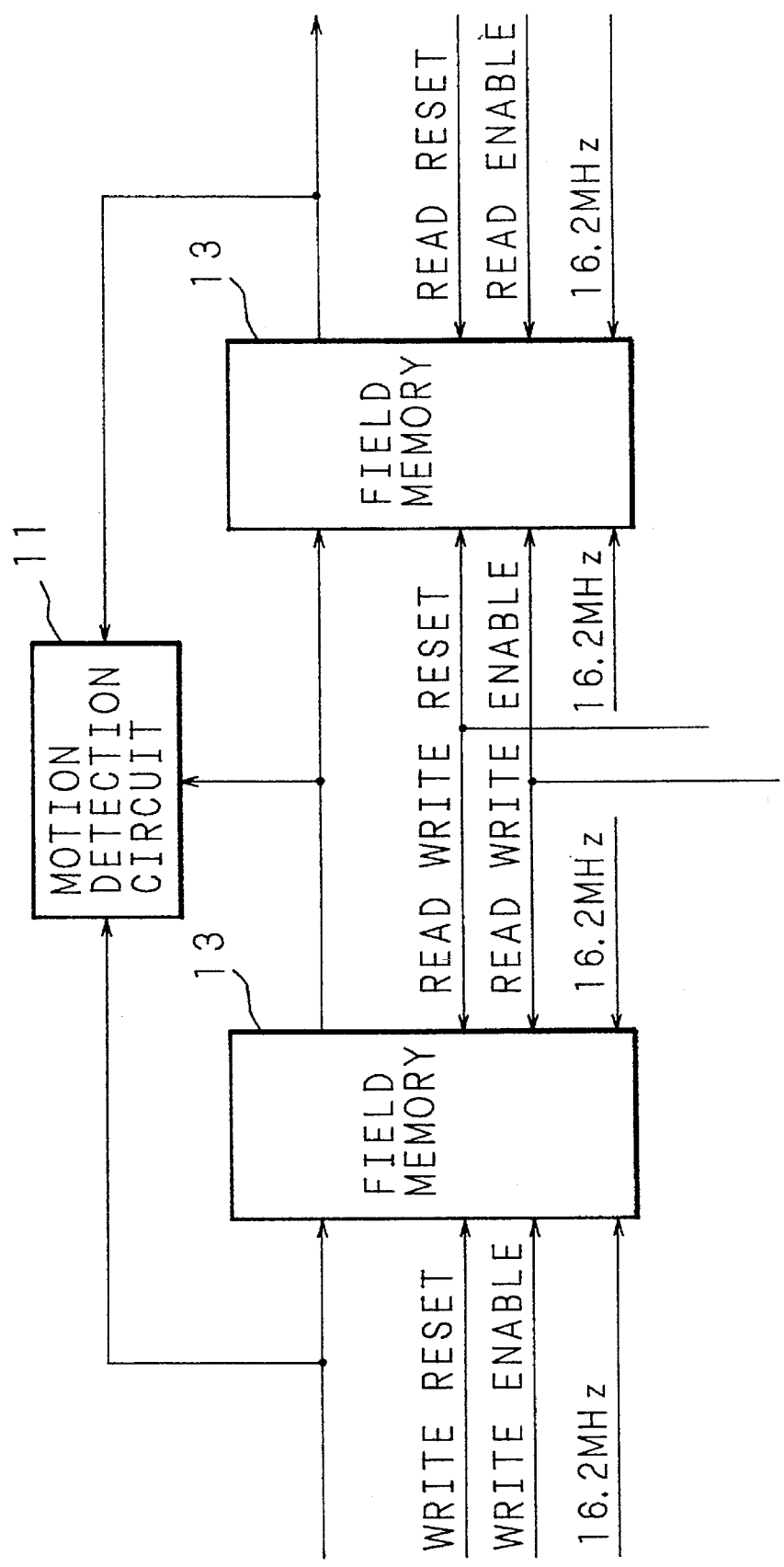
FIG. 38 is a block diagram showing another circuit configuration for motion vector correction of a high definition TV receiver according to the embodiment 22.

Embodiment 22:

Now, an embodiment 22 (claim 24) will be explained. FIG. 36 shows an embodiment using a frame memory, FIG. 37 the timing chart of the embodiment in FIG. 36, and FIG. 38 an embodiment using two field memories. In these diagrams, numeral 2 designates a frame memory, numeral 11 a motion detection circuit, and numeral 13 field memories.

The operation of this embodiment will be explained. The frame memory 2 is a 4-Mbit general-purpose memory of first-in first-out type for delaying by one frame the data of 16.2-MHz sampling frequency subjected to input processings. The effective video data of the MUSE signal is about 4 Mbits (3.86 Mbits) for the frequency of 16.2-MHz, and therefore a 4-Mbit memory can delay one frame. In case of a memory where a delay corresponding to reset intervals occurs when write and read resets are applied in the same way, for example, the one frame delay can be realized by setting the reset intervals to one frame depending on the particular memory.

In such a case, assume that the read reset is delayed with respect to the write set by one clock upon transmission of 2 and by two clocks upon transmission of 4 or advanced by one clock upon transmission of 14 and by 2 clocks upon transmission of 12 in accordance with the one half of an even-numbered signal of the horizontal motion vector signal transmitted. Then, the even number of horizontal motion vectors can be met by the motion detection and the interframe interpolation processings. In the timing chart of FIG. 37, the solid line indicates the case where the horizontal motion vector is 4 and the dashed line when the horizontal motion vector is zero.

Instead of using the frame memory 2 as described above, the field memory 13 may be employed to attain the same effect. In such a case, the field memories 13, 13 of 2M-bit fist-in first-out-type are connected in series with a subsequent-stage memory controlled in read reset.

Apart from controlling a read reset against a write reset memory as described above, the inverse control may be employed with equal effect. In such a case, the control direction is required to be opposite to the preceding case. Also, the read or write reset may be replaced by read or write enable, respectively.

Figure 39:
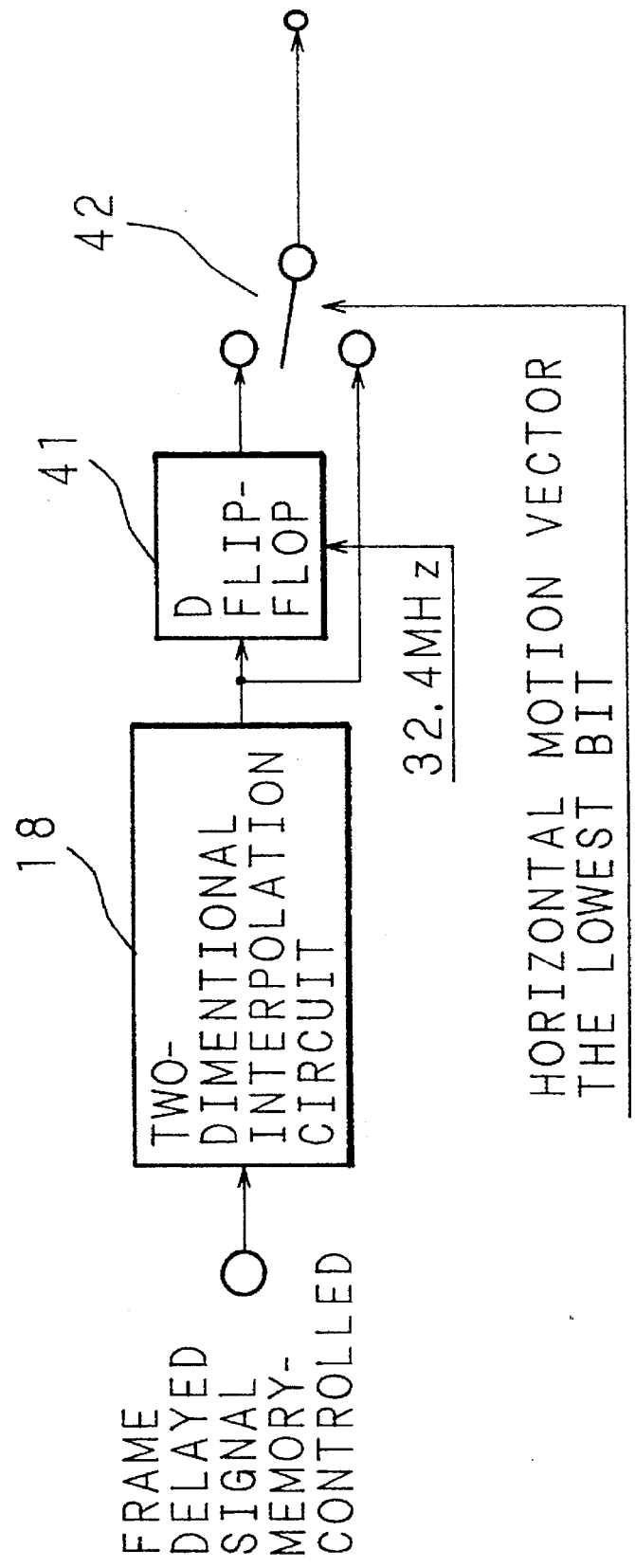
FIG. 39 is a block diagram showing a circuit configuration for motion vector correction of a high definition TV receiver according to an embodiment 23 of the invention.
Figure 40:
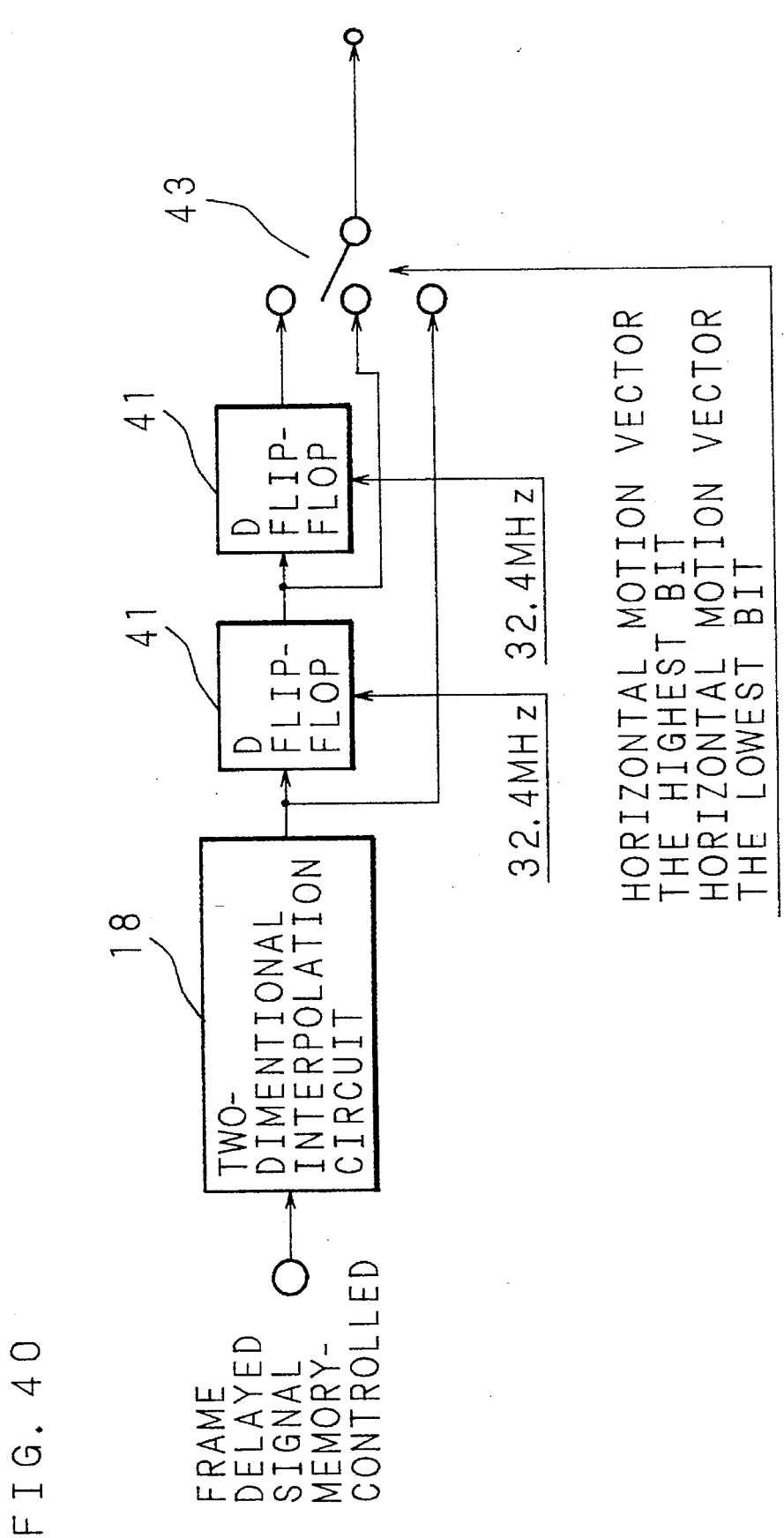
FIG. 40 is a block diagram showing another circuit configuration for motion vector correction of a high definition TV receiver according to the embodiment 23.

Embodiment 23:

Now, an embodiment 23 (claim 25) will be explained. FIGS. 39 and 40 show specific block diagrams showing the embodiment. In the diagrams, numeral 18 designates a two-dimensional interpolation circuit, numeral 41 a D flip-flop activated at 32.4-MHz, numeral 42 a 2-1 selector for selecting one out of two signals, and numeral 43 a 3-1 selector for selecting one out of three signals.

The operation of this embodiment will be explained. In FIG. 39, a frame-delayed signal controlled by memory in accordance with a horizontal motion vector is inputted to and two-dimensionally interpolated by the two-dimensional interpolation circuit 18. The two-dimensional interpolation circuit 18 calculates and transmits the subsample phase of the luminance signal in accordance with the horizontal motion vector on encoder side. The interpolation therefore can be interpolated intact according to the subsample phase. The signal thus two-dimensionally interpolated makes up a 32.4-MHz sample frequency, which is delayed by one clock at the D flip-flop 41, and the signals before and after the delay are inputted to the 2-1 selector 42. The 2-1 selector 42 selects the output of the D flip-flop 42 when the least significant bit of the horizontal motion vector is 1, i.e., when the horizontal motion vector is odd-numbered. When the horizontal motion vector is 1, for instance, memory control is not done but the 2-1 selector 42 selects the output of the D flip-flop 41. When the horizontal motion vector is 3, on the other hand, the memory control handles one clock, to which the 2-1 selector operates accordingly. In this way, the requirements of horizontal motion vector can be completely met.

This is also the case with FIG. 40. When the horizontal motion vector is 0, the 3-1 selector 43 selects a center output (the output of the first-stage D flip-flop 41). When the horizontal motion vector transmitted is any one of odd numbers from 0 to 7, the 3-1 selector 43 selects an output through the two D flip-flops 41, 41; and when the horizontal motion vector is any one of numbers from 8 to 15, it selects the output of the two-dimensional interpolation circuit 18. Between the cases of FIGS. 39 and 40, memory control is different for horizontal motion vectors of 8 to 15. When the horizontal motion vector is 15, for instance, one clock is advanced in FIG. 39, while the clock count remains unchanged in case of FIG. 40.

The horizontal motion vector requirement can thus be met by adding a memory control and simple circuits as shown in FIGS. 39 and 40.

Figure 41:
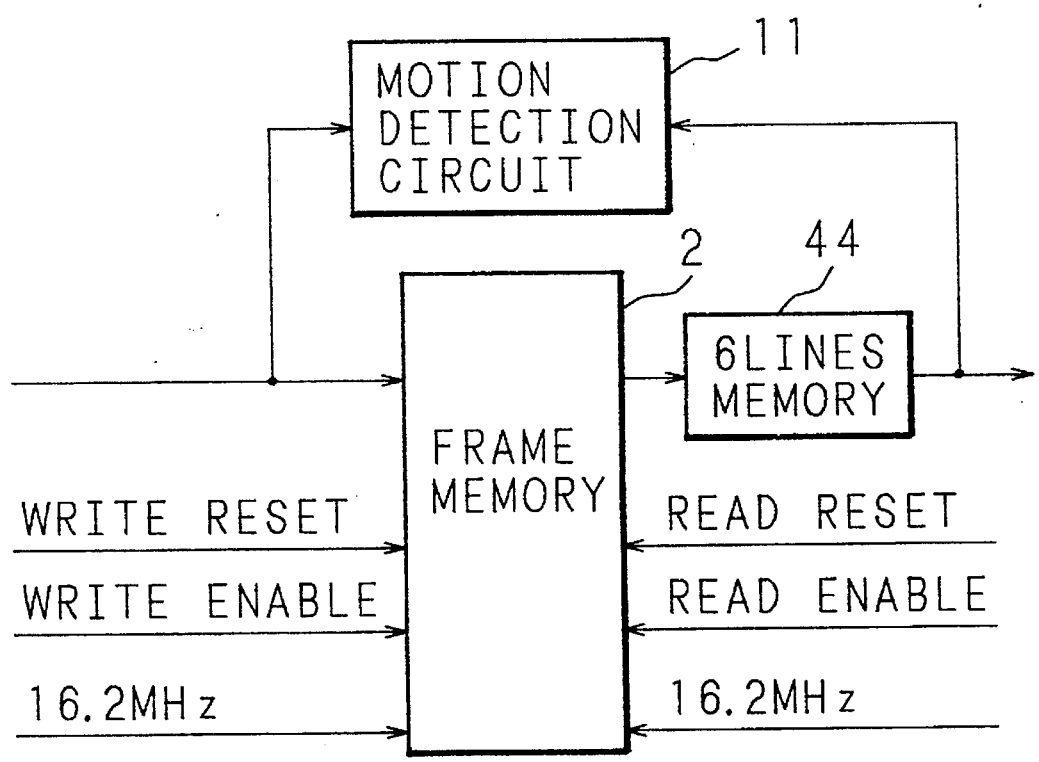
FIG. 41 is a block diagram showing a circuit configuration for motion vector correction of a high definition TV receiver according to an embodiment 24 of the invention.

Embodiment 24:

Now, an embodiment 24 (claim 26) will be explained. FIG. 41 is a specific block diagram showing the embodiment, and FIG. 42 the timing chart of the embodiment in FIG. 41. In FIG. 41, numeral 2 designates a frame memory, numeral 11 a motion detection circuit, and numeral 44 a 6-line memory.

The operation of this embodiment will be explained. Normally, a first-in first-out memory produces an output as it is amenable to the delay up to several hundred clocks for the read control including read reset and read enable as against the write control including write reset and write enable, but not amenable to a greater delay in which case a new data is produced. In view of the need of a maximum delay of 6 lines for the vertical motion vector, the frame memory is connected in series with a line memory of at least 6 lines to accommodate the vertical motion vector.

Figure 42:
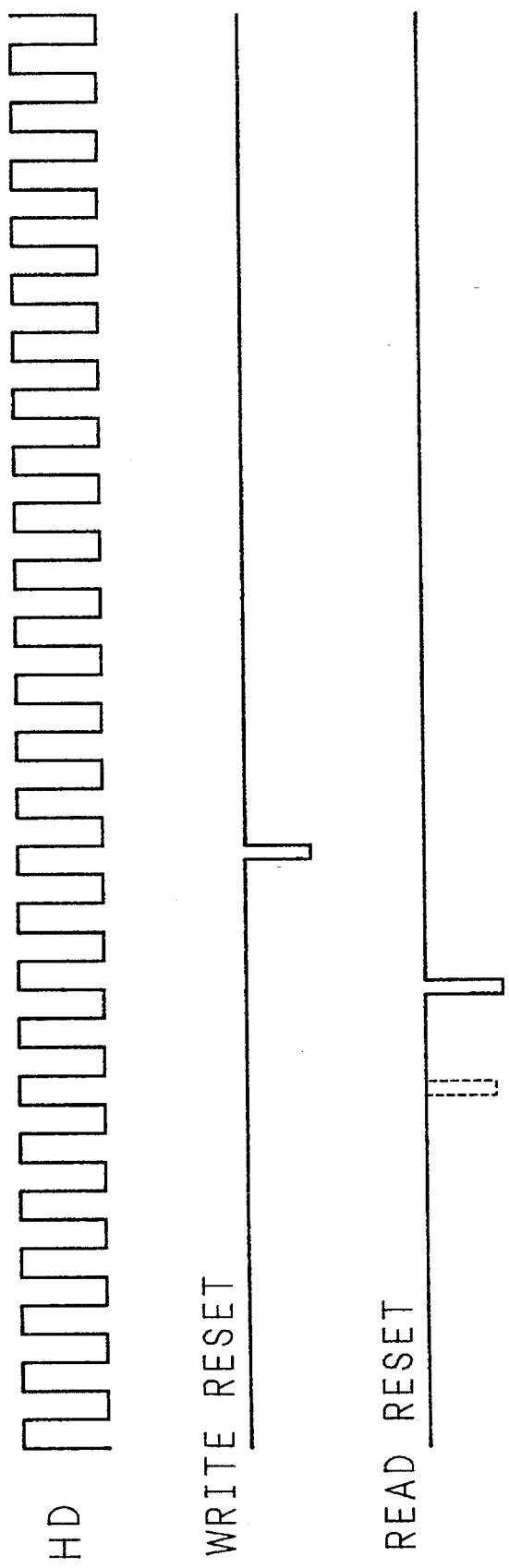
FIG. 42 is a timing chart for motion vector correction of a high definition TV receiver according to the embodiment 24.

In FIG. 41, the frame memory 2 is assumed to be identical to the frame memory described with reference to the embodiment 22. First, assume that the vertical motion vector is 0. If the read reset is controlled six lines shorter than for write reset, the output of the frame memory 2 is a delayed signal six lines shorter than one frame. This signal is delayed by six lines at the 6-line memory 44 in series with the frame memory 2 thereby to delay by one frame. Then, when the vertical motion vector is 2, the read reset is controlled six lines shorter than write reset. Since the delay of 6 lines occurs at the 6-line memory 44, the output of the 6-line memory 44 is a signal delayed by one frame and two lines thereby making it possible to meet the vertical motion requirement. FIG. 42 is a timing chart with the vertical motion vector at 2. The read reset is advanced by four lines from the write reset. The 6-line subsequent delay, however, delays the output of the line memory by one frame plus two lines. The dashed line for read reset represents the case where the vertical motion vector is zero.

Although the foregoing description concerns the frame memory 2, a similar effect is obtained by using the field memory 13. Field memories of 2-Mbit first-in first-out type are used in series and the read reset of the memory in a subsequent stage is controlled.

In the foregoing description, the read reset is controlled against the write reset. Instead, the write reset can be controlled against the read reset with equal effect. In such a case, the direction of control is reversed. The read and write reset can also be replaced by the read and write enable respectively with equal effect.

The manner in which 6-line memories are connected in series as mentioned above is also applicable to the 22nd and embodiments 23 for meeting both the horizontal and vertical requirements.

Figure 43:
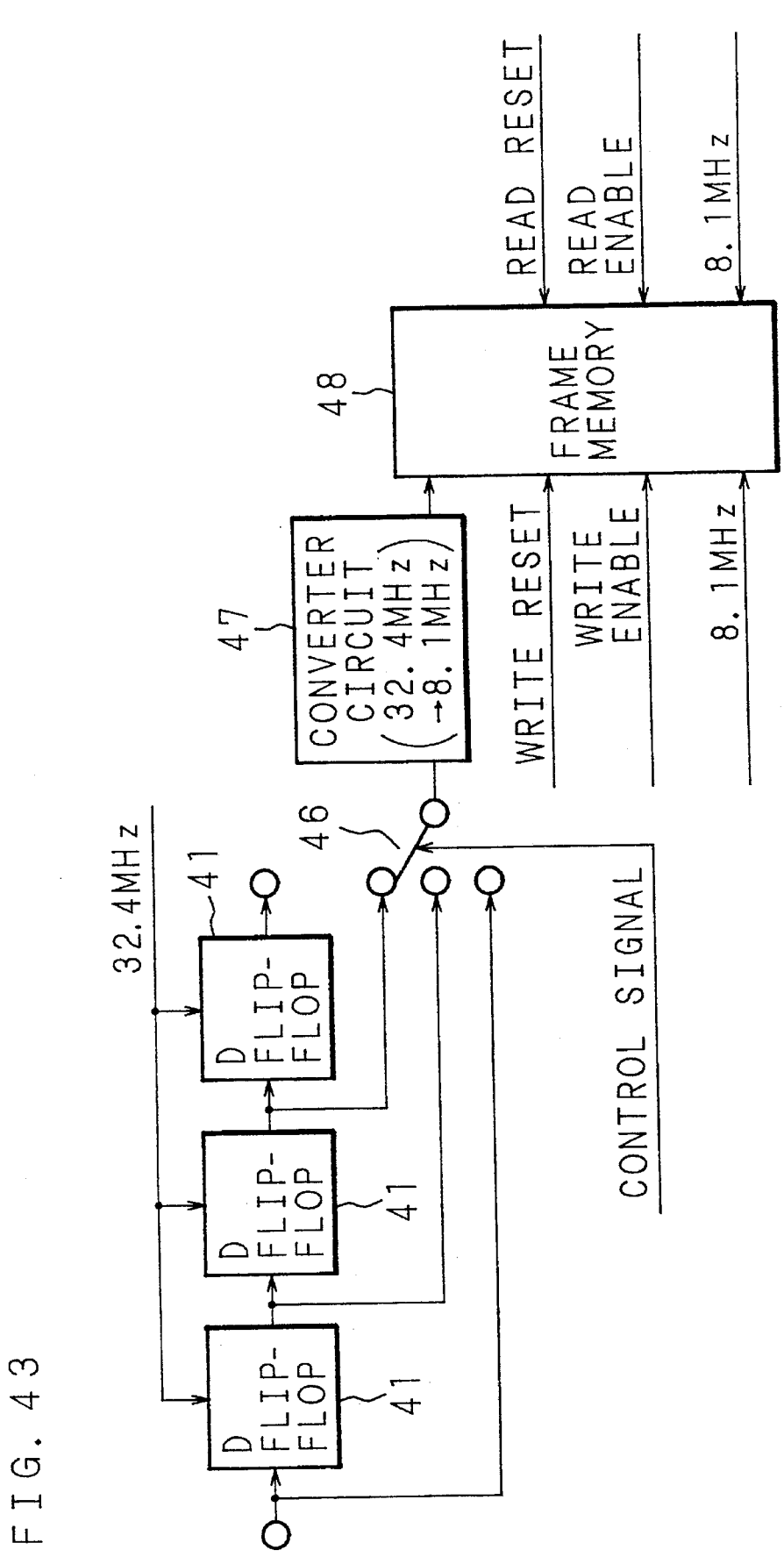
FIG. 43 is a block diagram showing a circuit configuration for motion vector correction of a high definition TV receiver according to an embodiment 25 of the invention.

Embodiment 25:

Now, an embodiment 25 (claim 27) will be explained. FIG. 43 is a specific block diagram showing this embodiment, and FIG. 44 the timing chart of the embodiment in FIG. 43. In FIG. 43, numeral 41 designates a D flip-flop operated at 32.4 MHz, numeral 46 a 4-1 selector for selecting one from four signals, numeral 47 a circuit for converting a 32.4-MHz data to 8.1-MHz, and numeral 48 a frame memory for delaying one frame at 8.1-MHz.

Now, the operation of this embodiment will be explained. In FIG. 43, the input data is subjected to such processings as two-dimensional interpolation into 32.4-MHz. This input data is passed through D flip-flops 41, 41, 41 in three serial stages to delay by three clocks, and the output thereof is supplied to a 4-1 selector 46. The 4-1 selector 46 outputs a signal selected by a control signal, which signal, through a converter circuit 47 for converting 32.4 MHz to 8.1-MHz, is supplied to the frame memory 48 for delaying one frame at 8.1-MHz. The converter circuit 47 may alternatively be a simple decimation circuit.

Figure 44:
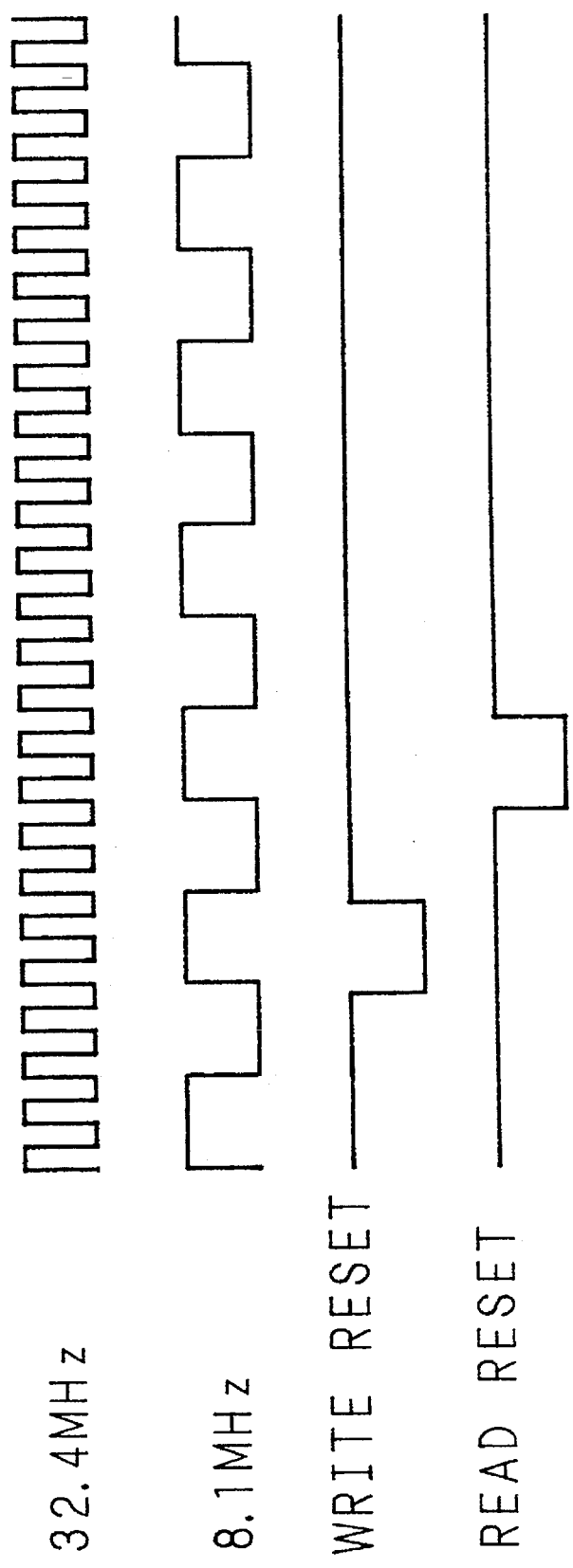
FIG. 44 is a timing chart for motion vector correction of a high definition TV receiver according to the embodiment 25.

In order to accommodate the horizontal motion vector according to the embodiment 25, the read reset and read enable are made variable against the write reset and write enable being the write control as in the embodiment 22 when the horizontal motion vector is a multiple of four, i.e., 0, 4, 8 or 12. FIG. 44 shows the case where the horizontal motion vector is four.

In other cases, the 4-1 selector 46 is controlled in such a way that the 8.1-MHz frequency has the same phase as the 32.4-MHz data irrespective of the presence or absence of the horizontal motion vector in the 32.4-MHz to 8.1-MHz converter circuit 47. When the horizontal motion vector 3 is 3, for example, the 32.4-MHz data is delayed by three clocks behind the preceding frame, so that a series connection of three D flip-flops 41, 41, 41 and appropriate output selection attains a uniform phase. In spite of this, the 4-1 selector 46 is required to be controlled by the use of a sum of products or the like in such a manner that the 32.4-MHz frequency has the same phase as the 8.1-MHz frequency in accordance with the horizontal motion vector sent for each frame. By controlling the 4-1 selector 46 and the 8.1-MHz frame memory concurrently, the horizontal motion vector can be accommodated. As regards the vertical motion vector, on the other hand, a line memory of at least six lines is connected with the frame memory 48 to control the frame memory 48 as in the embodiment 24.

Figure 45:
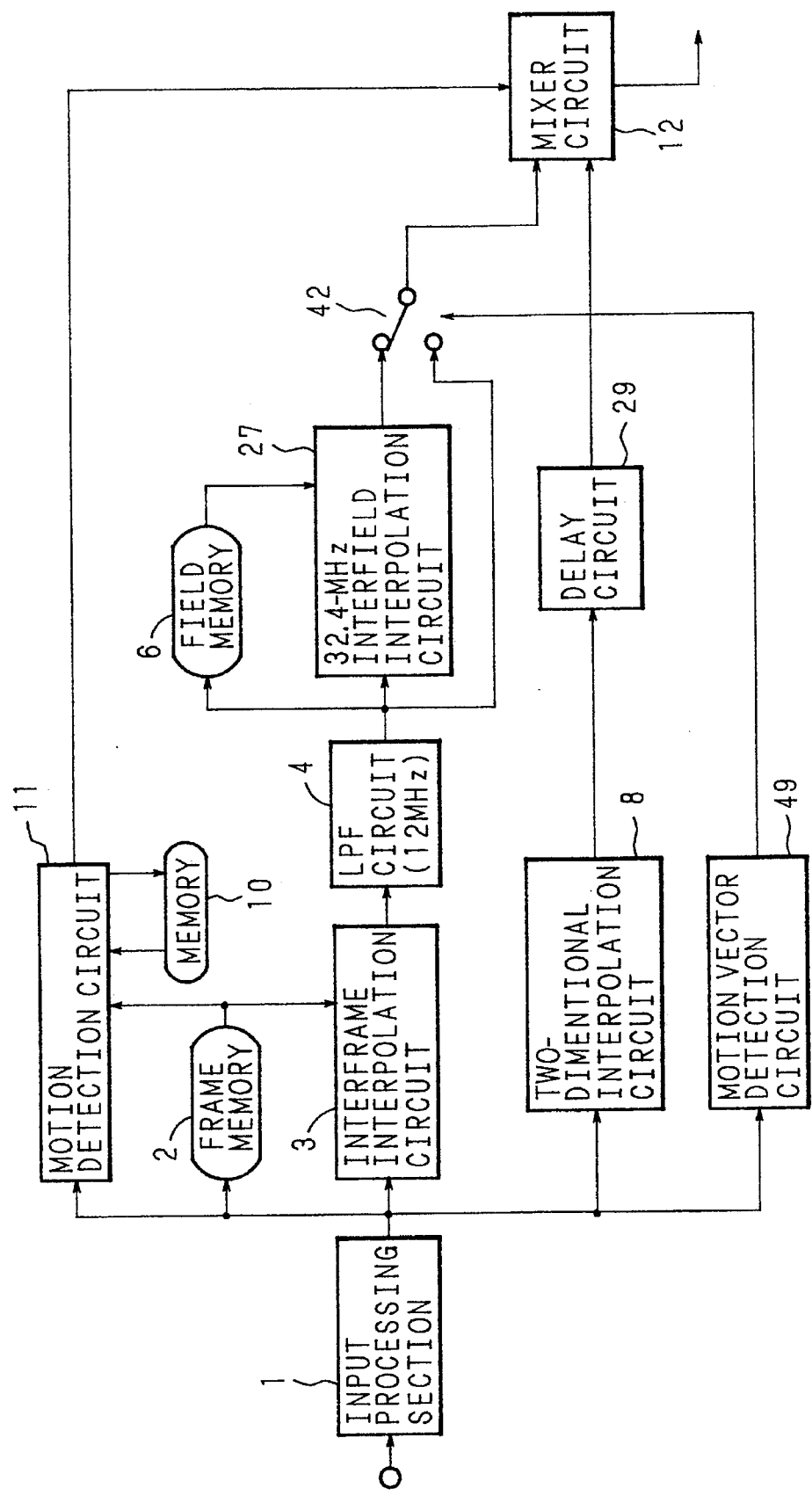
FIG. 45 is a block diagram showing a configuration of a high definition TV receiver according to an embodiment 26 of the invention.
Figure 46:
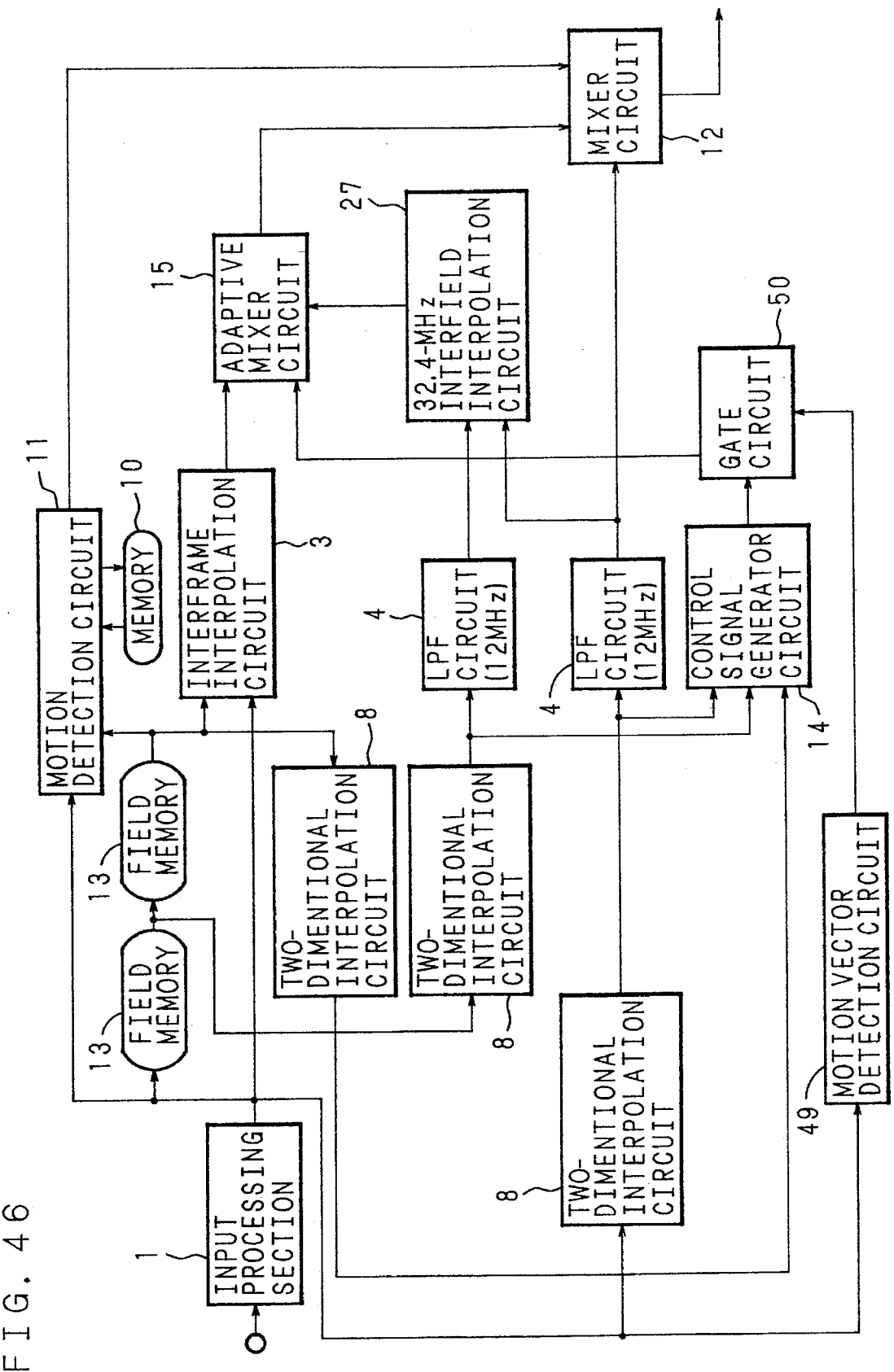
FIG. 46 is a block diagram showing another configuration of a high definition TV receiver according to the embodiment 26.

Embodiment 26:

Now, an embodiment 26 (claim 28) will be explained. FIGS. 45 and 46 are block diagrams showing the configuration of an image reproduction apparatus according to the embodiment 26. In FIGS. 45 and 46, numeral 49 designates a motion vector detection circuit, and numeral 50 a gate circuit.

The operation of this embodiment will be explained. In the MUSE format, the motion vector signal is transmitted in terms of frame, while the motion vector for the field requires calculations on decoder side. For the horizontal motion vector, the interframe motion vector at 32.4-MHz is halved to meet the phase requirement of 24.3-MHz. When this requirement is to be met by 32.4-MHz interfield interpolation, the circuit is complicated, thereby reducing the advantage of a smaller circuit size for the 32.4-MHz interfield interpolation. In case of 32.4-MHz interfield interpolation, therefore, the interframe interpolation meets the motion vector requirement while the interfield interpolation fails to meet, such a requirement according to the system of the embodiment 26.

FIG. 45 shows a system described with reference to the embodiments 1-4, in which the interfield interpolation alone fails to meet the motion vector requirement. A motion vector detection circuit 49 detects which of the horizontal or vertical motion vector is detected by the input processing section 1 or the absence of detection. In the case where a motion vector is detected, the output of the 32.4-MHz interfield interpolation circuit 27 is blocked at the 2-1 selector 42.

FIG. 46 shows a system in which the 32.4-MHz interfield interpolation is inhibited in the presence of a motion vector in the system shown in the embodiment 5. The motion vector detection circuit 49 detects the presence or absence of a motion vector. Upon detection of a motion vector, the control signal of an adaptive mixer circuit 14 is fixed by a gate circuit 50 to the interframe interpolation side, thereby inhibiting the 32.4-MHz interfield interpolation.

Figure 47:
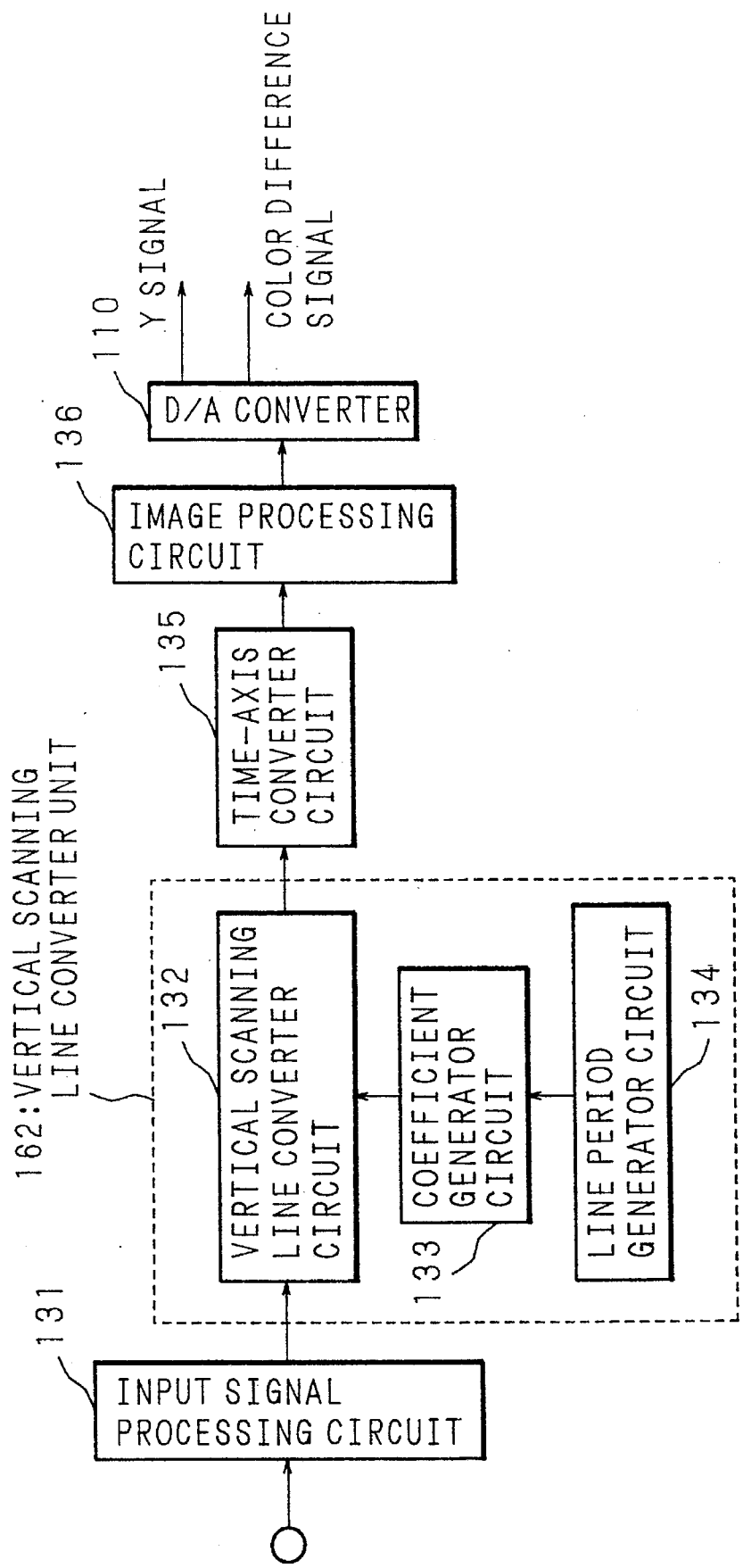
FIG. 47 is a block diagram showing an M-N converter according to an embodiment 27 of the invention.

Embodiment 27:

Now, an embodiment 27 (claim 29) will be explained. FIG. 47 is a block diagram showing a system according to the embodiment under consideration. In FIG. 47, numeral 131 designates an input signal processing circuit for performing such processings as de-emphasis or control signal detection for the MUSE signal inputted thereto, PLL synchronization for resampling or the two-dimensional interpolation of the resampled data. The input processing circuit 131 includes a vertical scanning line converter circuit 132, a coefficient generator circuit 133, and a line period generator circuit 134 for giving the input-processed signal to a vertical scanning line converter unit 162 for changing the number of vertical scanning lines. The vertical scanning line converter unit 162 gives the output signal thereof to a time-axis converter circuit 135 for converting the MUSE signal to NTSC signal on time axis. This signal is further given to an image processing circuit 136 for performing image-processings including contour correction or a blanking signal addition. The digital signal given to a D/A converter 10 is converted to an analog signal.

Figure 48:
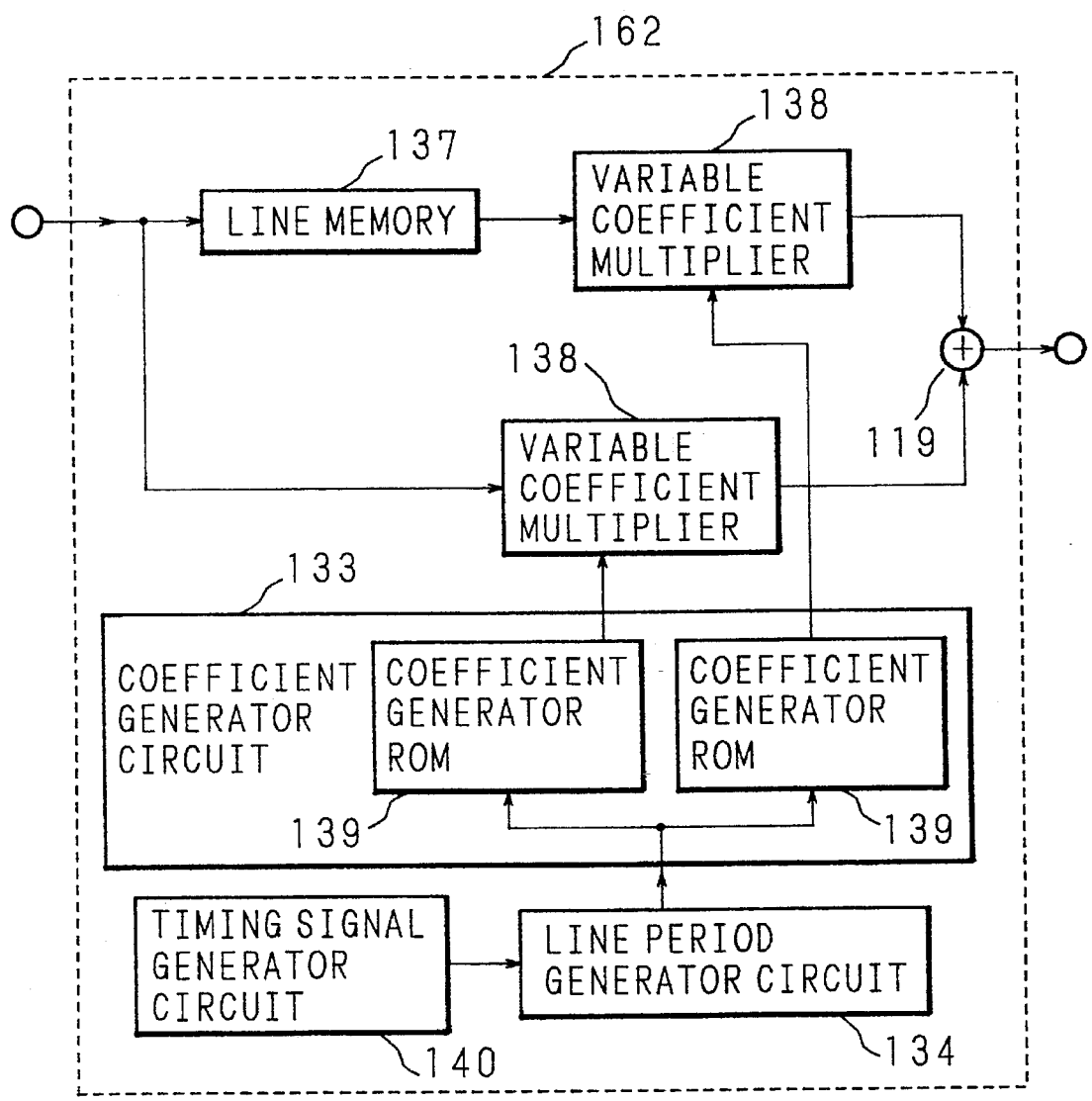
FIG. 48 is a block diagram showing a configuration of a vertical scanning line converter circuit according to the embodiment 27.

FIG. 48 is a block diagram showing a specific example of the vertical scanning line converter unit 162 according to this embodiment. This vertical scanning line converter unit 162 includes a line memory 137 for delaying the luminance signal or the color difference signal in MUSE signal by one line, a variable coefficient multiplier 138 for multiplying the signal by a variable coefficient in accordance with the coefficient supplied from a coefficient generator circuit 133, two coefficient generator ROMs inserted in the coefficient generator 133 for generating a coefficient in accordance with the line from the signal outputted by a line period generator circuit 134, and a timing signal generator circuit 140 for generating a timing signal such as a synchronization signal from the MUSE signal and controlling the line period generator circuit 134.

Figure 49:
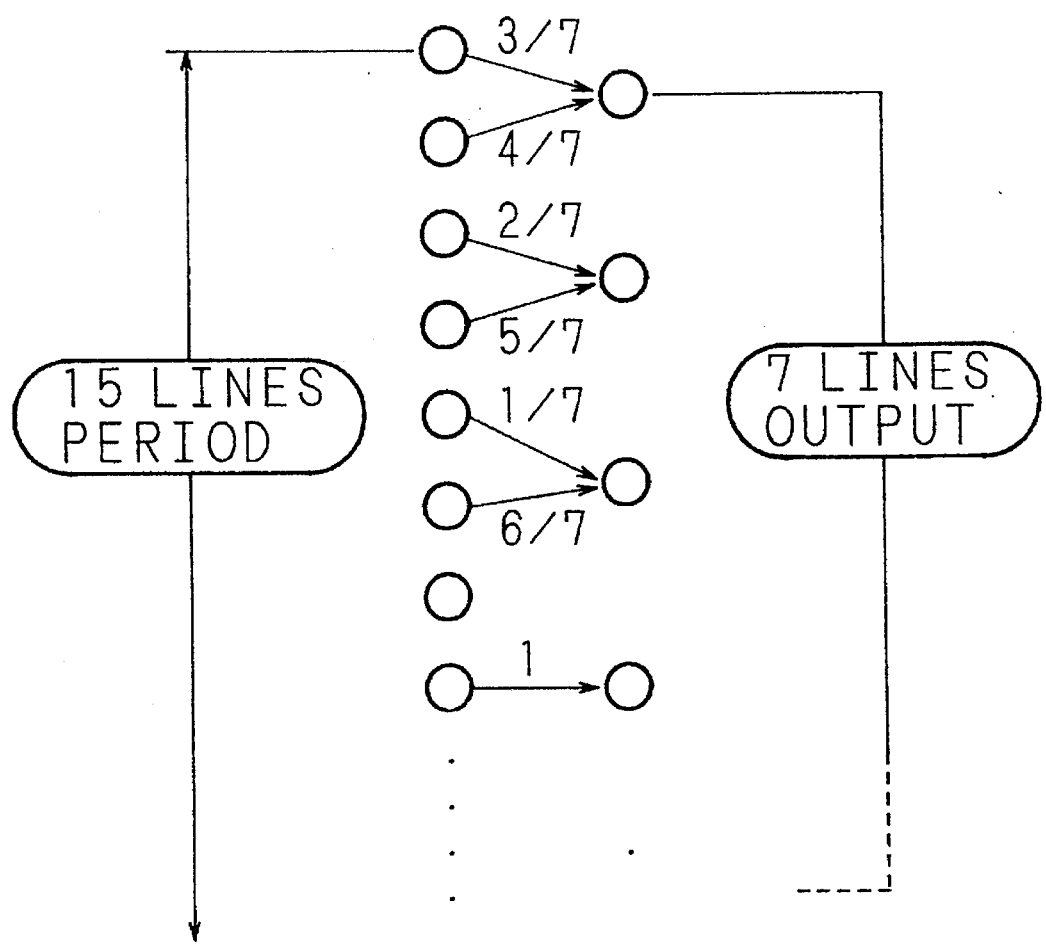
FIG. 49 is a block diagram showing another configuration of the vertical scanning line converter circuit according to the embodiment 27.

FIG. 49 is a diagram for explaining the manner in which the sampling points are converted by the vertical scanning liner converter 162 shown in FIG. 48 as a model. The MUSE format signal has 1032 effective scanning lines. Considering the fact that this figure is three short of 1035 for the high definition TV signal for the convenience of transmission, the number of effective scanning lines for the NTSC format is 483. The percentage of the effective scanning lines is 92% and therefore the ratio of effective scanning lines 15:7 for either format. In other words, by converting the effective scanning lines for MUSE signal to 7/15, i.e., by preparing seven out of the 15 scanning lines of the MUSE signal, the number of 483 is obtained thereby making possible entire vertical reproduction on the NTSC monitor.

The vertical scanning line converter unit 162 shown in FIG. 48 represents the simplest configuration for 7/15 conversion. The operation with this conversion will be explained. The signal representing 1035 lines subjected to signal processing such as de-emphasis and two-dimensional interpolation at the input signal processing circuit 131 is inputted to the vertical scanning line converter circuit 132. The signal representing the initiation of the line to be converted at the timing signal generator circuit or the start of the video signal is inputted to the line period generator circuit 134. The line period generator circuit 134 outputs the signal associated with 1 to 15 at 15-line intervals iteratively to the coefficient generator circuit 133. A coefficient generator ROM 139 outputs coefficients of 1/7 to 1 (including 0) to the variable coefficient generator 138, in which the coefficient input-processed appropriately is multiplied by the same signal delayed by one line at the line memory 137. In this case, the two variable coefficient generators 138 are identical to each other, although the coefficient to be multiplied is different as shown in FIG. 49 and the sum of the two coefficients is designed to be 1. As a result, the scanning lines are converted from 15 to 7 at the vertical scanning line converter circuit 132.

Figure 50:
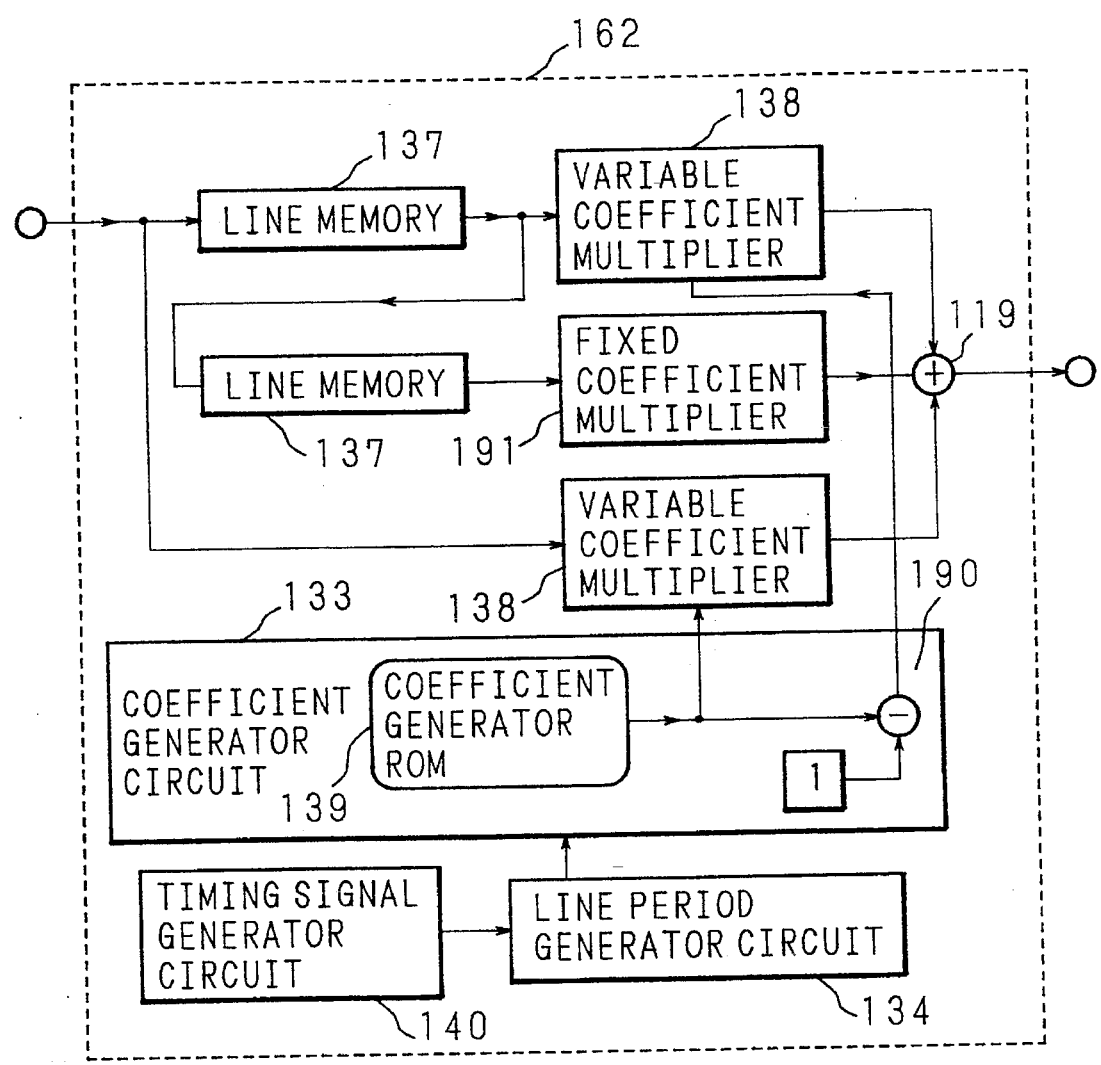
FIG. 50 shows a model of sampling points in the vertical scanning line converter circuit shown in FIG. 48.
Figure 51:
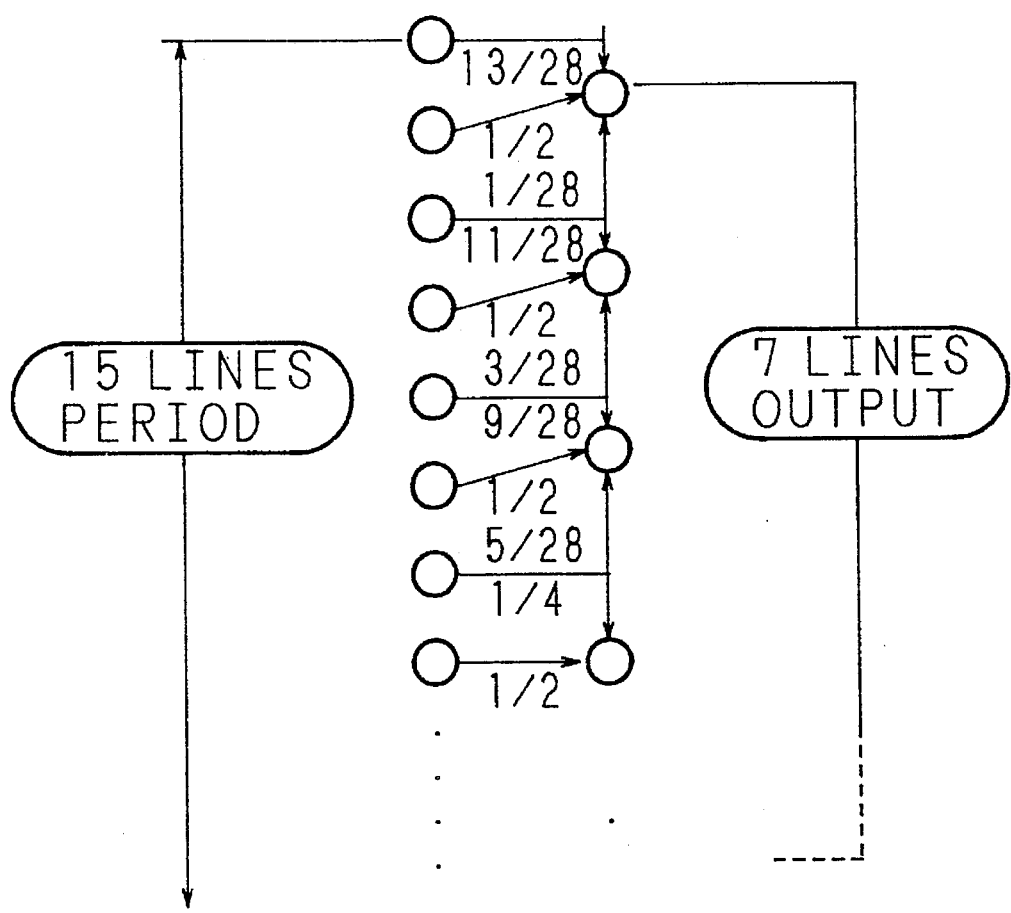
FIG. 51 shows a model of sampling points in the vertical scanning line converter circuit shown in FIG. 49.

FIG. 50 is a block diagram showing another example of the vertical scanning line converter unit 162. The coefficient generator circuit 133 shown in FIG. 48 includes two coefficient generator ROMs 139. The coefficient generator circuit 133 shown in FIG. 50, however, includes a coefficient generator ROM 139 and an arithmetic circuit 190. Further, the input signal passed through the two line memories 37 and the fixed coefficient generator 191 are added together at the adder 119. In this way, the filter characteristic for generating seven out of 15 lines is improved using three linear interpolations. FIG. 51 shows the manner in which the sampling points are converted by the vertical scanning line converter unit 162 shown in FIG. 50 as a model. As shown in FIG. 51, the coefficient is changed from 1/28 to 13/28. Basically, however, the principle remains unchanged as the coefficient changes at intervals of 15 lines. In this way, the signal subjected to scanning line conversion is converted in time axis at the time-axis converter circuit 135, image-processed at the image processing circuit 136 and converted into an analog signal at the D/A converter 110, thereby attaining the reproduction with total conversion along vertical direction on the NTSC monitor.

The foregoing description concerns the full mode and the zoom mode for converting the scanning lines to 483. In spite of this, a similar conversion is possible in also the wide mode. The wide mode is for converting to the scanning lines ¾ of that for the full or zoom mode in order to maintain the roundness. Therefore, the 7/20 conversion by multiplying 7/15 by ¾ is made or the conversion to 7/15 is followed by conversion to ¾. More specifically, in order to generate seven out of 20 scanning lines, the line period generator circuit 134 generates a signal representing one to 20 lines at intervals of 20 lines, and the resulting signal is outputted to the coefficient generator circuit for generating controlling coefficients of 1/7 to 1 (including 0). The wide mode thus can be attained. On the other hand, the same result is obtained by converting from 15 to seven lines by the aforementioned scanning line conversion followed by generating three out of four scanning lines.

The variable coefficient generator in this embodiment is realized by the use of a multiplier or a ROM and an arithmetic circuit. Once ROMs for 1/15, 2/15 and 3/15 conversion are prepared, for example, the rest is to multiply a coefficient simply by additions and subtractions. Although this embodiment includes a very simple vertical scanning line converter circuit, the aliasing distortion due to scanning line conversion can be reduced when the linear interpolation between a greater number of lines is used. Apart from the two-dimensional interpolation effected at the input signal processing circuit 131 shown in the embodiment under consideration, the vertical scanning line converter circuit 132 may also perform the two-dimensional interpolation at the same time, in which case the line memory can be reduced in capacity.

Figure 52:
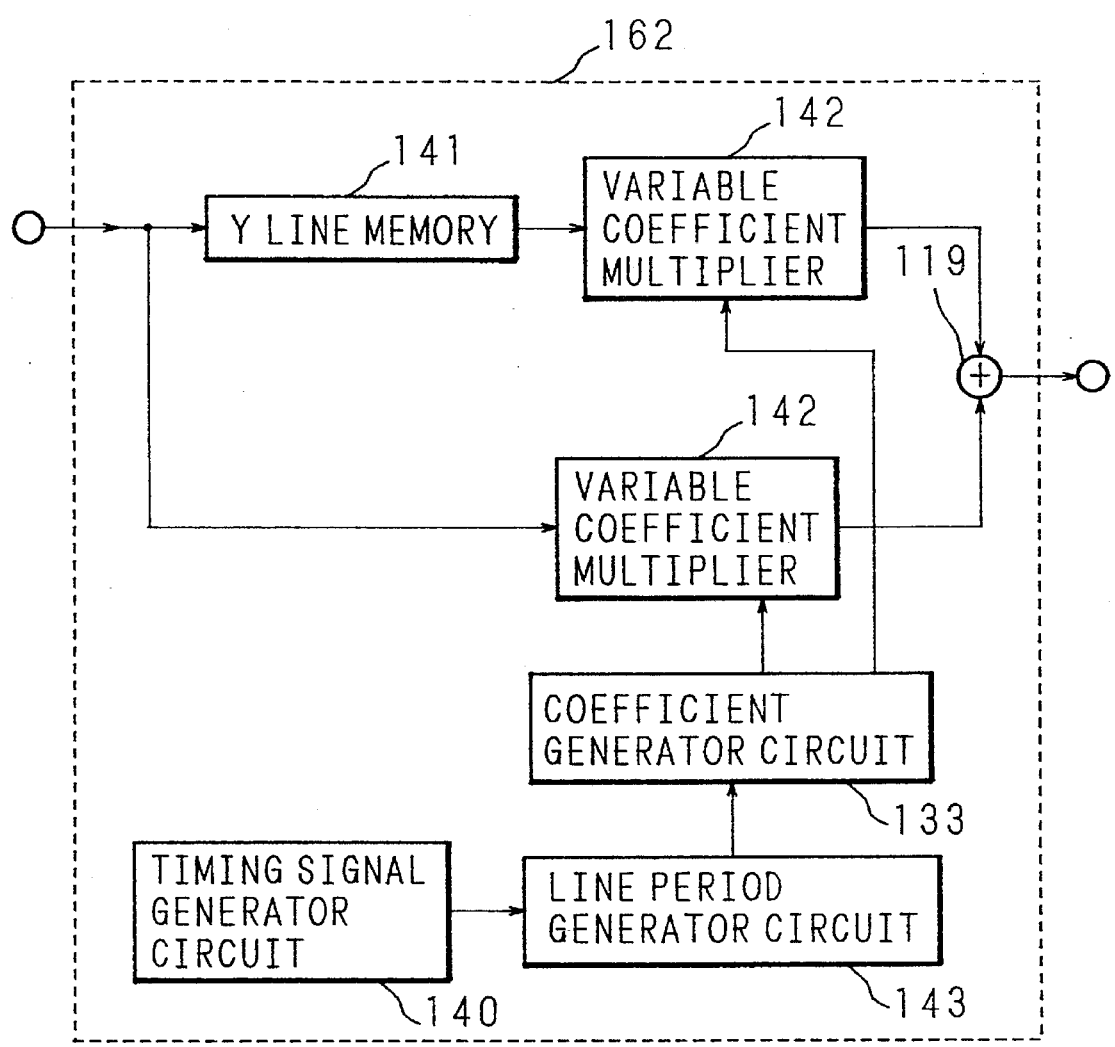
FIG. 52 is a block diagram showing another configuration of the vertical scanning line converter circuit according to an embodiment 28 of the invention.

Embodiment 28:

Now, an embodiment 28 (claim 31) will be explained. The system blocks, which are similar to those for the embodiment 27 shown in FIG. 27, will not be described any further, but the explanation will be limited to the vertical scanning line converter for the luminance signal (Y signal). FIG. 52 is a block diagram showing the simplest Y vertical scanning line converter according to the invention. In FIG. 52, numeral 141 designates a Y line memory for delaying the Y component of the MUSE signal by one line, numeral 142 a variable coefficient generator involving a fraction of power of two, and numeral 143 a line period generator circuit for generating an odd-numbered line period twice higher than that after conversion.

Figure 53:
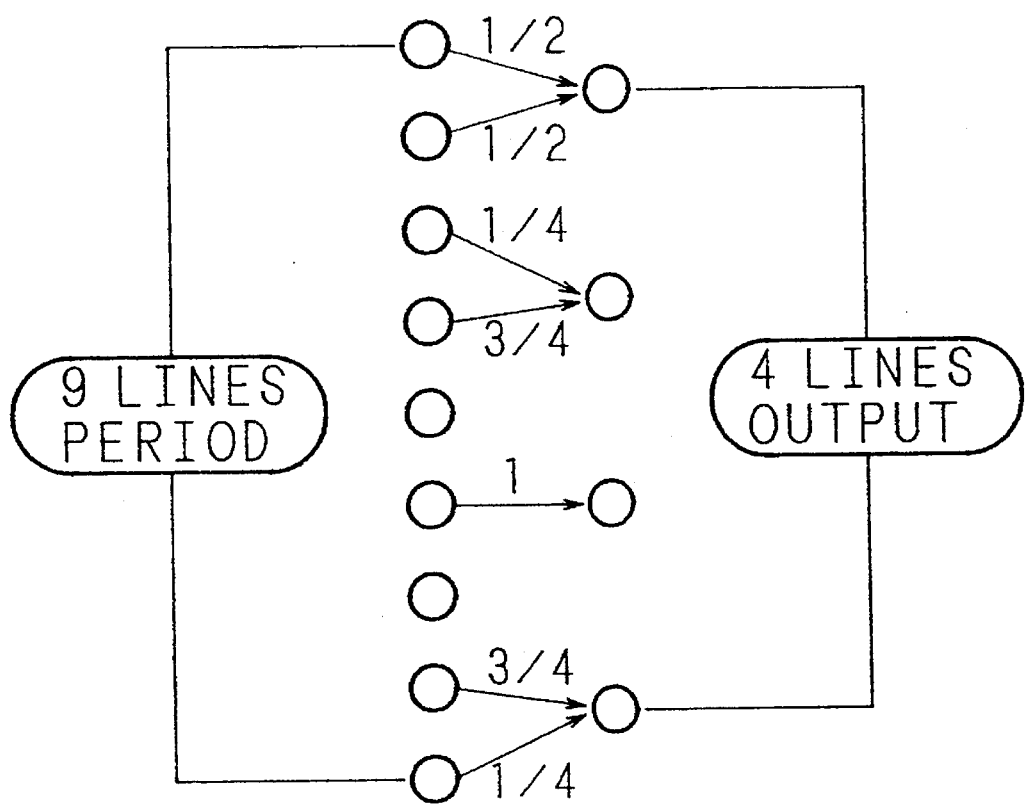
FIG. 53 shows a model of sampling points in the vertical scanning line converter circuit shown in FIG. 52.

Now, the operation will be explained. FIG. 53 is a diagram for explaining the manner of conversion using a model of sampling points. As explained with reference to the embodiment 27, when the MUSE signal effective scanning lines are reduced to 7/15, all the scanning lines can be converted to those for NTSC format in vertical scanning line conversion in full or zoom mode. In such a case, however, the linear interpolation coefficient between lines is complicated, and the circuit configuration requires a plurality of multipliers and ROMs. When the value of the numerator of the ratio 7/15 representing the relation for vertical scanning line conversion is approximated in the form of powers of two, the circuit can only comprise the fraction-of-power-of-two variable coefficient generator 142. When the ratio 7/15 is approximated by 4/9, for instance, the interline linear interpolation coefficients are sufficiently of five classes including 0, ¼, ½, ¾ and 1, which can be realized by bit shift, an adder and a simple gate circuit. The circuit size can thus be considerably saved. The coefficient 4/9 leads to 460 (=1035× 4/9) scanning lines after conversion, which, though meets the effective NTSC scanning lines, has a considerable error of 23 lines. Actually, therefore, the use of 8/17 or 32/69 reduces the error to about four lines. Since both the ratios 8/17 and 32/69 are selected to make the numerator a power of two, the interline coefficients can thus be obtained with bit shift, an adder and a simple gate circuit. As described above, in vertical scanning line conversion in full or zoom mode, the numerator may assume a power of two and the denominator an odd number larger than twice the numerator for approximation.

Also in wide mode, as described with reference to the embodiment 27, the vertical scanning lines are converted to 7/20. As in full and zoom modes, this particular ratio complicate coefficients for interline linear interpolation. Therefore, approximation of 7/20 by another fraction having a numerator equal to a power of 2 and a denominator of an odd number twice larger than the numerator simplifies the circuit considerably as in the previously described cases. If 7/20 is approximated by such ratio as 4/11 or 8/23, for instance, the interline linear interpolation coefficients can be realized with bit shift, an adder and a simple gate circuit.

This fact will be explained with reference to FIGS. 52 and 53. For simplicity, assume that when the simplest ratio of 4/9 is employed for vertical scanning line conversion in full or zoom mode, the circuit 143 for generating a line period of an odd number twice larger than the converted lines generates signals 1 to 9 for a 9-line period. Five classes of coefficients 0, ¼, ½, ¾ and 1 are generated by the coefficient generator 133, the lines are multiplied by a coefficient at the fraction-of-power-of-two variable coefficient multiplier 142, and linear interpolation is effected between lines. Since the linear interpolation between two lines is at 9 line intervals and a very simple coefficient is involved, as shown in FIG. 53, the variable coefficient multiplier 142 involving a fraction of power of 2 can be constructed of a very simple configuration. Also, the ratio 8/17 for full and zoom mode and 8/23 for wide mode represent a 17-line period and a 23-line period respectively with the interline linear interpolation coefficients in the range of ⅛ to 1 (including 0), which can be realized simply with one more bit shift and one more arithmetic circuit.

Figure 54:
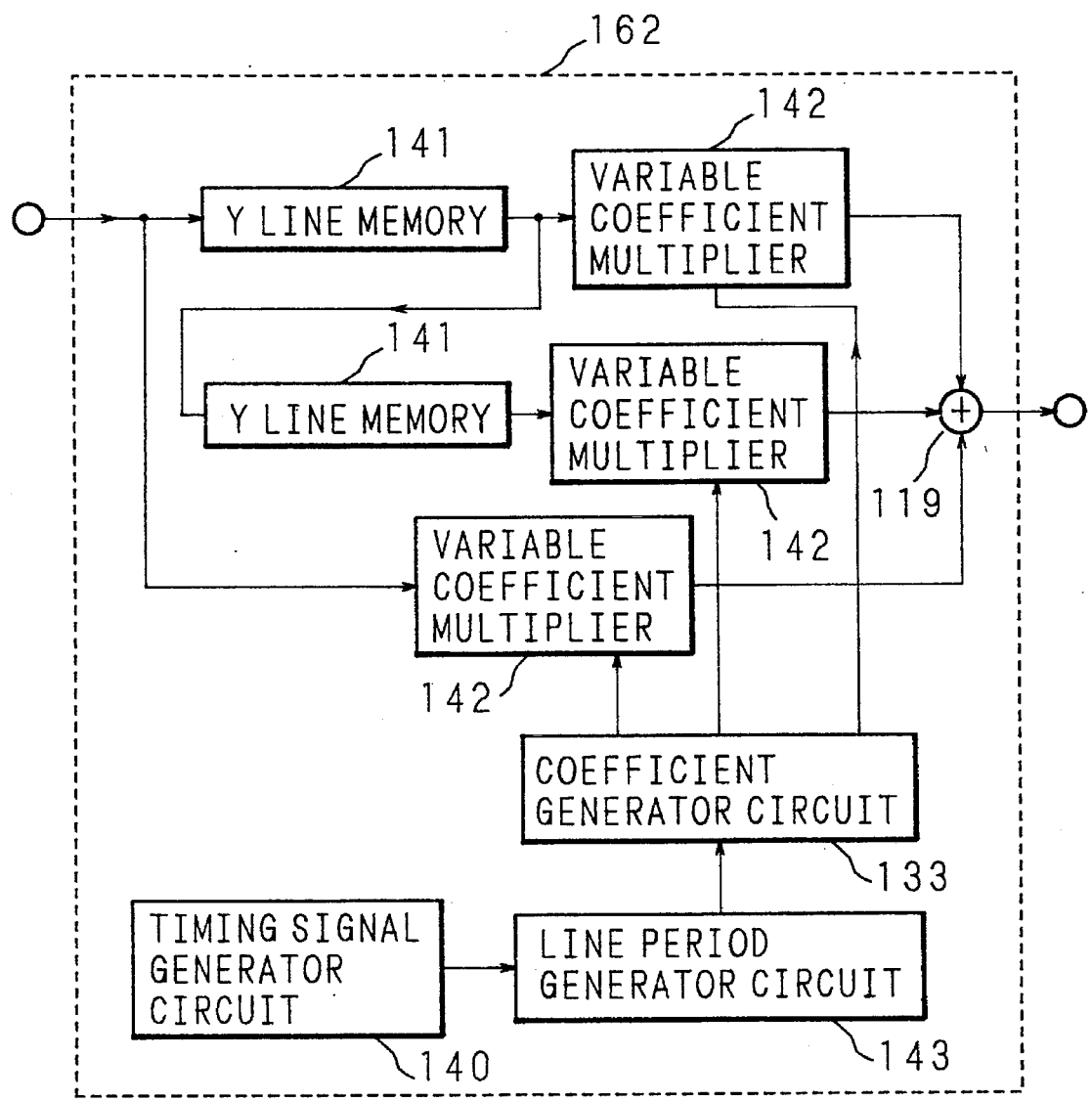
FIG. 54 is a block diagram showing another configuration of the vertical scanning line converter circuit according to the embodiment 28 of the invention.

FIG. 54 is a diagram showing another application of the embodiment under consideration. In this application, the ratio for vertical scanning line conversion remains the same and the interline linear interpolation involves three lines to improve the filter characteristics. More specifically, in addition to the configuration of FIG. 52, the system further comprises another Y line memory 141 and a another fraction-of-power-of-two variable coefficient multiplier 142. The signals passed through the two Y line memories 141 and two fraction-power-of-two variable coefficient multipliers 142 are also given to the adder 119 and the each other. The circuit operation, which is identical to that in FIG. 52, is such that vertical scanning line conversion to 4/9 produces four lines per nine lines whereas 3-line linear interpolation somewhat complicates the coefficients. The linear interpolation using many lines as in this case complicates the coefficients, although the filter characteristic can be improved and the aliasing distortion due to the vertical scanning line conversion is reduced. Although the example under consideration concerns the vertical scanning line conversion, when horizontal arithmetic operation is added in subsample phase of the luminance signal in the process of interline linear interpolation, then the arithmetic operation for two-dimensional interpolation can be effected at the same time thereby to conserve the capacity of the line memories.

Figure 55:
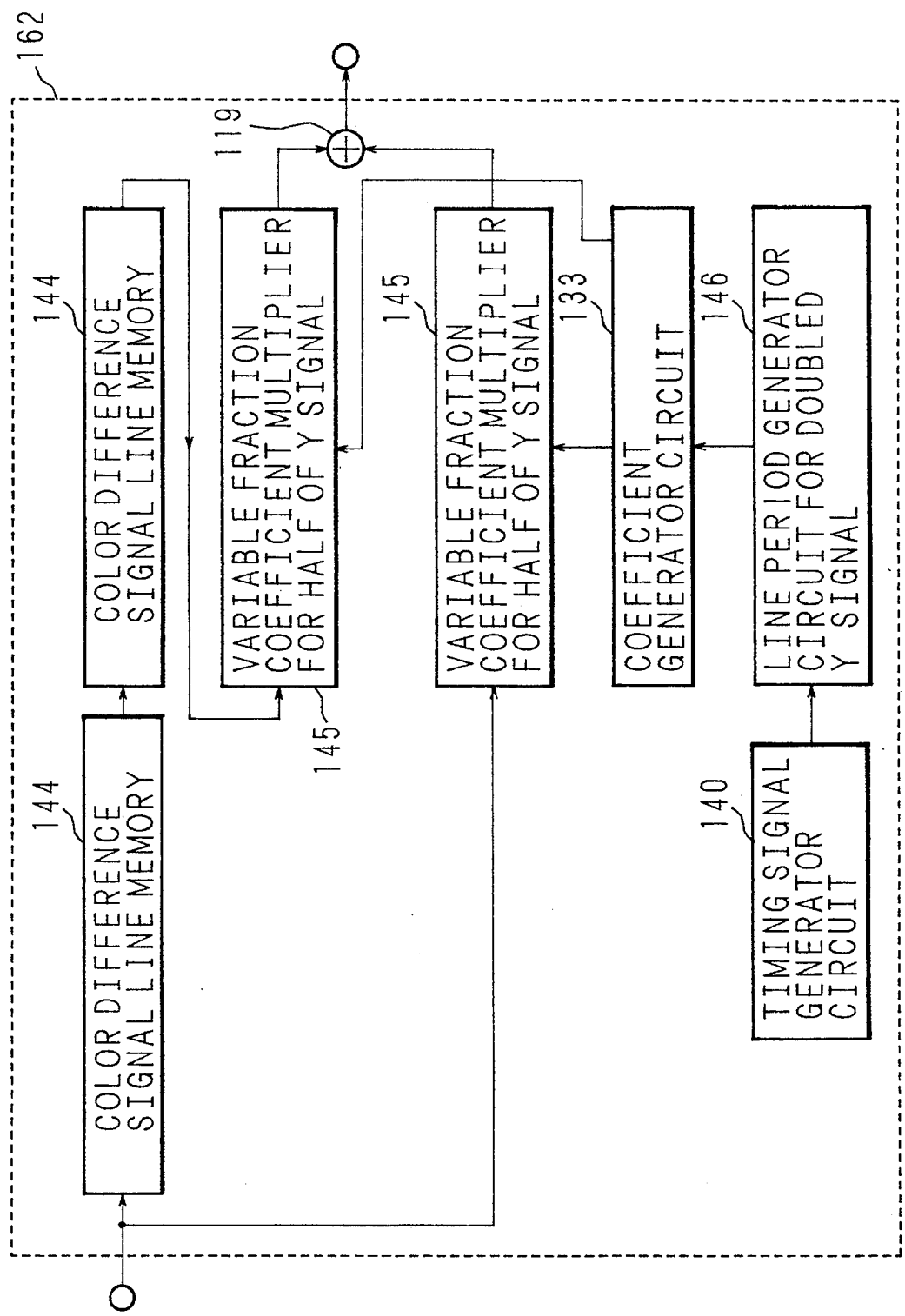
FIG. 55 is a block diagram showing a configuration of the vertical scanning line converter circuit according to an embodiment 29 of the invention.

Embodiment 29:

Now, an embodiment 29 (claim 32) will be explained. FIG. 55 is a block diagram showing a vertical scanning line converter unit 162 for the color difference signal according to this embodiment. In FIG. 55, numeral 144 designates a color difference line memory for delaying the color difference signal by one line, numeral 145 a ½-fraction variable coefficient multiplier for Y scanning line conversion specified for the system, and numeral 146 a circuit for generating a line period twice of that for Y signal specified for the system.

Figure 56:
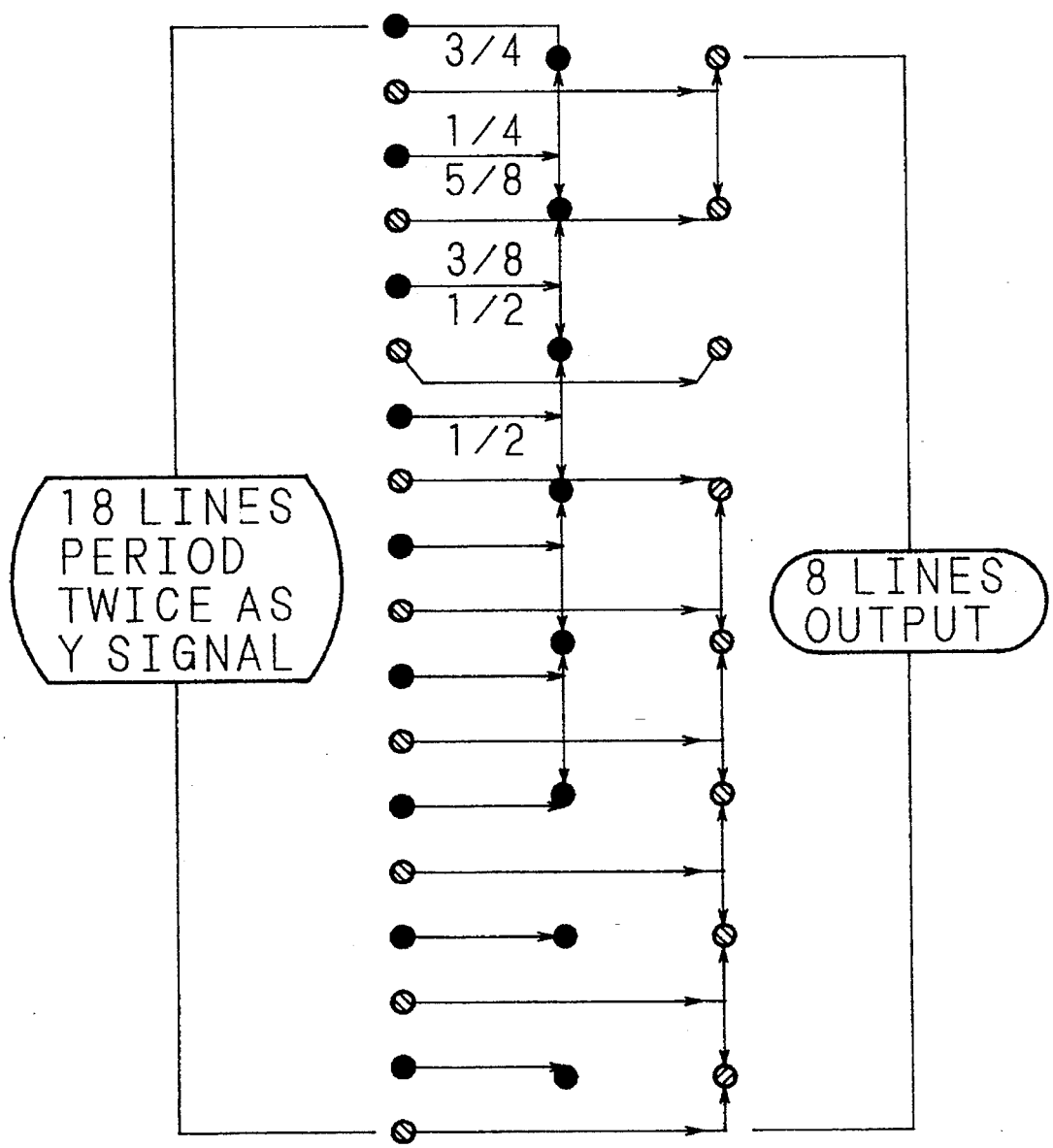
FIG. 56 shows a model of sampling points in the vertical scanning line converter circuit shown in FIG. 54.

FIG. 56 is a diagram for explaining the circuit operation of the block shown in FIG. 55 by a model of sampling points. The conventional color difference signal is filtered to a vertical phase adjusted at a point where 516 scanning lines for luminance signal is involved, i.e., each scanning line is generated from each two scanning lines in full or zoom mode. In the absence of vertical scanning line conversion, only a vertical filter is used. In wide mode, on the other hand, the 516 vertical scanning lines are reduced to ⅔ for both the color difference signal and the luminance signal. As shown in the embodiments 27 and 28, however, conversion of the effective scanning lines of luminance signal from 1032 to 483 in full or zoom mode requires conversion of the vertical scanning lines also for color difference signal from 516 to 483. In wide mode, therefore, the vertical scanning lines for the color difference signal must be converted directly to 7/20 i.e., from 1032 to about 360. The color difference signal in MUSE signal is transmitted every other line with one half of the number of scanning lines of luminance signal. Converting the MUSE color difference signal with the same line period as the luminance signal is difficult with such coefficients as 7/15 or 4/9 for the embodiment 27 and 28 since the line period is odd numbered. A solution is to convert the scanning lines to twice with the line period twice of that of the luminance signal. When the ratio is 7/15 for the luminance signal, for example, the ratio of 28/30 is used for the color difference signal. In similar fashion, in the case of 4/9 or 8/17 for the luminance signal, the ratio of 16/18 or 32/34 respectively is employed for conversion of the color difference signal. The denominator of these coefficients represents the scanning lines of the MUSE signal and includes the two color difference signals, while the numerator is the sum of the scanning lines for the two color difference signals after conversion. As a result, from the viewpoint of only one of the color difference signals, both the denominator and numerator become one half, so that the above-mentioned conversion employs 14/15, 8/9 and 16/17, and the interline linear interpolation coefficients are one half of that for the luminance signal. The ratio ¼, for instance, changes to 1/14, and ¼ to ⅛. This is also the case with wide mode, in which case an assumed ratio of 7/20 for luminance signal is associated with the ratio of 14/20 for one color difference signal and 28/40 for the two color difference signals.

Assume that the luminance signal conversion is 4/9 in the explanation made above with reference to the embodiment 28 in full or zoom mode, for example. Then the vertical scanning line conversion for the color difference signal is performed in the following manner. The circuit 146 for generating a line period twice of that of the luminance signal generates 18 lines of line period. The coefficient generator circuit 133 generates a coefficient, the variable coefficient multiplier 145 involving the fraction of ½ of that for the luminance signal multiplies the coefficient, and linear interpolation is performed between two lines which are apart by two lines from each other. In FIG. 56, the black circle represents an R luminance signal, and the hatched circle a B luminance signal. The vertical position of the color difference signal after conversion is designed to correspond to that of the luminance signal. As seen from the diagram, the coefficient for the color difference signal is one half of that for interline linear interpolation for the luminance signal, i.e., ⅛ to 1 (including 0). Further, the conventional vertical filter for the color difference signal has a fixed coefficient. In order to adjust the vertical positions of the two color difference signals and the luminance signal, therefore, the color difference signals required different filters. In case of the vertical scanning line converter circuit under consideration, however, a single circuit serves the purpose since the two color difference signals are processed in time series.

FIG. 55 is a block diagram showing a simplest, specific example of this embodiment. The use of a greater number of line memories for the color difference signal can reduce the aliasing distortion due to the vertical scanning line conversion. Also, by performing the arithmetic operation for horizontal direction in accordance with the subsample phase of the color difference signal at the time of linear interpolation in the vertical scanning line converter circuit, the circuit can double as a two-dimensional interpolation circuit for the color difference signal, thereby reducing the size of the circuit and the required capacity of the line memory.

Figure 57:
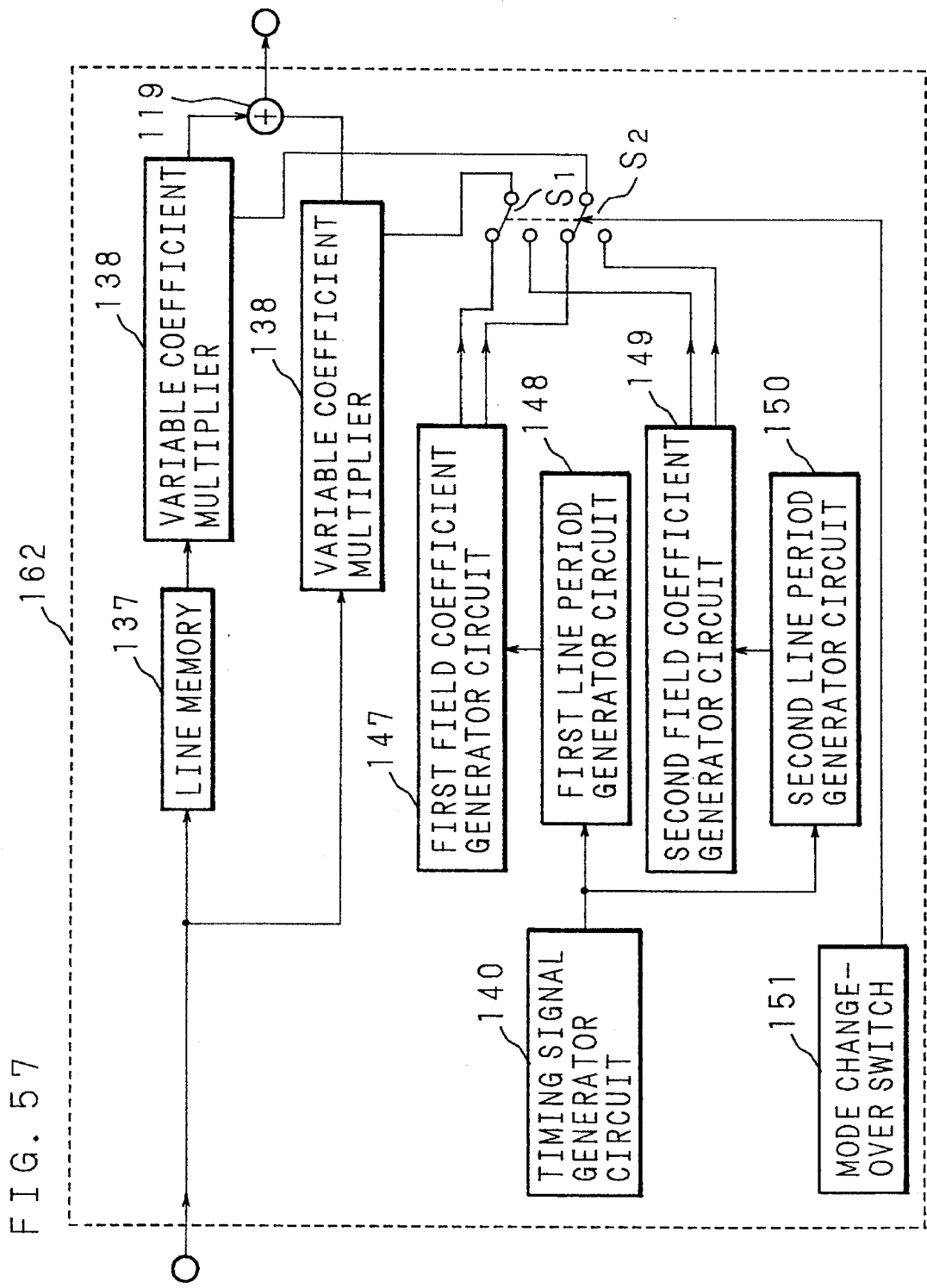
FIG. 57 is a block diagram showing a configuration of the vertical scanning line converter circuit according to an embodiment 30 of the invention.

Embodiment 30:

Now, an embodiment 30 (claim 33) will be explained. FIG. 57 is a block diagram showing the configuration of a vertical scanning line converter circuit 162 according to this embodiment. This vertical scanning line converter circuit 162 includes a line memory 137, two variable coefficient multipliers 138, an adder 119 for adding the input signal passing through the line memory 137 and the variable coefficient multiplier 138 to the input signal passing only through the variable coefficient multiplier 138, a timing signal generator circuit 140, a first coefficient generator circuit 147, a first line period generator circuit 148, a second coefficient generator circuit 149, a second line period generator circuit 150, and a switch 151 for switching the mode of vertical scanning line conversion.

Figure 58:
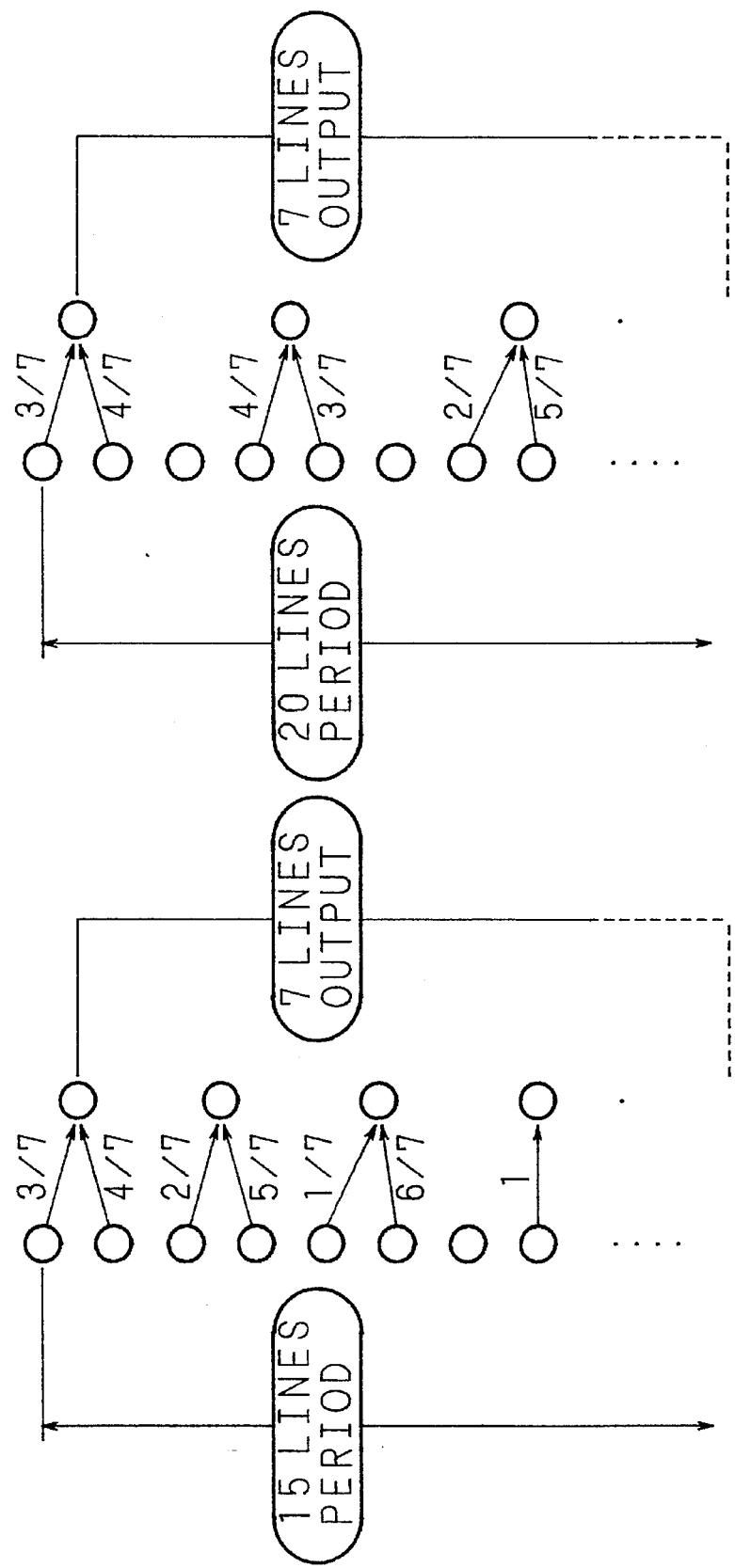
FIG. 58 shows a model of sampling points in the vertical scanning line converter circuit shown in FIG. 57.

The operation of this embodiment will be explained. FIG. 58 is a diagram for explaining the operation of the vertical scanning line converter unit 162 with a model of sampling points. In the conventional M-N converter, a vertical scanning line converter circuit is required for each of full, zoom and wide modes. As a result, a plurality of line memories and arithmetic circuits are required thereby leading to the disadvantage of a large circuit size. According to this embodiment, by contrast, this problem is solved and the effective MUSE scanning lines after conversion can be converted entirely into those for the NTSC format. As described above with reference to the embodiment 27, the conversion of the MUSE vertical scanning lines to 7/15 permits conversion to within the 483 effective scanning lines for NTSC format in full or zoom mode. In similar manner, from the viewpoint of maintaining the roundness, the vertical scanning lines for the MUSE signal are converted to 7/20 in wide mode. In this case, the coefficient 7/15 for conversion of the vertical scanning lines in full or zoom mode and the coefficient 7/20 for the vertical scanning line conversion in wide mode are in the ratio ranging from ⅐ to 1 (including 0) in case of linear interpolation between two lines. If the line period is changed to 15 and 20 lines with different coefficients generated for each line, then a vertical scanning line converter circuit can be shared without substantial change.

FIG. 57 is a diagram showing a simplest specific example. The timing signal generator circuit 140 generates a conversion start signal for MUSE signal, which signal is received to the first line period generator circuit 148, which in turn outputs 1 to 15 to the first coefficient generator circuit 147 at intervals of 15 lines, for example. In similar fashion, the second line period generator circuit 150 outputs 1 to 20 to the second coefficient generator circuit 149 at intervals of 20 lines, for example. The first and second coefficient generator circuits 147, 149 generate coefficients as shown in FIG. 58. For instance, the first coefficient generator circuit 147 generates $5/7$ at the fourth line of the line period and $2/7$ for a one-line delayed signal, while the second coefficient generator circuit 149 outputs $3/7$ at the fifth line and $4/7$ for a one-line delayed output signal. In this way, the coefficients are a fraction from 1 to $1/7$. Since the line period and generation of coefficients are in different sequences, 2-1 selectors $S_1$, $S_2$ are controlled by the mode change-over switch 151 to accommodate a mode change. As seen from above, the line memory 137, the variable coefficient multiplier 138 and the adder can be integrated into a single unit, so that the circuit and the line memory can be reduced in size.

Although the foregoing description concerns the switching between full, zoom and wide modes, a mode requiring vertical scanning line conversion to maintain the roundness can also be met by changing the line period and the coefficient generator circuit. In such a case, the sharing of a variable coefficient multiplier by different circuits is also possible although the variable coefficient multiplier may be somewhat different depending on the coefficient. In spite of the linear interpolation between two lines described above according to this embodiment, the aliasing distortion due to the vertical scanning line conversion can be reduced by using a greater number of line memories. Also, when the arithmetic operation in horizontal direction is performed in accordance with the subsample phase at the time of linear interpolation in the vertical scanning line converter circuit, then the particular operation can be performed also by the two-dimensional interpolation circuit for a reduced circuit size and line memory capacity.

Figure 59:
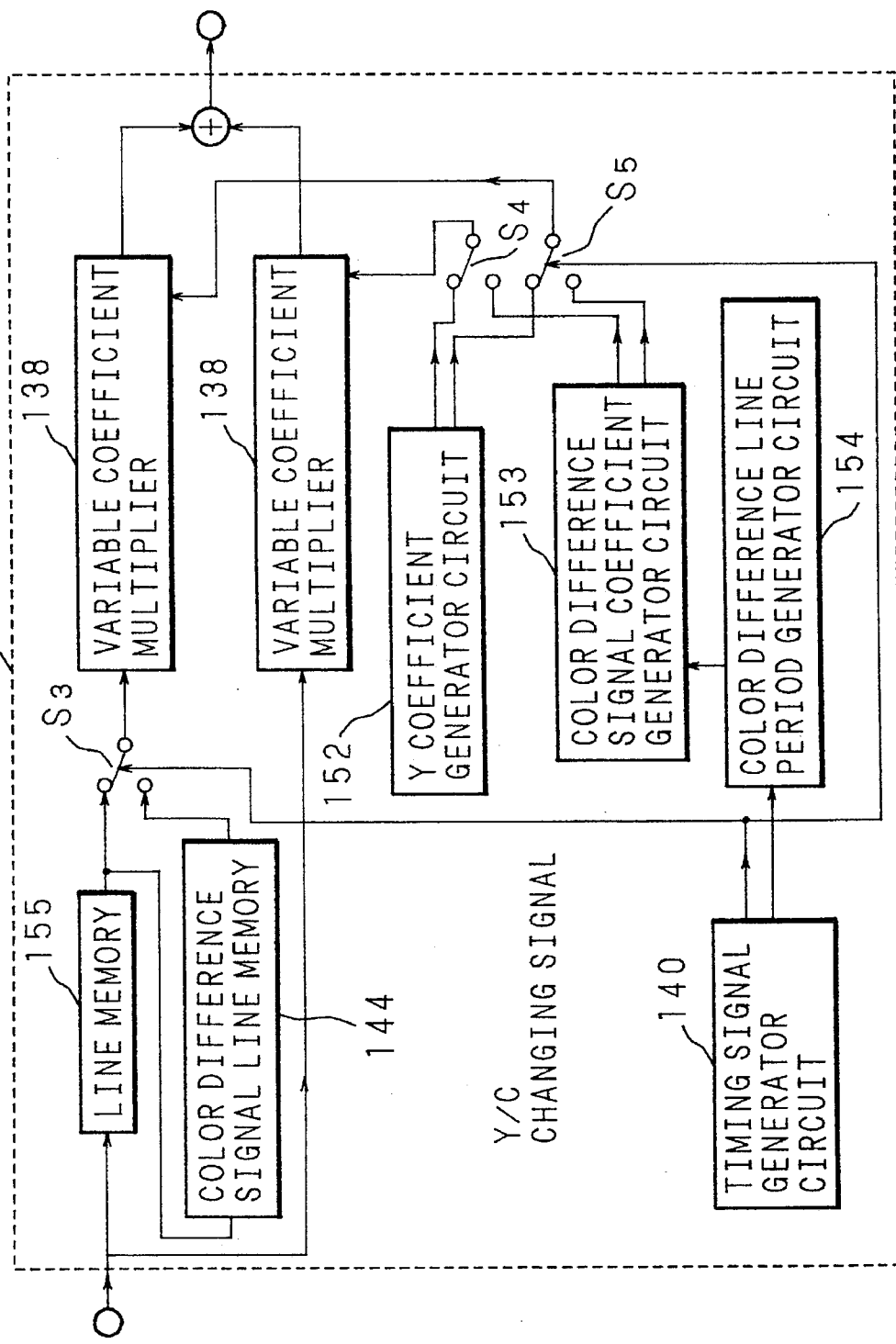
FIG. 59 is a block diagram showing a configuration of the vertical scanning line converter circuit according to an embodiment 31 of the invention.

Embodiment 31:

Now, an embodiment 31 (claim 34) will be explained. FIG. 59 is a block diagram showing a simplest vertical scanning line converter circuit 162 according to the embodiment. In this embodiment, the system comprises a line memory 155 capable of delaying the MUSE signal by one line, a variable coefficient multiplier 138, a Y coefficient generator circuit 152, a color difference signal coefficient generator circuit 153, a color difference signal line period generator circuit 154, and a timing signal generator circuit 140.

Figure 60:
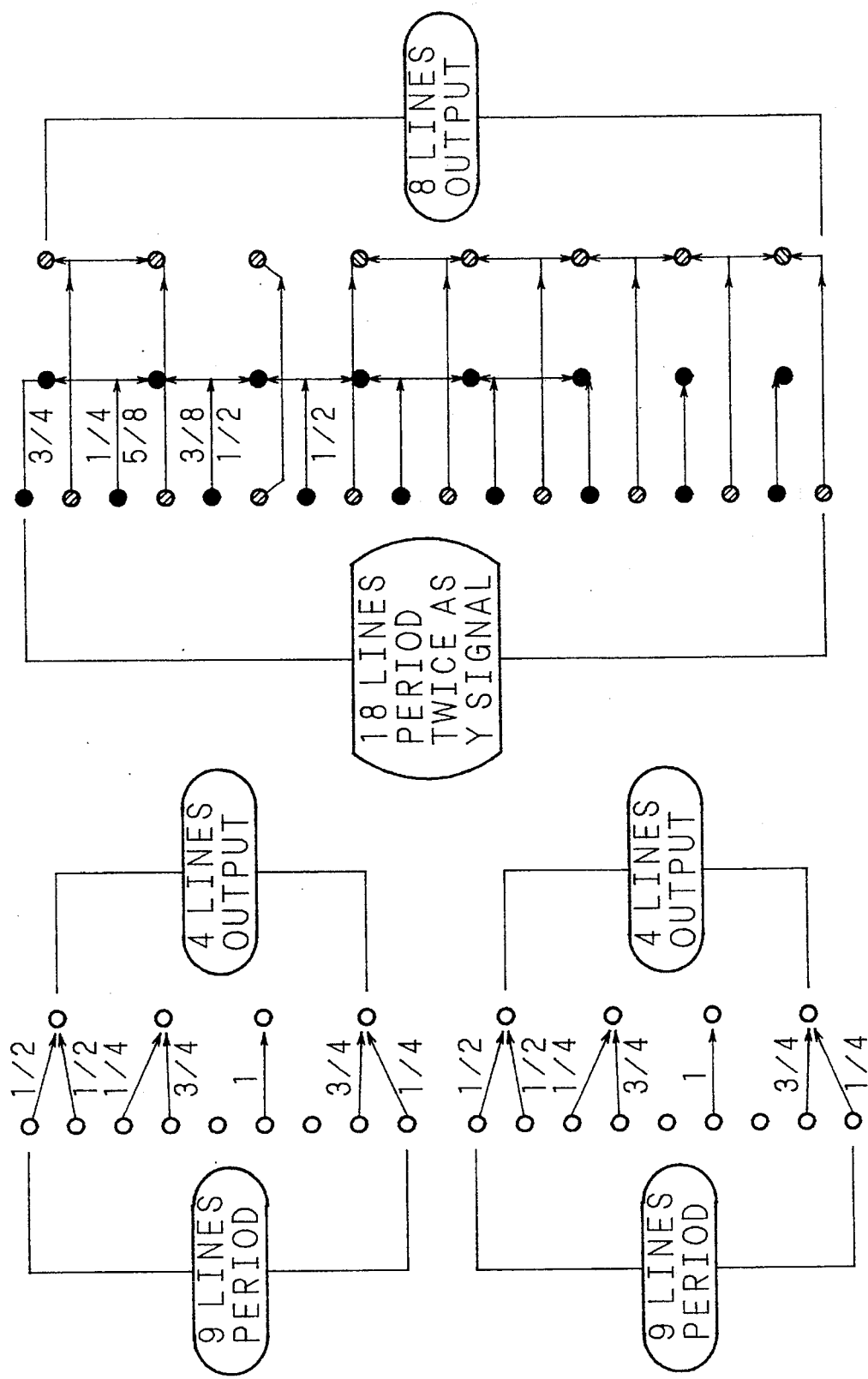
FIG. 60 shows a model of sampling points in the vertical scanning line converter circuit shown in FIG. 59.

The operation of this embodiment will be explained. FIG. 60 is a diagram for explaining the operation of the vertical scanning line converter unit 162 shown in FIG. 59 as a model of sampling points. In the prior art, the color difference signal is not converted in the vertical scanning lines but filtered in accordance with the vertical position of the scanning line-converted luminance signal and therefore is processed by a circuit different from the luminance signal scanning line converter circuit. In wide mode, however, according to the prior art, the color difference signal is also subjected to vertical scanning line conversion, but only after temporal expansion. As a consequence, the luminance signal and the color difference signal are converted by different circuits hence leading to a larger circuit configuration. By taking advantage of the fact that the coefficient of ½ is used for the line period twice of that for Y shown in the 29th embodiment 29 and the horizontal luminance signal and the color difference signal for the MUSE signal are multiplexed on the time axis in time series, the coefficients for the signal line delay and the interline linear interpolation are rendered variable. Then, a single vertical scanning line converter circuit can be used for scanning line conversion of both the luminance signal and the color difference signal. In this way, the whole circuit including the line memory can be reduced in size as compared with the conventional system. The timing signal generator circuit 140 shown in FIG. 59 outputs a signal for switching the luminance signal and the color difference signal. When this signal represents the luminance signal, the delay is one line; while when this signal indicates the color difference signal, the delay is two lines. Also, the coefficient for interline linear interpolation is switched in the manner shown in FIG. 60. As described with reference to the embodiment 29, when the color difference signal line period is twice as long as that of the luminance signal and the interline linear interpolation coefficient for the color difference signal is one half of that for the luminance signal, then a variable coefficient multiplier circuit 138 capable of meeting the color difference signal coefficient can be used also for the luminance signal. Assume, for example, that as shown in FIG. 60 the luminance signal is converted to $4/5$ in vertical scanning lines in full or zoom mode. The ratio for the two color difference signals is $16/18$. This indicates that the scanning line conversion at 18-line intervals attains 8-line conversion for both the luminance signal and the color difference signal. The minimum coefficient for linear interpolation is $1/8$ for the color difference signal, which can be used also by the luminance signal as $1/4$. Thus the variable coefficient multiplier 138 can be shared with equal effect.

According to this embodiment, the linear interpolation between two lines is treated. When a greater number of line memories are used, however, the aliasing distortion due to the vertical scanning line conversion can be reduced. Also, a simultaneous arithmetic operation in horizontal direction in accordance with the subsample phase at the time of linear interpolation in the vertical scanning line converter circuit can reduce the circuit size and the line memory capacity, since this function doubles as a two-dimensional interpolation circuit.

Figure 61:
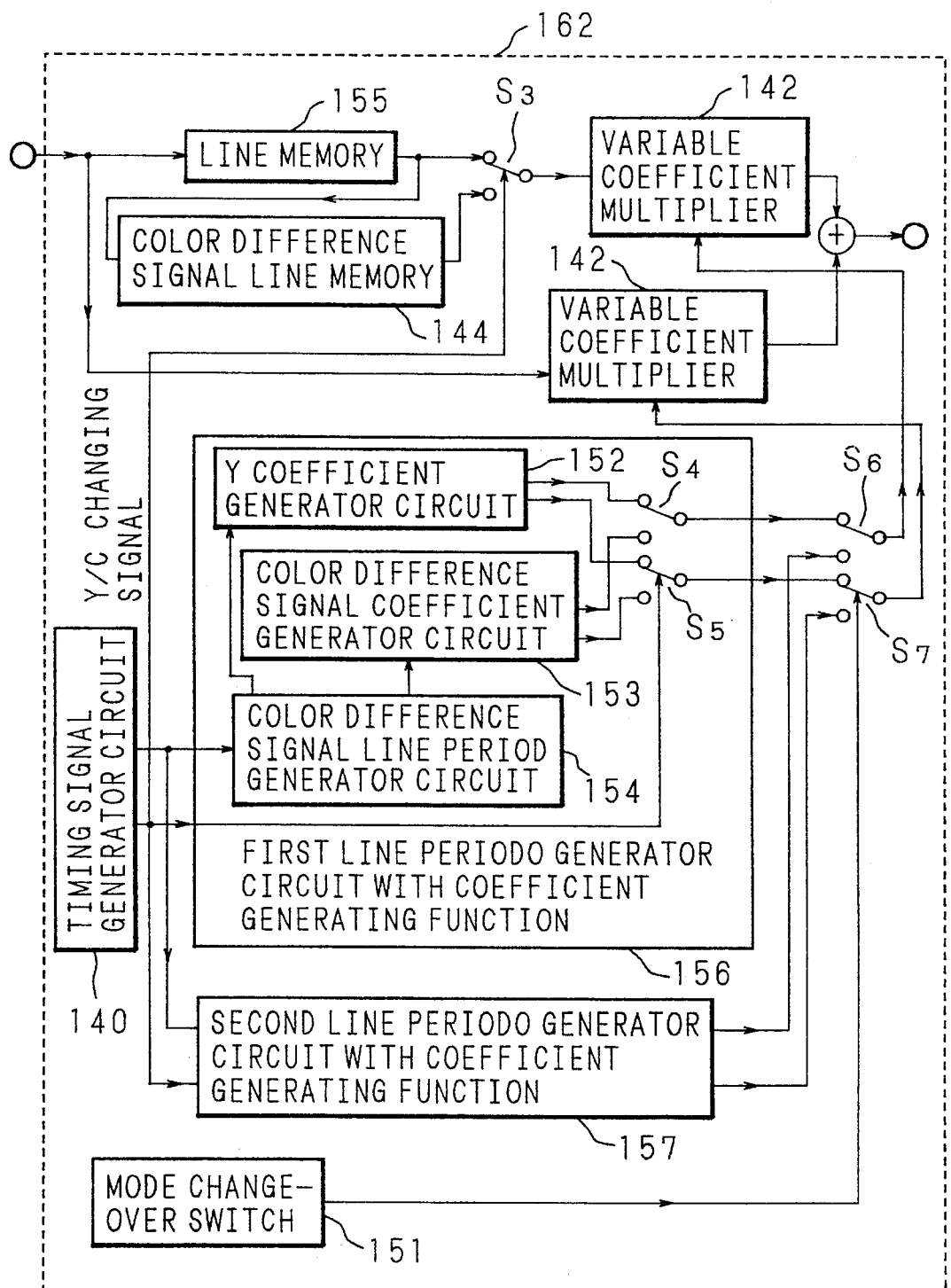
FIG. 61 is a block diagram showing a configuration of the vertical scanning line converter circuit according to an embodiment 32 of the invention.

Embodiment 32:

Now, an embodiment 32 (claim 35) will be explained. FIG. 61 is a block diagram showing the configuration of a simplest vertical scanning line converter circuit 162 according to this embodiment. This embodiment comprises a line memory 155 capable of delaying the MUSE signal by one line, a color difference signal line memory 144, a first line period generator circuit with a coefficient generating function 156, a second line period generator circuit with a coefficient generating function 157, a variable coefficient generator 142 involving a fraction of a power of two, a Y coefficient generator circuit 152, a color difference signal coefficient generator circuit 153, a color difference signal line period generator circuit 154, a timing signal generator circuit 140, and a mode change-over switch 151.

The operation of this embodiment will be explained. As described with reference to the embodiments 30 and 31, a vertical scanning line converter circuit is used for a plurality of modes also according to the embodiment under consideration. Assume that the first, or second line period generator with a coefficient generating function is switched depending on the mode and the vertical scanning line converter is switched by changing the coefficients for the luminance signal and the color difference signal in horizontal direction to share the same vertical scanning line converter circuit. When all the conversion coefficients are a fraction of a power of two, the coefficient multipliers can be configured of an adder and a simple gate circuit with bit shift. In this way, the circuit is reduced considerably in size. Assume in full or zoom mode that the luminance signal is converted to $8/17$ and the color difference signal to $32/34$ with the first line period generator circuit with a coefficient generating function 156 selected in FIG. 61. Then the line period covers 34 lines with the coefficient, at a minimum of $1/16$. When the conversion in wide mode involves the second line period generator with a coefficient generating function 157 with the luminance signal converted to $8/23$ and the color difference signal to $32/46$, the minimum coefficient is $1/16$. More specifically, a variable coefficient multiplier for $1/16$ to 1 can be shared by the luminance signal and the color difference signal in full, zoom and wide modes. The $1/16$-1 variable coefficient multiplier can be realized with a maximum of four-bit shift, a simple gate circuit and an adder, and eliminates the need of a ROM or a multiplier, thus considerably reducing the circuit size.

Apart from the linear interpolation between two lines according to the embodiment under consideration, the aliasing distortion due to the vertical scanning line conversion can be reduced using more line memories. If the arithmetic operation for the horizontal direction is performed in accordance with the subsample phase at the time of linear interpolation in the vertical scanning line conversion, on the other hand, the circuit can be shared by two-dimensional interpolation, thus contributing to a reduced size of the circuit and the line memory.

Figure 62:
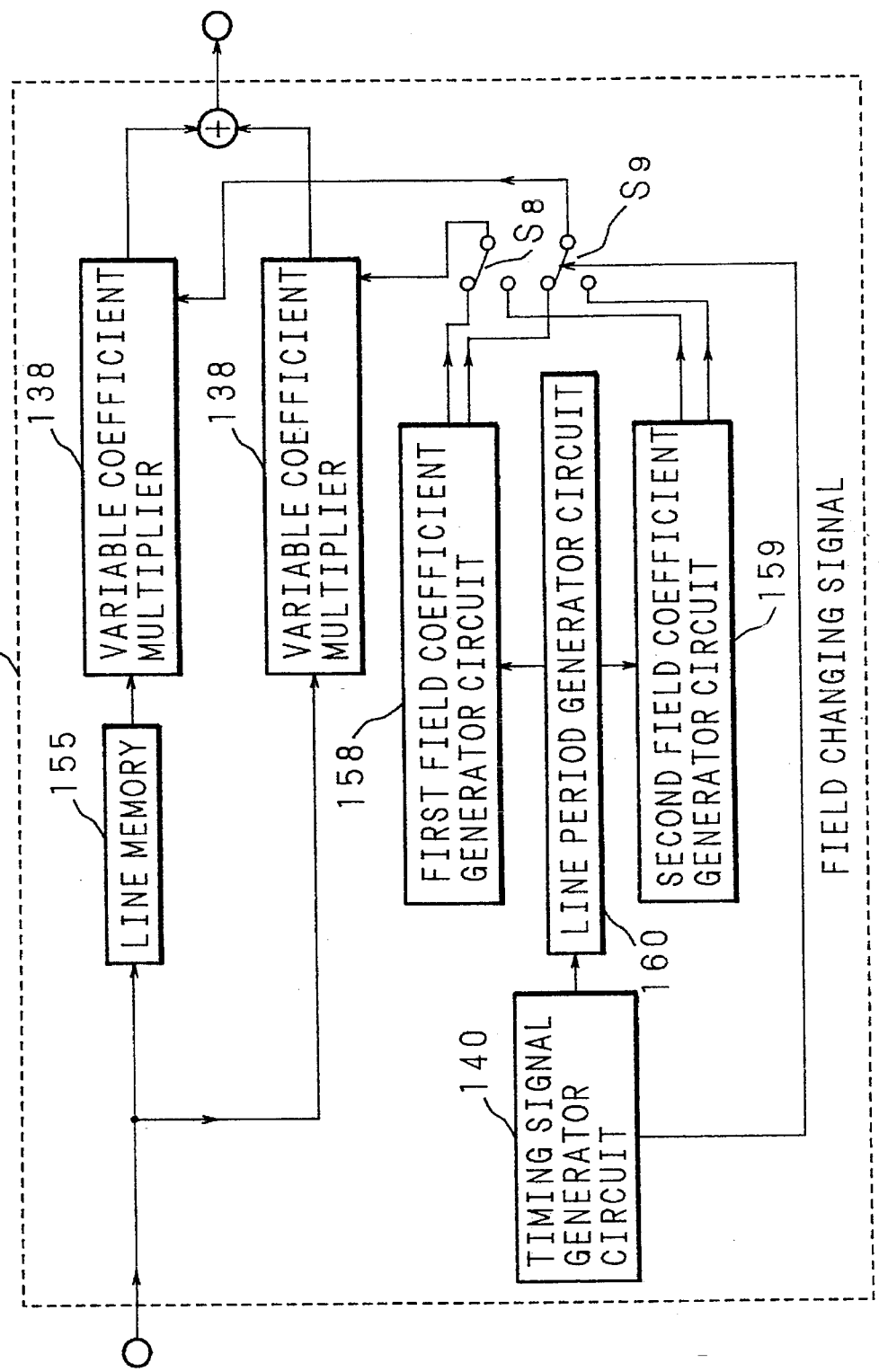
FIG. 62 is a block diagram showing a configuration of the vertical scanning line converter circuit according to an embodiment 33 of the invention.

Embodiment 33:

Now, an embodiment 33 (claim 36) will be explained. FIG. 62 is a block diagram showing the configuration of a simplest vertical scanning line converter unit 162 according to this embodiment. The embodiment under consideration comprises a line memory 155 for delaying the MUSE signal by one line, a first field coefficient generator circuit 158, a second field coefficient generator circuit 159, a variable coefficient multiplier 138, a line period generator circuit 160, and a timing signal generator circuit 140.

Figure 63:
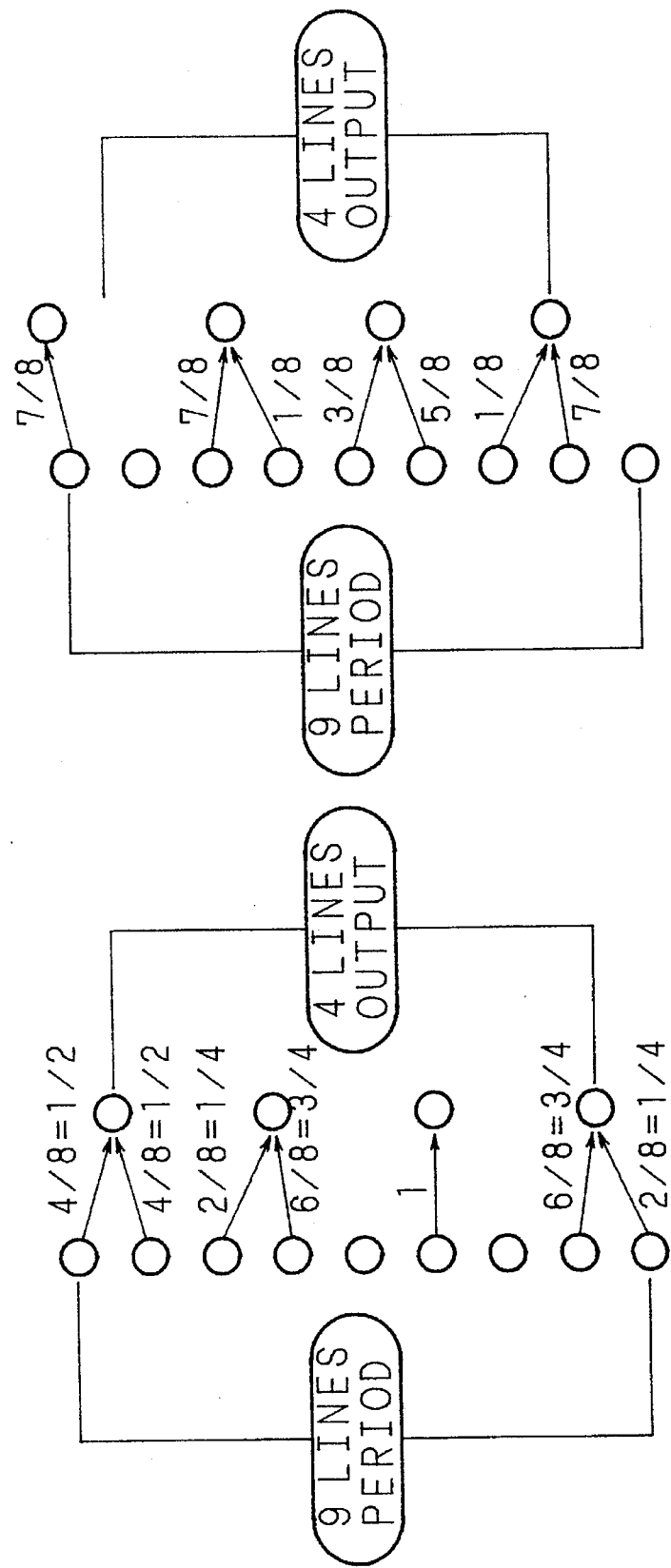
FIG. 63 shows a model of sampling points in the vertical scanning line converter circuit shown in FIG. 62.

The operation of this embodiment will be explained. FIG. 63 is a diagram for explaining the operation of the vertical scanning line converter unit 162 shown in FIG. 62 as a model of sampling points. In the conventional M-N converter, in order to adjust the interlace between fields strictly, an additional vertical scanning line converter circuit is used or an error is tolerated to some degree. According to this embodiment, by contrast, the interfield interlace is secured easily by the use of the vertical scanning line converter circuit according to the foregoing embodiments. For this purpose, as shown in FIG. 62, a field decision signal of the output of the timing signal generator circuit 140 is used to switch the outputs of the first field coefficient generator circuit 158 and the second field coefficient generator circuit 159, with the resulting signal multiplied by a coefficient at the variable coefficient multiplier 138 for linear interpolation. In the process, a coefficient one half of that for the original conversion is used, and the numerator of the coefficient generated at the first field coefficient generator circuit 158 is assumed to be an even number, while that of the second field coefficient generator circuit 159 an odd number. Then the interlace can easily be maintained. As shown in FIG. 63, for example, the coefficient $1/8$ is used instead of $1/4$ as a minimum for the $4/9$ vertical scanning line conversion in full or zoom mode. Also a coefficient equivalent to an even number, i.e., a multiple of one fourth is used as the numerator for the first field, and the coefficient $1/8$ for the second field in order to maintain the interlace.

Figure 64:
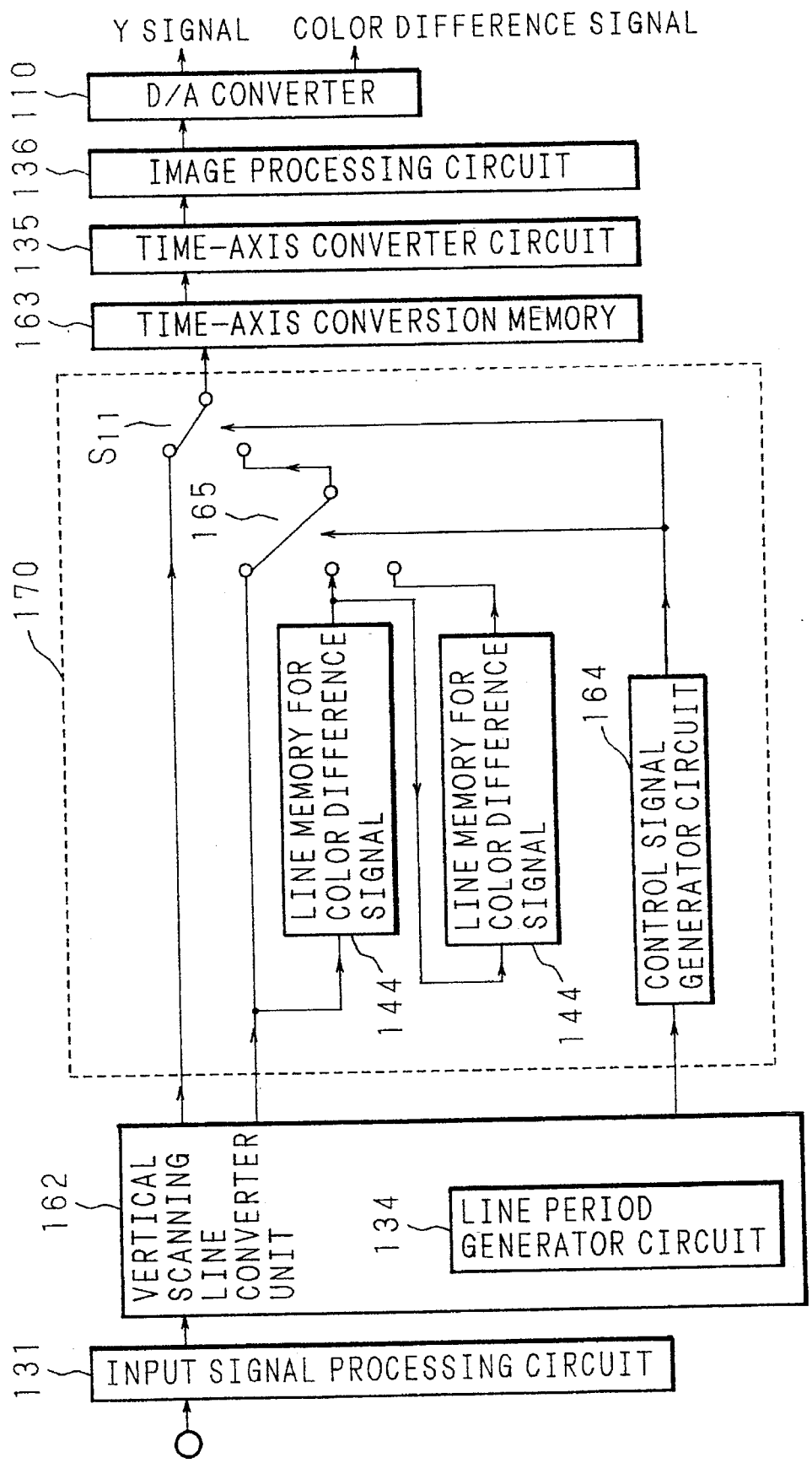
FIG. 64 is a block diagram showing a configuration of an M-N converter according to an embodiment 34 of the invention.

Embodiment 34:

Now, an embodiment 34 (claim 37) will be explained. FIG. 64 is a block diagram showing the configuration of an M-N converter according to this embodiment corresponding to FIG. 47. This embodiment comprises a signal multiplexer circuit 170 interposed between the vertical scanning line converter unit 162 and the time-axis processing circuit 135 shown in the embodiments 27–33. The signal multiplexer circuit 170 includes two color difference signal line memories 144, a control signal generator circuit 164 for controlling the delay of the color difference signal from the output of the line period generator circuit 134 in the vertical scanning line converter unit 162, a 3-1 selector 165 for selecting one of three signals, and a time-axis conversion memory 163. The input side terminal of the 3-1 selector 165 is supplied with the output signal of the vertical scanning line converter unit 162, the output signal of the vertical scanning line converter unit 162 through one color difference signal line memory 144 and the output signal of the vertical scanning line converter unit, 162 through two color difference signal line memories 144. The 2-1 selector $S_{11}$ for selecting the signal supplied from the output side terminal of the 3-1 selector 165 and the output signal of the vertical scanning line converter unit 162 is controlled by the control signal generator circuit 164.

The operation of this embodiment will be explained. FIG. 65 is a timing chart for explaining this embodiment. In the conventional M-N converter, two memories for time-axis conversion, including one for odd-numbered lines and the other for even-numbered lines, and three conversion memories for vertical compression in wide mode are required. According to the embodiment under consideration, in order to obviate this problem, the color difference signal of the output of the vertical scanning line converter unit 162 described in the embodiments 27–33 is delayed by two lines at maximum so that the luminance signal and the color difference signal are rearranged in such an order as to provide a single time-axis conversion memory and a single vertical compression memory. The circuit size is thus reduced to a degree suitable for LSI configuration. As shown in the block diagram of FIG. 64, the color difference signal output from the vertical scanning line converter unit 162 shown in the embodiments 27–33 is delayed by two lines at the color difference signal line memory 144, and the three signals before and after the delay are connected to the 3-1 selector 165. The output of the vertical scanning line converter unit 162, as shown in the top stage of FIG. 65, for example, has the luminance signal and the color difference signal not arranged in order. This is because the conversion process uses the linear interpolation with the conversion rate of $7/15$ or $7/20$, and therefore the conversion is not applied to all the lines. As a result, the color difference signal leads by two lines at maximum, and the output sequence of the color difference signal is changed. In view of this, the color difference signal is delayed by the line memory 144, and the output of the line period generator circuit 134 of the vertical scanning line converter unit 162 is supplied to the control signal generator circuit 164. The delay of the two color difference signals is controlled by the 3-1 selector 165 respectively through the control signal generator circuit 164 and thus they are rearranged as shown in the timing chart shown in the middle of FIG. 65. In this way, the data can be written in the time-axis conversion memory 163 in good order. The hatched portions of the timing chart represent invalid data and therefore are not written in. By writing the luminance signal and the color difference signal in good order into the time-axis conversion memory 163, the memories can be used efficiently and can double as the time-compression memory in wide mode. Since the reading operation on the read side of the time-axis conversion memory 163 is performed in order, the circuit can be reduced in size.

Although the delay of the color difference signal is assumed to be two lines at maximum, the delay of at least two lines is required depending on the trade-off between the four-line advance and the delay of the color difference signal of MUSE format. Also, the time-axis conversion memory 163 can be written into with a timing chart as shown in the bottom of FIG. 65, in which case the circuit configuration after time-axis conversion is simplified.

Figure 66:
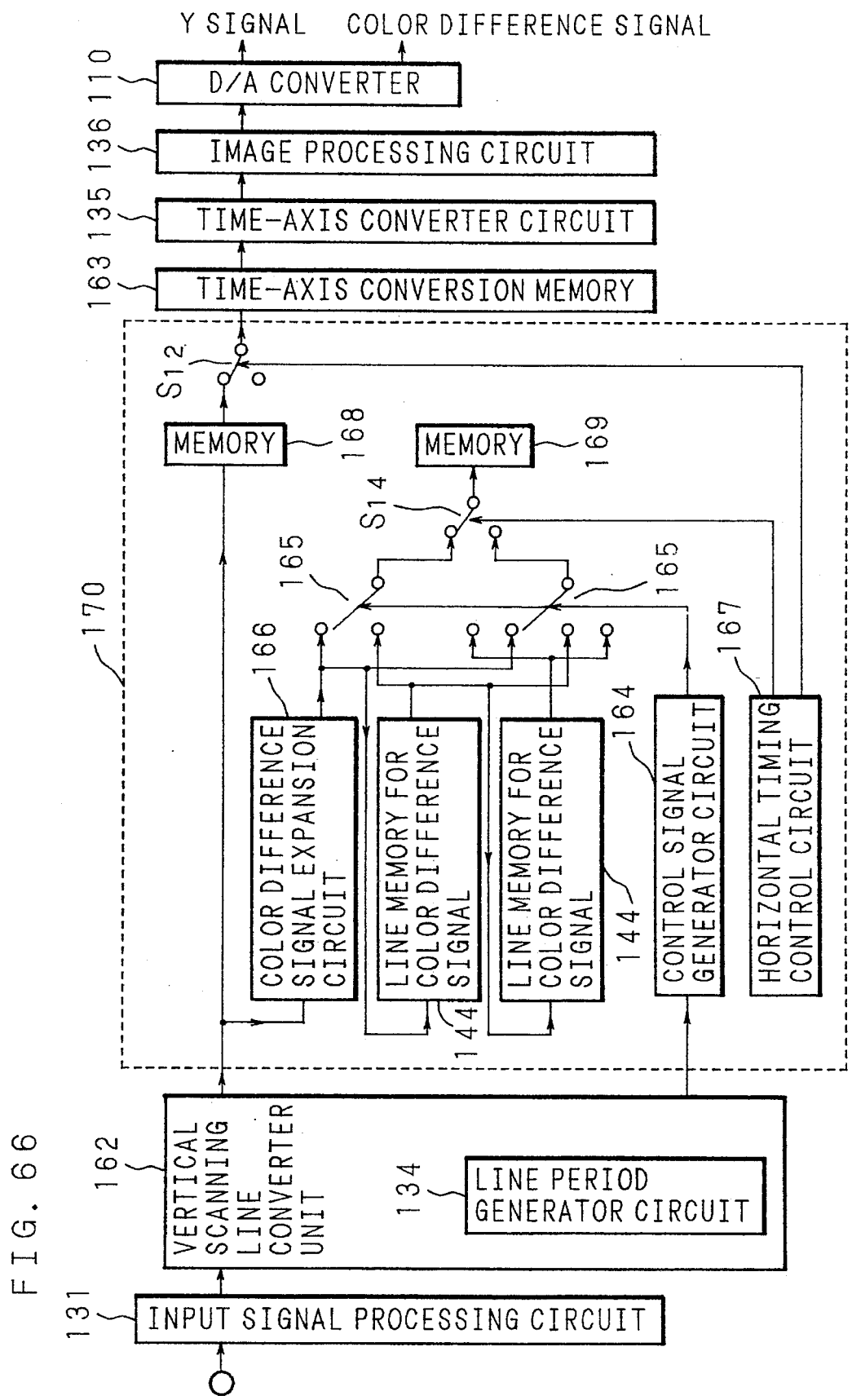
FIG. 66 is a block diagram showing a configuration of an M-N converter according to an embodiment 35 of the invention.

Embodiment 35:

Now, an embodiment 35 (claim 38) will be explained. FIG. 66 is a block diagram showing the configuration of an M-N converter according to this embodiment. This embodiment comprises a signal multiplexer circuit 170 having a configuration different from the embodiment 34 inserted between the vertical scanning line converter unit 162 and the time-axis processing circuit 135 shown in the embodiments 27–33. The signal multiplexer circuit 170 includes two color difference signal line memories 144, a color difference signal expansion circuit 166 for expanding the time axis of the color difference signal, a control signal generator circuit 164 for controlling the delay of the color difference signal in accordance with the output of the line period generator circuit 134 in the vertical scanning line converter unit 162, a horizontal timing control circuit 167, 3-1 selectors 165, 165 each for selecting one of three signals, a memory 168 for multiplexing the luminance signal, a memory 169 for multiplexing the color difference signal, and a time-axis conversion memory 163. The input side terminals of the 3-1 selectors 165, 165 are supplied with an output signal of the vertical scanning line converter unit 162 through the color difference signal expansion circuit 166, an output signal of the vertical scanning converter 162 through one of the two line color difference signal memories 144, and an output signal of the vertical scanning line converter unit 162 through the two color difference signal line memories 144. The 2-1 selector $S_{14}$ for selecting the signal given from the output side terminals of the 3-1 selectors 165, 165 is controlled by the horizontal timing control circuit 167. The output side terminal of the 2-1 selector $S_{16}$ is connected to the memory 169, and the vertical scanning line converter unit 162 to the memory 168. The memories 168, 169 are connected to the input side terminal of the selector $S_{12}$, and the output side terminal of the 2-1 selector $S_{12}$ to the time-axis conversion memory 163. The 2-1 selector $S_{12}$ for selecting one of the memories 168 and 169 is controlled by the horizontal timing control circuit 167.

Now, the operation will be explained. FIG. 67 is a timing chart for explaining the operation. The color difference signal of the MUSE signal is multiplexed on time axis and specifically transmitted by being compressed to ¼ before the luminance signal. Therefore, the color difference signal is required to be expanded to four times after being received at the M-N converter. The conventional M-N converter in which the color difference signal is expanded by a fact, or of four for each color difference separately requires two time-axis expansion memories. The conventional M-N converter, as described above with reference to the embodiment 34 (claim 37), also requires two memories, one for time-axis conversion and the other for time-axis compression. According to the present embodiment, in order to obviate this problem, the color difference signal from the vertical scanning line converter unit 162 shown in the embodiments 27–33 is directly expanded, and therefore only one memory is required for the color difference signal expansion circuit. According to this embodiment, after adjusting the lines between the luminance signal and the color difference signal using two color difference signal line memories 144, the luminance signal and the color difference signals are expanded to ⅔ at the multiplexing memories 168, 169. After time-division multiplexing two luminance signals for each one color difference signal sequentially by the 2-1 selector, the multiplexed signal is taken to the time-axis conversion memory 68. As a result, the time-division multiplexing operation according to this embodiment is considered to simplify the subsequent circuits after time-axis conversion as it performs a part of the memory function for time-axis compression.

First, in the output signal of the vertical scanning line converter unit 162 shown in the embodiments 27–33, the color difference signal and the luminance signal are not matched in the number of lines, as shown in the timing chart at the top of FIG. 67. Only the color difference signal is first expanded by being written into an expansion memory. The expanded color difference signal is delayed by two lines at the line memory 144. The signals before and after this delay are switched to the same timing in accordance with the output signal of the control signal generator circuit 164 at the 3-1 selector 165, after which the color difference signals are time-division multiplexed by the output signal of the horizontal timing control circuit 167. The multiplexed color difference signal and the luminance signal, as shown in the middle portion of FIG. 67, are such that the B-Y and the R-luminance signals are arranged alternately at time intervals corresponding to the period of 32.4-MHz for the luminance signal and 16.2-MHz for the color difference signal, or one half of the luminance signal. The luminance signal and the color difference signal are expanded to ⅔ at the multiplexing memories 168, 169, and the resulting expanded signal is switched at the 2-1 selector $S_{12}$ for time-division multiplexing the luminance signal and the color difference signal. Then the timing chart shown at the bottom of FIG. 67 is obtained, so that two luminance signals are multiplexed with one color difference signal, other two luminance signals with another color difference signal, and so on. One cycle involves four luminance signals and one each of the difference signals as seen from the diagram. The color difference signal is expanded by a factor of four and registers with Y video signal in position. It is therefore possible to decode a multiplexed signal simply by extraction with a very simple circuit or easily by taking a timing after time-axis conversion. In the process, the color difference signal expansion is already complete, and therefore the circuit configuration can be simplified after time-axis conversion.

Figure 68:
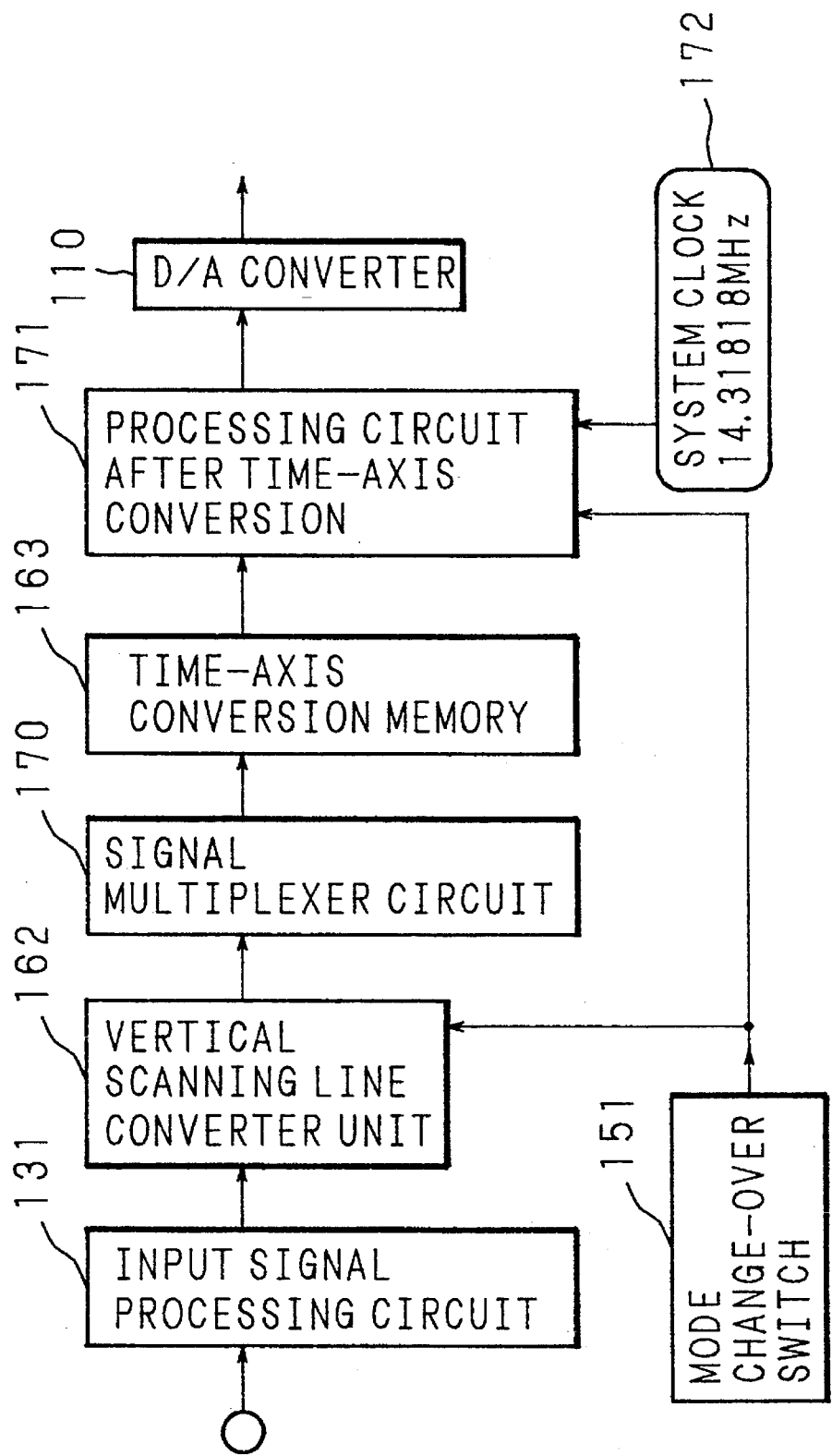
FIG. 68 is a block diagram showing a configuration of an M-N converter according to an embodiment 36 of the invention.

Embodiment 36:

Now, an embodiment 36 (claim 39) will be explained. FIG. 68 is a block diagram showing the configuration of an M-N converter according to this embodiment. The system according to this configuration comprises an input signal processing circuit 131, a vertical scanning line converter unit 162 shown in the embodiments 27–33, a signal multiplexer circuit 170 shown in the embodiments 34 and 35, a time-axis conversion memory 163, a processing circuit after time-axis conversion 171 including the image processing circuit, and a D/A converter 110 in that order. The output signal of the mode change-over switch 151 is given to the vertical scanning line converter unit 162 and the processing circuit after time-axis conversion 171. The output of the 14.31818-MHz (4 fsc) system clock 172 is supplied to the processing circuit after time-axis conversion 171.

Figure 70:
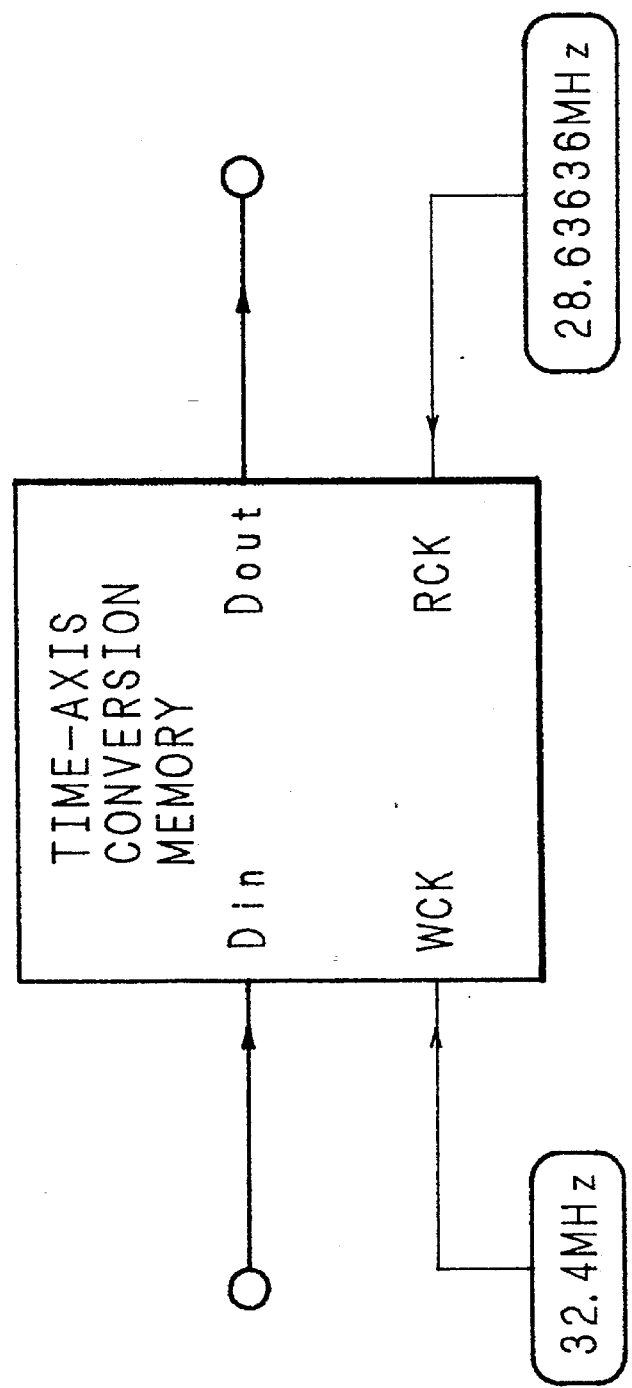
FIG. 70 is a block diagram showing a configuration of a time-axis conversion memory according to the embodiment 36.

FIG. 69 compares one frame of the MUSE signal with one frame of the NTSC signal after conversion. FIG. 70 is a diagram for explaining the time-axis conversion memory 163, and FIG. 71 for comparing the data with the one horizontal period on the read side of the time-axis conversion memory.

The vertical scanning line converter unit 162 shown in the embodiments 27–33 converts all the effective scanning lines of the MUSE signal into effective scanning lines of the NTSC signal after conversion in full mode, and compresses the vertical direction in wide mode on the assumption of full-mode conversion. As a result, the time-axis conversion (in horizontal direction) is required to be effected in such a manner as to secure the roundness including 12/11 of the MUSE signal. When calculations are made in horizontal direction in such a manner as to secure an effective aspect ratio of the NTSC signal in full or wide mode, the number of points for one horizontal line is 910 against 748 points of the effective horizontal data. In the case where the horizontal system frequency is increased to four times of the subcarrier of the NTSC chroma signal with 910 points and 525 lines, the vertical frequency is 59.94 Hz which fails to match with the vertical frequency 60 Hz of the MUSE signal. In this case, the problem is that the interlace is not maintained or the upper portion in vertical direction is distorted. In view of this, if the number of points for one horizontal line is rendered 909 and the system clock frequency four times of the subcarrier of the chroma signal of the NTSC signal, then the vertical frequency can be approximated infinitely to 60 Hz, thereby securing the interlace while eliminating the vertical upper curve. This manner is shown in FIG. 69. On the left is shown one frame of the MUSE signal, and on the right one frame after conversion. The one-frame conversion error is 0.01% which falls sufficiently in a practical range. Since the post-conversion system clock is selected at four times of the subcarrier of the NTSC chroma signal, it is equal to the system clock for digital processing at the NTSC monitor or a multiple of the subcarrier, and the system connection is satisfactory, thereby suppressing the interference due to the clock high frequency signal or the beat signal.

Figure 71:
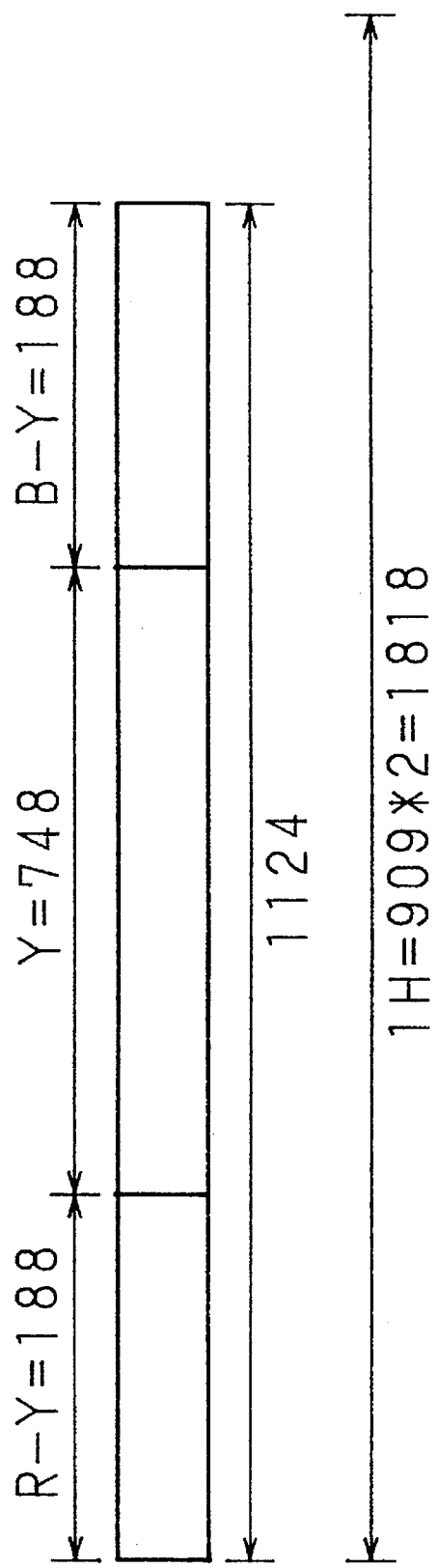
FIG. 71 is a timing chart for the embodiment 36.

Also, in view of the fact that the system clock is selected at a level four times of the subcarrier (hereinafter referred to as fsc) of the chroma signal of the NTSC signal, the reading of the data written in the time-axis conversion memory at 32.4-MHz by the signal multiplexer circuit 170 shown in the embodiments 34 and 35 requires the clock rate of 28.63636-MHz (8 fsc) which is twice of the frequency of 14.31818-MHz as shown in FIG. 70. The data of one horizontal data thus written, as shown at the top of FIG. 71, has 1124 points, which cannot be read with 909 points per horizontal period. Therefore, the clock is doubled, for example, to 1818 in horizontal direction for the purpose of reading, and the data thus read is converted to a system clock thereby to perform the time-axis conversion.

Figure 72:
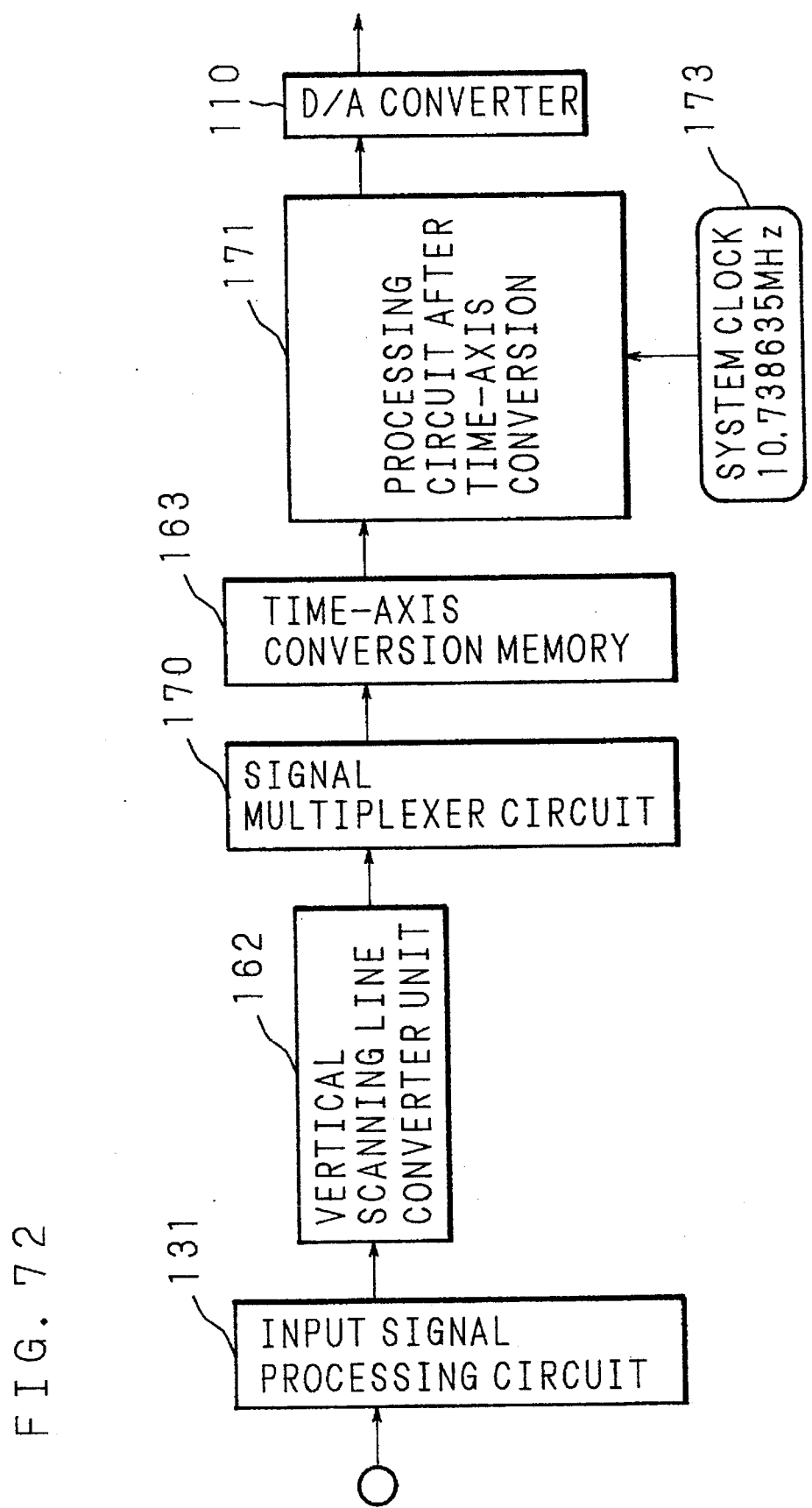
FIG. 72 is a block diagram showing a configuration of an M-N converter according to an embodiment 37 of the invention.

Embodiment 37:

Now, an embodiment 37 (claim 40) will be explained. FIG. 72 is a block diagram showing the configuration of an M-N converter according to this embodiment. The configuration according to this embodiment comprises an input signal processing circuit 131, a vertical scanning line converter unit 162 shown in the embodiments 27–33, a signal multiplexer circuit 170 shown in the embodiments 34 and 35, a time-axis conversion memory 163, a processing circuit after time-axis conversion 171 including an image processing circuit, and a D/A converter 110 arranged in that order. The output signal of the 10.738635-MHz (3 fsc) system clock 173 is supplied to the processing circuit after time-axis conversion 171.

Figure 73:
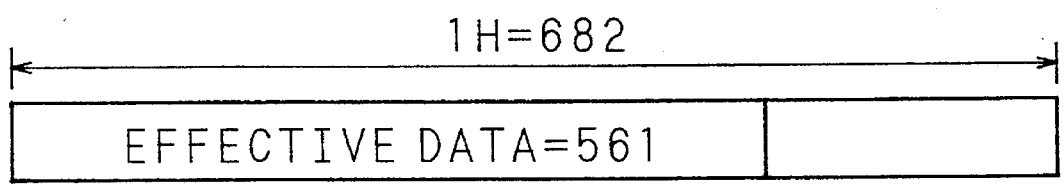
FIG. 73 is a timing chart for the embodiment 37.
Figure 74:
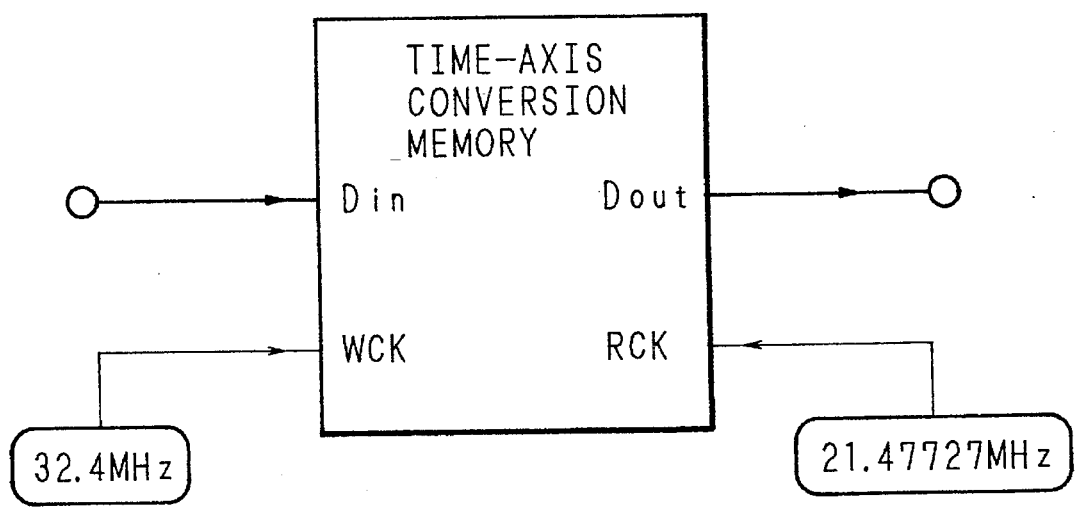
FIG. 74 is a block diagram showing a configuration of the time-axis conversion memory according to the embodiment 37.

Next, the operation will be explained. FIG. 73 is a diagram showing the total number of points and the number of effective points per horizontal period in zoom mode, and FIG. 74 a diagram for explaining the time-axis conversion memory 163 in zoom mode. In zoom mode, in view of the fact that the number of effective scanning lines of the MUSE signal has been converted to 483 (the effective number of total NTSC signal scanning lines) at the vertical scanning line converter unit 162 shown in the embodiments 27–33, the number must be increased by a factor of 4/3 in order to maintain the roundness on the 4:3 NTSC monitor. In the case where the total number of points for the horizontal direction is selected to be 909 in full or wide mode and the system frequency to be 14.31818-MHz as shown in the embodiment 36, the system clock is set to 3/4 times or 10.738635 MHz which is three times of that for the subcarrier of the chroma signal of NTSC format in zoom mode. In this case, as shown in FIG. 73, the total number of points for each horizontal period is 682 with an effective horizontal data of 561. This represents 3/4 of the points for the horizontal period in full or wide mode. In zoom mode, the effective data is 561 points, which is smaller than that For full or wide mode. The data therefore may be dropped off on one or both sides of horizontal period on write side of the time-axis conversion memory 163, while all the data are written as in full or wide mode and read out in a designated range. By so doing, all the data can be selected by the user even when the screen is stationary with the memory write operation stopped, for example. Also, the read clock of the time-axis conversion memory 163 is written in multiplex at the signal multiplexer circuit 170 shown in the embodiments 34 and 35. For the data of both the luminance signal and the two color difference signals to be read out during one horizontal period, therefore, clocks of twice the system clocks are required, i.e., clocks of 21.47727-MHz six times of that of the subcarrier of the NTSC chroma as shown in FIG. 74. In this way, since the system clocks are selected to a multiple of the subcarrier of NTSC chroma as in the embodiment 36, a superior coupling with the system is secured after M-N conversion, thereby suppressing the interference due to clock high harmonics or beat signals.

Figure 75:
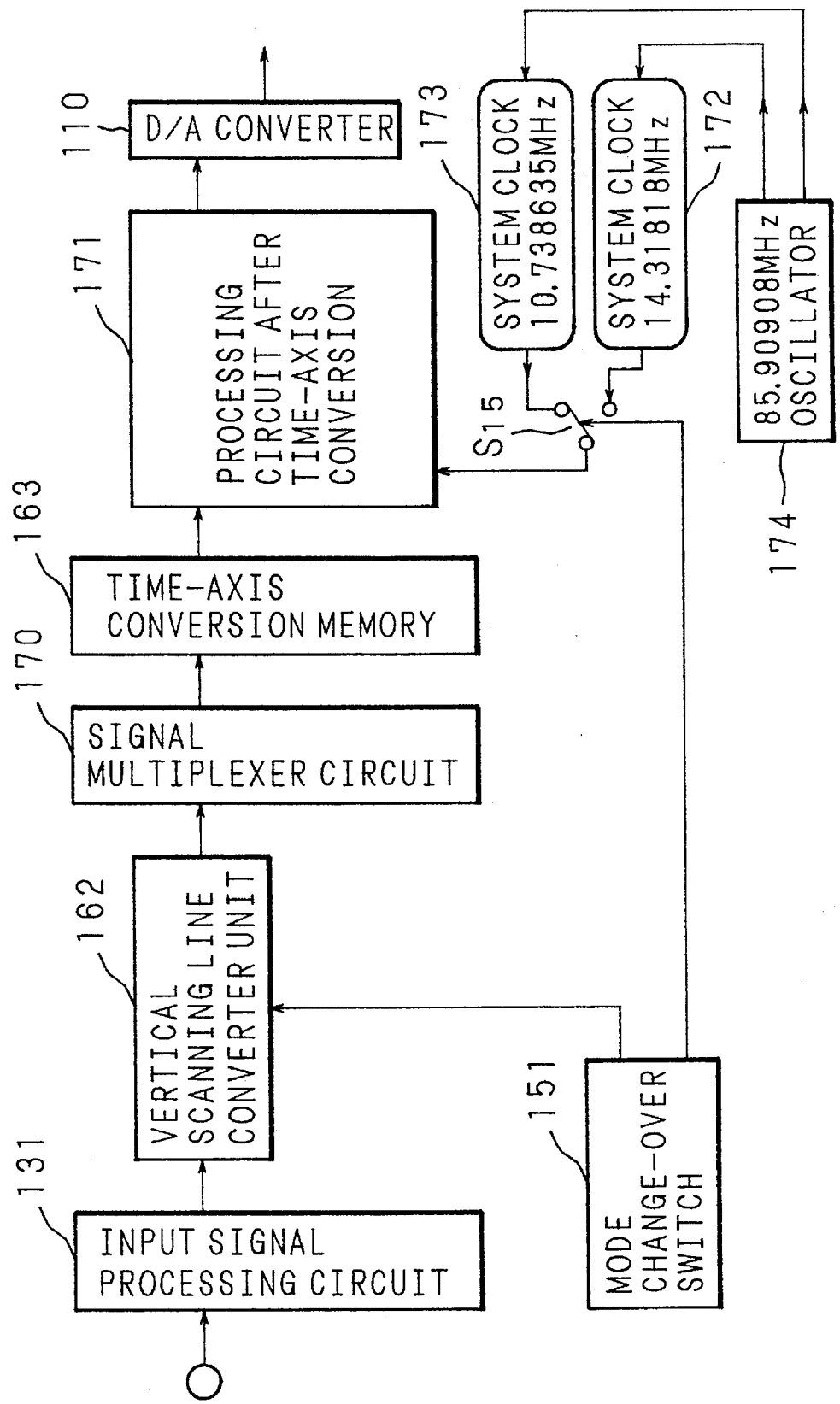
FIG. 75 is a block diagram showing a configuration of an M-N converter according to an embodiment 38 of the invention.

Embodiment 38:

Now, an embodiment 38 (claim 41) will be explained. FIG. 75 is a block diagram showing the configuration of an M-N converter according to this embodiment. This embodiment comprises an input signal processing circuit 131, a vertical scanning line converter unit 162 shown in the embodiments 27–33, a signal multiplexer circuit 170 shown in the embodiments 34 and 35, a time-axis conversion memory 163, a processing circuit after time-axis conversion 171 including an image processing circuit, and a D/A converter 110 arranged in that order. The embodiment further comprises an 85.90908-MHz (24 fsc) oscillator 174 for generating clocks after time-axis conversion, a 14.31818-MHz (3 fsc) system clock 172 after time-axis conversion supplied with the output signal of the 85.90908-MHz oscillator 174, and a 10.738635-MHz (3 fsc) system clock 173 after time-axis conversion. One of the output signals of these component parts is selected by a 2-1 selector $S_{15}$ and given to the processing circuit after time-axis conversion 171. A mode change-over switch 151 gives a control signal to the 2-1 selector $S_{15}$ and the vertical scanning line converter unit 162.

Figure 76:
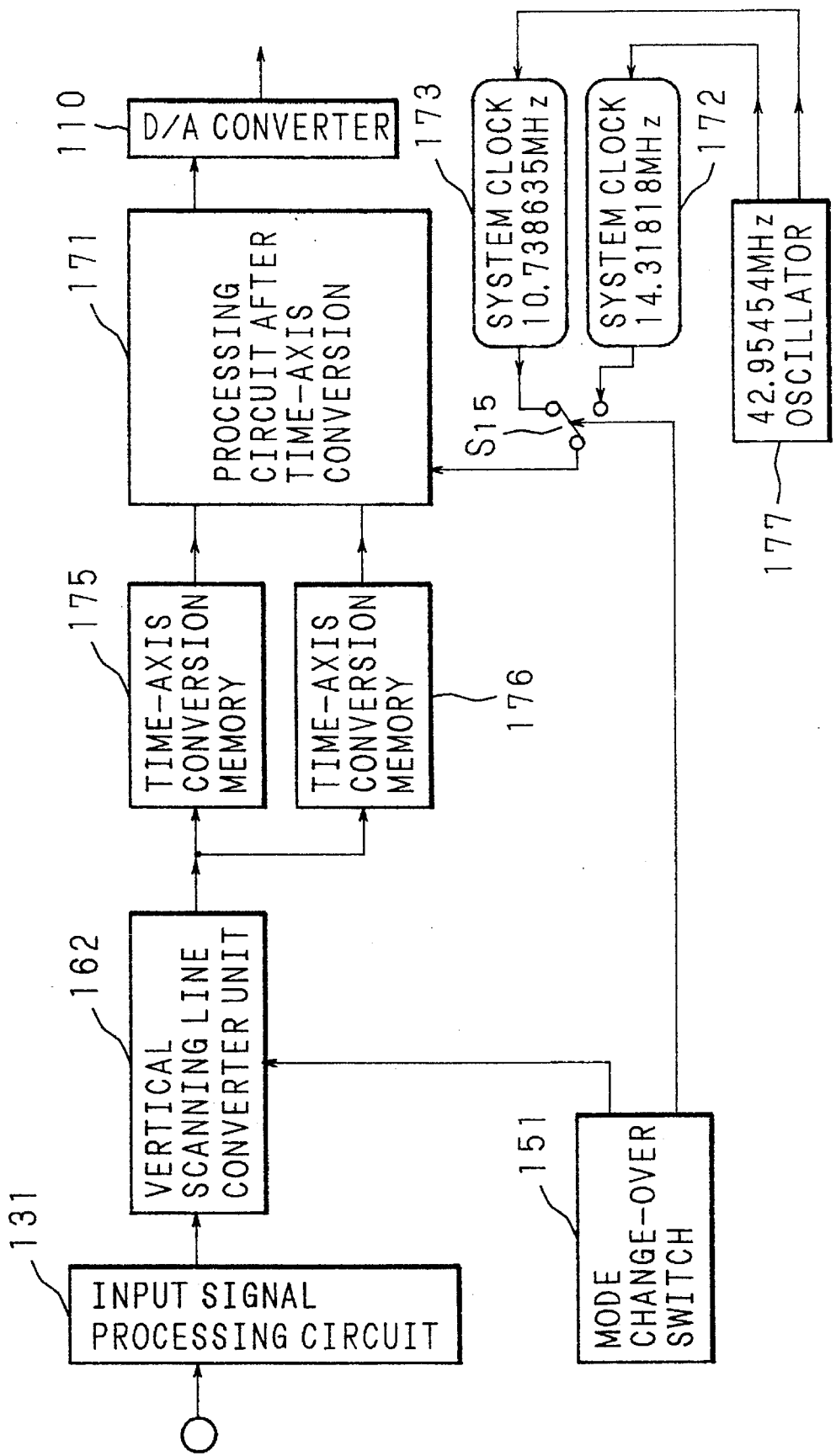
FIG. 76 is a block diagram showing another configuration of the M-N converter according to the embodiment 38.

FIG. 76 is a block diagram showing another example of the present embodiment. This embodiment lacks the multiplexer circuit 170 and the time-axis conversion memory 163 included in the configuration of FIG. 75, and further comprises a luminance signal time-axis conversion memory 175 and a color difference signal time-axis conversion memory 176 in parallel. Also, the 85.90908-MHz oscillator 174 is replaced by a 42.95454-MHz oscillator 177 as a clock generator after time-axis conversion.

Now, the operation will be explained. Different clocks are required in order to maintain the roundness in full, wide and zoom modes as explained with reference to the embodiments 36 and 37. In the conventional M-N converter, two system clocks are generated by an oscillator and switched to meet this requirement. According to this embodiment, clocks in a common multiple of the 14.31818-MHz (4 fsc) system clock for full and wide modes and the 10.738635 MHz (3 fsc) system clock for zoom mode shown in the embodiments 36 and 37 are oscillated by an oscillator and frequency-divided to provide a system clock. In the case shown in FIG. 75, the signal multiplexer circuit 170 shown in the embodiments 34 and 35 is used. As the read clocks for the time-axis memory, therefore, 28.63636-MHz (8 fsc) is required for full and wide modes, and 21.47727-MHz (6 fsc) for zoom mode. As a result, the minimum common multiple of the two, that is, 24 fsc or 85.90908-MHz is oscillated and frequency-divided to provide a system clock, so that the divided frequencies are switched or the frequency dividing ratio is switched according to the mode to provide a system clock. In the circuit blocks of FIG. 76, since the luminance signal time-axis conversion memory 175 and the color difference signal time-axis conversion memory 176 are used, the read clock for the time-axis memories is same as the system clock. Therefore, the frequency of 42.95454-MHz (12 fsc) which is the minimum common multiple of the two system clocks is oscillated by an oscillator and frequency-divided, so that, the divided frequencies are switched or the frequency-dividing ratio is changed to provide a system clock. Because of this configuration, only one oscillator suffices and the same can be said of the VCXO used for PLL applied on the MUSE signal clock of 32.4-MHz.

Figure 77:
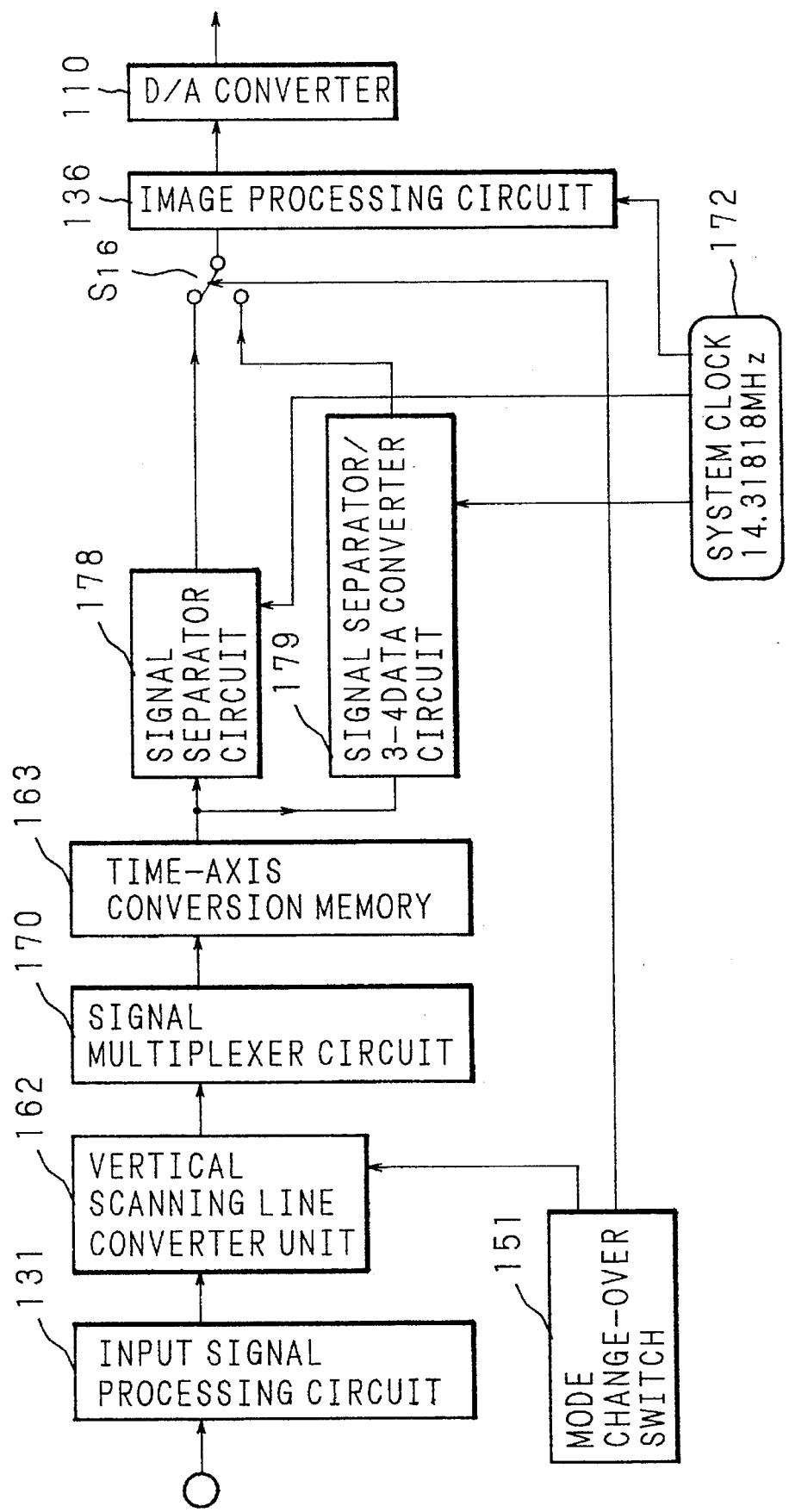
FIG. 77 is a block diagram showing a configuration of an M-N converter according to an embodiment 39 of the invention.

Embodiment 39:

An embodiment 39 (claim 42) will be explained. FIG. 77 is a block diagram showing the configuration of an M-N converter according to this embodiment. This embodiment comprises an input signal processing circuit 131 for subjecting the MUSE signal to input processings, a vertical scanning line converter unit 162 shown in the embodiments 27–33, a signal multiplexer circuit 170 shown in the embodiments 34 and 35, a time-axis conversion memory 163, a signal separator circuit 178 for separating the signal multiplexed by the signal multiplexer circuit 170 into the luminance signal and the color difference signal, a signal separator/3-4 data converter circuit 179 for separating the multiplexed signal and generating four data from the three data with the luminance signal and the color difference signal, an image processing circuit 136, a mode change-over switch 151, and a 14.31818-MHz (4 fsc) system clock 172 after time-axis conversion. The output signal of the time-axis conversion memory 163 is supplied to the signal separator circuit 178 and the signal separator/3-4 data converter circuit 179, the output signals of which are selectively supplied to the image processing circuit 136 through a 2-1 selector $S_{16}$. The output signal of the mode change-over switch 151 is supplied to the 2-1 selector $S_{16}$ and the vertical scanning line converter unit 162. The output signal of the 14.31818-MHz (4 fsc) system clock 172 is supplied to the signal separator 178, the signal separator/3-4 data converter 179 and the image processing circuit 136.

Figure 78:
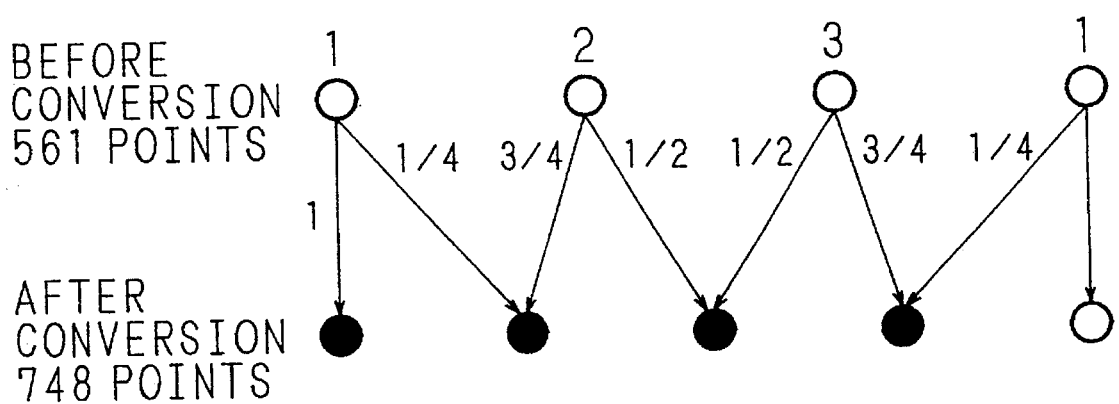
FIG. 78 shows a model of sampling points for 3–4 data conversion according to the embodiment 39.

Now, the operation will be explained. FIG. 78 shows a model of sampling points for explaining the operation of the 3-4 data converter circuit. In the conventional M-N converter, the system clock after time-axis conversion is switched among operations in full, wide mode and zoom mode. According to the present embodiment, in order to solve this inconvenience, the signal is processed differently among full, wide and zoom modes. Especially in zoom mode, three data are linearly interpolated at adjacent several points thereby to generate four data and thus unify the system clock by horizontal expansion. The input signal is processed at the input signal processing circuit 131, the scanning lines are converted at the vertical scanning line converter unit 162 according to the particular mode and the resulting data is written in the time-axis conversion memory 163. In full or wide mode, the signal is separated into the luminance signal and the color difference signal by the signal separator 178 operated in accordance with the 14.31818-MHz (4 fsc) system clock 172. In zoom mode, on the other hand, the signal is passed through another route and processed by the signal separator/3-4 data converter circuit 179. This 3-4 data converter circuit 179, as shown in FIG. 78, generates 748 points of data by linear interpolation frm 561 points of zoom-mode data read from the time-axis conversion memory 163 for the luminance signal Y, for example. In zoom mode, horizontal multiplication by a factor of 4⁄3 is required for maintaining the roundness as described above with reference to the embodiment 37. For this reason, according to the conventional system, the system clock is multiplied by ¾ and expanded horizontally, whereas according to the present embodiment, three data are linearly interpolated at adjacent several points into four data and the horizontal length is increased by 4⁄3 to maintain the roundness. The mode change can be performed by appropriately switching the outputs of the signal separator/3-4 data converter circuit 179 and the signal separator circuit 178 according to the particular mode, thereby making it possible to operate the system with a single clock. This configuration requires a single system clock of 14.31818-MHz (4 fsc) with a single oscillator. This, together with the fact that the system clock is single and four times of the chroma signal subcarrier frequency, permits a satisfactory system matching with the NTSC signal processing stages connected next, to the M-N converter. Thus digital coupling is facilitated while at the same time suppressing interferences.

Also, apart from the method as shown in FIG. 78 in which four-point data are generated from 3-point data by the simplest, linear interpolation between two points, the use of more points with a complicated coefficient for linear interpolation will prevent the degradation of frequency characteristics which otherwise might occur due to the linear interpolation. According to the embodiment under consideration, the three modes including full, wide and zoom are handled with a single system clock, and therefore the 3-4 data conversion is involved for zoom mode. In a method for expanding by about 8⁄7 horizontally, however, the horizontal expansion can be realized by a single system clock when the linear interpolation circuit is so changed as to generate eight from seven data.

Figure 79:
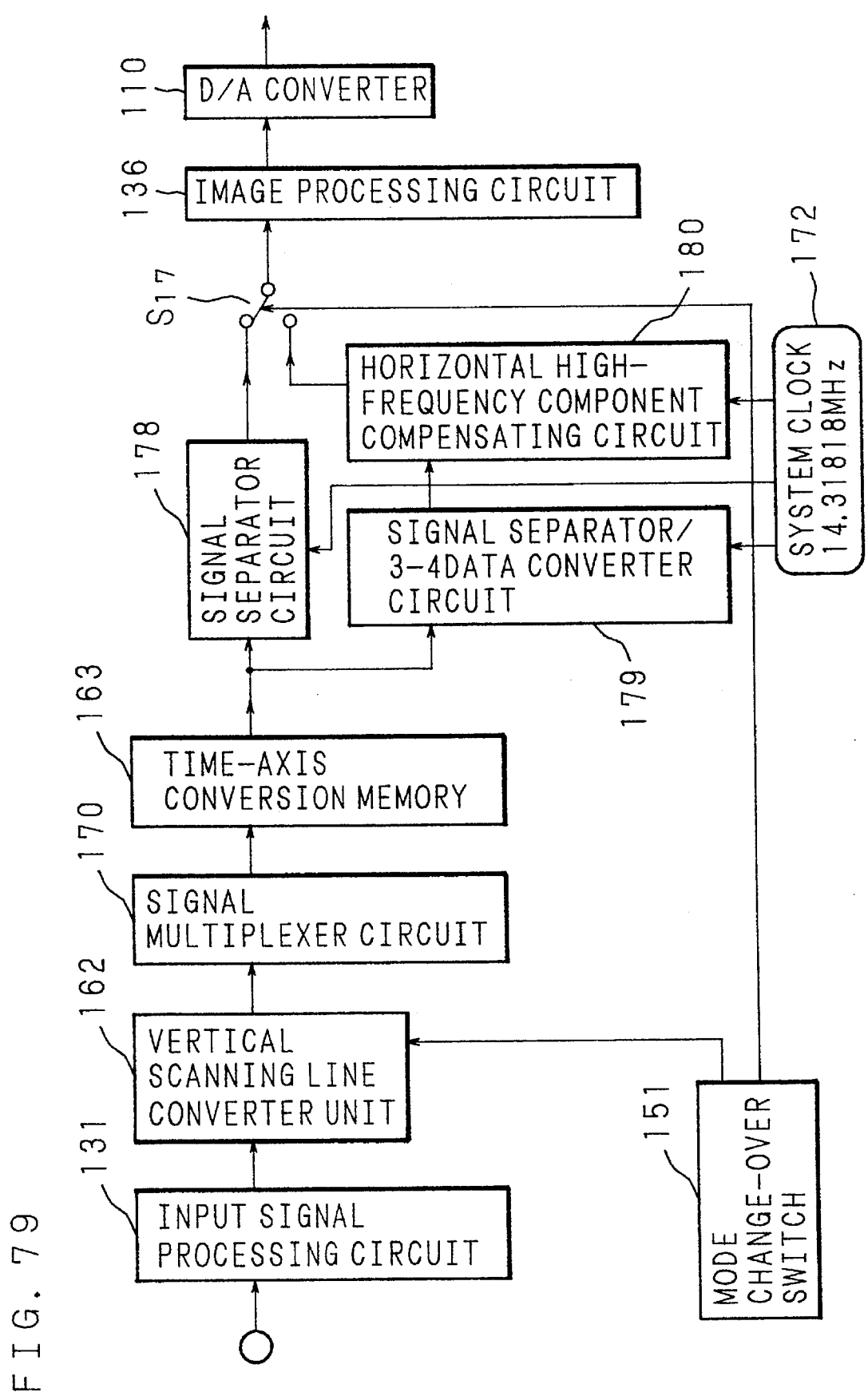
FIG. 79 is a block diagram showing a configuration of an M-N converter according to an embodiment 40 of the invention.

Embodiment 40:

Now, an embodiment 40 (claim 43) will be explained. FIG. 79 is a block diagram showing the configuration of an M-N converter according to this embodiment. This embodiment Further comprises a horizontal high-frequency component compensator circuit 180 added in series with the signal separator/3-4 data converter circuit 179 in the block diagram of FIG. 77 according to the embodiment 39.

The operation of this embodiment will be explained. In the method according to the embodiment 39 where three data are linearly interpolated to generate four data by the signal separator/3-4 data converter circuit and the roundness is thus maintained by horizontal expansion with a single system clock in zoom mode as described above, the horizontal frequency characteristic is deteriorated at the time of linear interpolation of three data. A method is available for compensating for this disadvantage by linear interpolation using a complicated coefficient at a multiplicity of points. This method, however, has the disadvantage of an increased circuit size. This disadvantage is overcome by adopting a method of very simple linear interpolation as shown in FIG. 78 of the embodiment 39 in which the 3-4 data conversion is performed by linear interpolation between two points with a horizontal high-frequency component compensator circuit 180 inserted in series. This configuration permits the high-frequency component compensation with complicated linear interpolation to be replaced by a simple high-frequency component compensator circuit, with a simple linear interpolation, thereby preventing the circuit from increasing in size. Unlike in the block configuration according to this embodiment having an independent horizontal high-frequency component compensator circuit, the contour correction circuit of the image processing circuit 136 connected in the subsequent stage can double as a horizontal high-frequency component compensator circuit with equal effect. In this case, the requirement for high-frequency component compensation in zoom mode can be met by differentiating the gain of contour correction from those for the other modes (full and wide).

Figure 80:
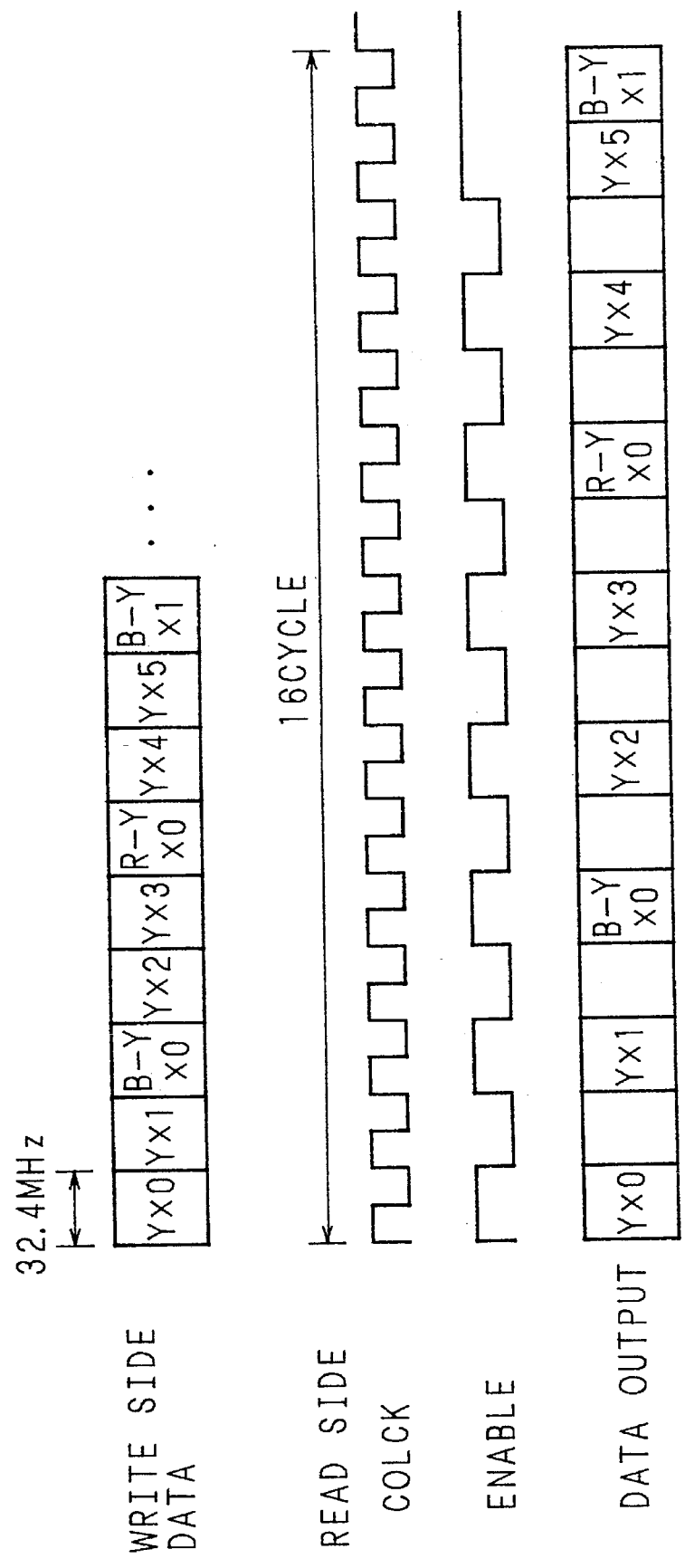
FIG. 80 is a timing chart according to an embodiment 41 of the invention.

Embodiment 41:

An embodiment 41 (claim 44) will be explained. According to this embodiment, the signal multiplexer circuit 170 is configured as shown in FIG. 66. FIG. 80 is a timing chart for explaining the embodiment.

In the case where a single system clock after time-axis conversion is used with the 3-4 data converter circuit 179 shown according to the embodiment 39 in zoom mode, the time-axis conversion memory 163 requires 681 points of effective data for each horizontal period. For this to be realized in the simplest fashion, 681 out of 748 points of effective data per horizontal period are written as an input to the time-axis conversion memory 163, from which three data are read while leaving one data not read. This method can be realized when writing into the time-axis conversion memory 163 after multiplexing by the signal multiplexer circuit 170 shown in the embodiment 34. In this method, however, the position for zoom mode cannot be changed when the screen is inhibited from write operation and set in stationary state. According to this embodiment, in order to solve these problems, all horizontal data are written in the time-axis conversion memory through the multiplexer circuit shown in the embodiment 35, and in the read operation, nine data are read out in 681 points in 16 cycles as shown in the timing chart of FIG. 80, while extraneous data are collectively read out during the blanking period. In this way, the read position is changed in horizontal direction even during stationary state, thereby making the output range in zoom mode variable. The operation of reading out nine data in 16 cycles can be easily performed by controlling the read enable of the time-axis conversion memory 163 as shown in the timing chart of FIG. 80.

Figure 81:
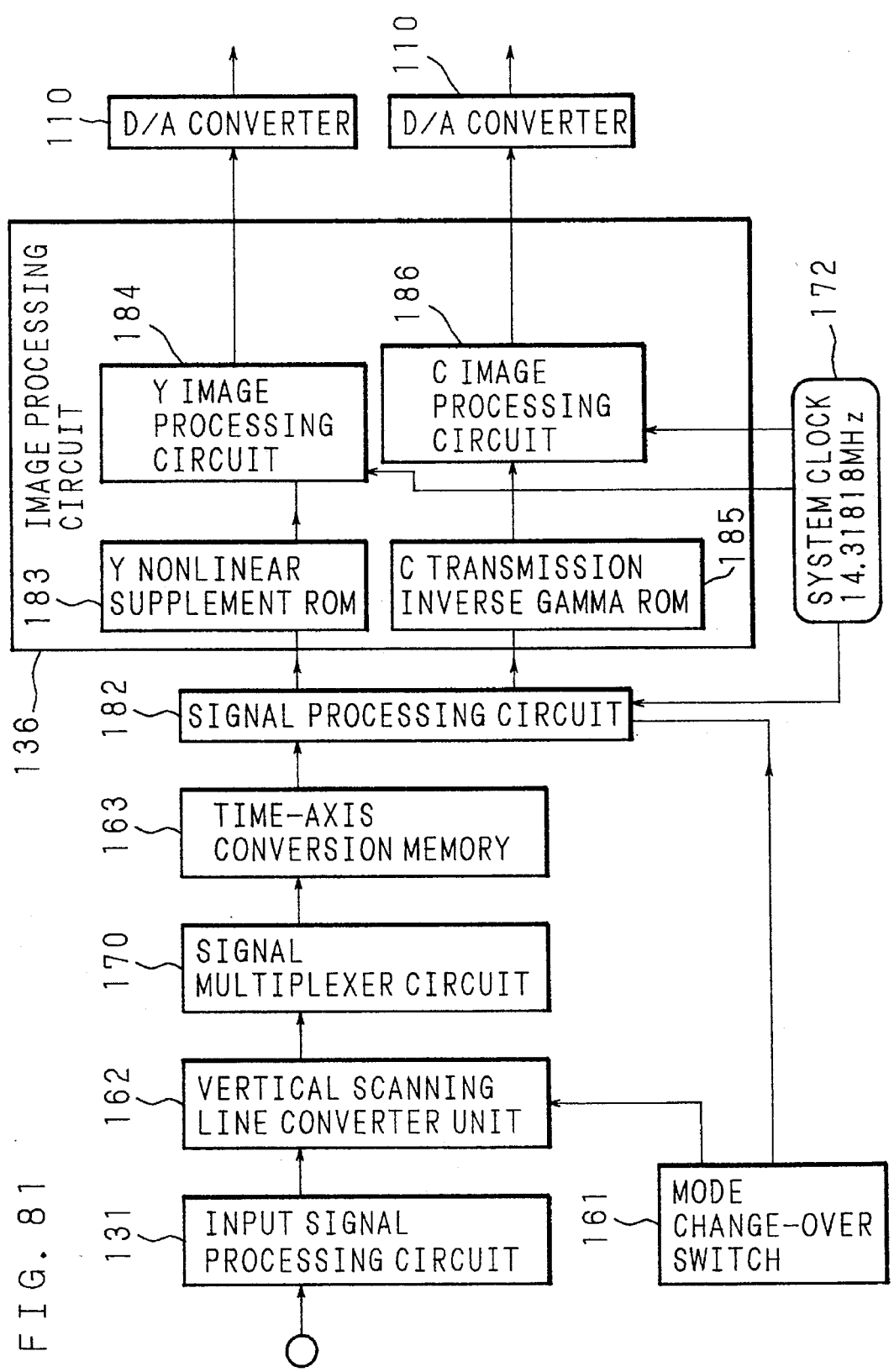
FIG. 81 is a block diagram showing a configuration of an M-N converter according to an embodiment 42 of the invention.

Embodiment 42:

Now, an embodiment 42 (claim 45) will be explained. FIG. 81 is a block diagram showing the configuration of an M-N converter according to the present embodiment. This embodiment comprises an input signal processing circuit 131 for subjecting the MUSE signal to input processings, a vertical scanning line converter unit 162 shown in the embodiments 27–33, a signal multiplexer circuit 170 shown in the embodiments 34 and 35, a time-axis conversion memory 163, a signal processing circuit 182 for processing the output of the time-axis conversion memory shown in the embodiments 36–41, an image processing circuit 136 and D/A converters 110, 110.

The image processing circuit 136 includes a nonlinear correction ROM 183 for improving the linearity of the luminance signal supplied from the signal processing circuit 182, a Y image processing circuit 184 for contour correction, blanking and other processing of the luminance signal outputted from the nonlinear correction ROM 183, a transmission inverse gamma correction ROM 185 for subjecting the color difference signal from the signal processing circuit 182 to inverse gamma operation, and a color difference signal image processing circuit 186 for performing such processings as blanking and contour correction of the color difference signal supplied from the transmission inverse gamma correction ROM 185. The signal outputted from the mode change-over switch 151 is given to the vertical scanning line converter unit 162 and the signal processing circuit 182. Further, the clock signal outputted from the system clock of 14.31818-MHz (4 fsc) system clock 172 which is a system clock after time-axis conversion is supplied to the signal processing circuit 182, the Y image processing circuit 184 and the color difference signal image processing circuit 186.

The operation of this embodiment will be explained. In the conventional M-N converter, the MUSE signal has a substantially linear characteristic as the inverse gamma and transmission gamma of the camera are approximated in characteristics, and therefore the transmission inverse gamma and the display gamma are not employed for reducing the circuit size. The transmission inverse gamma for the color difference signal, on one hand, for its theoretical simplicity and effect, is sometimes introduced with a ROM and an arithmetic circuit. (Reference: "MUSE High Definition TV Transmission System", compiled by The Institute of Electronics, Information and Communication Engineers). With regard to the luminance signal, however, the signal is required to be subjected to display gamma by returning to R, G, B after transmission inverse gamma. The reconversion of the R, G, B signals to the luminance signal or the color difference signal is not in current practice as it increases the circuit size and thereby deteriorates the Y gradation characteristics by the amount equivalent to the difference of inverse gamma and transmission gamma at the transmitting side. The embodiment under consideration, in order to obviate this problem, is intended to improve the gradation characteristic of the luminance signal by generating a characteristic approximated by the transmission inverse gamma and display gamma of the luminance signal through the ROM or the arithmetic circuit and applying it to the luminance signal. As shown in FIG. 81, the Y nonlinear correction ROM approximated with the Y transmission inverse gamma and the display gamma calculated in advance is inserted in the Y output of the signal processing circuit 82 after time-axis conversion thereby to improve the gradation characteristic of the luminance signal. Since a theoretically accurate ROM cannot be fabricated, the Y linearity is consciously changed and a nonlinear characteristic having a visual effect on the screen is generated to be usable by switching. The above-mentioned configuration makes it possible to improve the gradation characteristic of the luminance signal simply by increasing the circuit size to some degree.

As this invention may be embodied in several forms without departing from the spirit of essential characteristics thereof, the present invention is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image reproduction apparatus comprising:

means for receiving a television signal;

first linear interpolation means for converting a sampling frequency of said television signal from a first frequency to a second frequency;

second linear interpolation means for performing interfield interpolation of said television signal at a third frequency; and third linear interpolation means for converting the sampling frequency of said television signal from the third frequency to the first frequency;

wherein operations of said first, second, and third linear interpolation means are performed collectively or sequentially thereby to effect the interfield interpolation at said first frequency between signals one field apart from each other.

2. An image reproduction apparatus comprising:

means for receiving a television signal;

first linear interpolation means for converting a sampling frequency of said television signal from a first frequency to a second frequency;

second linear interpolation means for performing interfield interpolation of said television signal at a third frequency; and zeroth-order holding means for converting the sampling frequency of said television signal from the third frequency to the first frequency;

wherein operations of said first and second linear interpolation means and said zeroth-order holding means are performed collectively or sequentially, thereby performing the interfield interpolation at said first frequency between signals one field apart from each other.

3. An image reproduction apparatus comprising:

means for receiving a television signal;

first zeroth-order holding means for converting a sampling frequency of said television signal from a first frequency to a second frequency;

linear interpolation means for performing interfield interpolation of said television signal at a third frequency; and second zeroth-order holding means for converting the sampling frequency of said television signal from the third frequency to the first frequency;

wherein operations of said first and second zeroth-order holding means and said linear interpolation means are performed collectively or sequentially thereby to perform the interfield interpolation at said first frequency between signals one field apart from each other.

4. The image reproduction apparatus of claim 3, further comprising:

two-dimensional interpolation means for performing two-dimensional interpolation of said television signal, a signal obtained by delaying the television signal by one field and a signal obtained by delaying said television signal by one frame;

decision means for deciding whether an aliasing component represents a field or a frame from the two-dimensional interpolation of said television signal by said two-dimensional interpolation means;

control signal generator means for generating a control signal in accordance with a result obtained by said decision means; and mixing means for mixing the interframe-interpolated signal and said first-frequency interfield-interpolated signal adaptively based on the control signal output from said control signal generator means after processing by said linear interpolation means and said first and second zeroth-order holding means.

5. The image reproduction apparatus of claim 1, further comprising:

two-dimensional interpolation means for performing two-dimensional interpolation of said television signal, a signal obtained by delaying the television signal by one field and a signal obtained by delaying said television signal by one frame;

decision means for deciding whether an aliasing component represents a field or a frame from the two-dimensional interpolation of said television signal by said two-dimensional interpolation means;

control signal generator means for generating a control signal in accordance with a result obtained by said decision means; and mixing means for mixing the interframe-interpolated signal and said first-frequency interfield-interpolated signal adaptively based on the control signal output from said control signal generator means after processing by said first, second and third linear interpolation means.

6. A image reproduction apparatus comprising:

means for receiving a high definition TV signal of MUSE format;

linear interpolation means for linearly-interpolating said high definition TV signal with a plurality of lines;

vertical scanning line conversion means for converting a number of vertical scanning lines with said plurality of lines to convert the MUSE-format high definition TV signal to an NTSC-format signal;

scanning period setting means for setting a scanning period used for said vertical scanning line conversion means;

coefficient generator means for generating a coefficient used by said vertical scanning line conversion means; and coefficient changing means for changing the coefficient generated by said coefficient generator means for each line of the scanning period set by said scanning period setting means.

7. The image reproduction apparatus of claim 6, wherein:

said scanning period setting means sets the scanning period for a luminance signal and for a color difference signal, and said coefficient generator means generates a coefficient for the luminance signal and a coefficient for the color difference signal.

8. The image reproduction apparatus of claim 6, wherein:

said scanning line period setting means sets the number of scanning lines after conversion to the power of 2 and sets the scanning period for the luminance signal such that the scanning period before conversion is equal to an odd number greater than twice a number of scanning lines after conversion, and said coefficient generator means generates a fraction having a numerator of a power of 2 as the coefficient for the luminance signal.

9. The image reproduction apparatus of claim 8, wherein:

said scanning period setting means sets the scanning period for the color difference signal to a level twice of the scanning period for the luminance signal, and said coefficient generator means generates the coefficient for the color difference signal which is one half of the coefficient for the luminance signal.

10. The image reproduction apparatus of claim 6, wherein:

said scanning period setting means sets a plurality of scanning periods for the luminance signal; and said coefficient generator means generates a plurality of coefficients for the luminance signal, said apparatus further comprising:

switching means for switching the plurality of scanning periods for the luminance signal and the plurality of coefficients for the luminance signal.

11. The image reproduction apparatus of claim 10, wherein:

said switching means switches said scanning periods and said coefficients at a timing associated with a boundary between the luminance signal and the color difference signal on a time axis in a horizontal direction.

12. The image reproduction apparatus of claim 10, wherein:

said scanning period setting means sets the scanning period such that the number of scanning lines after conversion is a power of 2 for both the luminance signal and the color difference signal, and said coefficient generator means generates a fraction having a numerator of the power of 2 as the coefficient.

13. The image reproduction apparatus of claim 6, wherein:

said coefficient changing means changes, for each field, a combination of either odd-numbered multiples or even-numbered multiples of a value of one half of a minimum value of the coefficient to be set.

14. The image reproduction apparatus of claim 6, further comprising:

a plurality of line memories for the color difference signal inserted after said vertical scanning line conversion means; and a time-axis conversion memory for writing the color difference signal in a predetermined sequence before and after the luminance signal on the same line.

15. The image reproduction apparatus of claim according to 6, further comprising:

a time-axis expansion circuit for expanding a time axis of the color difference signal inserted after said vertical scanning line conversion means;

a plurality of line memories for the color difference signal for delaying the color difference signal by one scanning line;

means for converting the color difference signal on the same time axis as that for the luminance signal by said time-axis expansion circuit;

means for rearranging a plurality of color difference signals;

a time-division multiplexing memory for multiplexing the luminance signal;

a time-division multiplexing memory for multiplexing the color difference signal; and means for rearranging the signals in said two time-division multiplexing memories in a predetermined sequence in combinations of two luminance signals and one color difference signal.

16. The image reproduction apparatus of claim 6, further comprising:

means for setting a horizontal frequency of the NTSC signal at 14.31818-MHz (4 fsc) after conversion by said vertical scanning line conversion means;

means for setting one horizontal scanning period to 909 points; and means for approximating a field frequency to 60 Hz, wherein:

said means for setting; means for setting and said means for approximating convert the number of scanning lines to a level adapted to monitors having an aspect ratio of 16:9 and 4:3.

17. The image reproduction apparatus of claim 6, further comprising:

means for setting a horizontal frequency of the NTSC signal to 10.738635-MHz (3 fsc) after conversion by said vertical scanning line conversion means;

means for setting one horizontal scanning period to 682 points; and means for approximating a field frequency to 60 Hz, wherein:

said means for setting, means for setting, and said means for approximating convert the number of scanning lines of the MUSE signal entirely in a vertical direction to the number of scanning lines adapted to a monitor having an aspect ratio of 4:3.

18. The image reproduction apparatus of claim 14, further comprising:

an oscillator for oscillating a clock signal of a frequency for reading data from said time-axis conversion memory;

a plurality of system clocks for generating a clock signal of a frequency which is a minimum common multiple of frequencies of said oscillator; and means for switching between said plurality system clocks according to a conversion rate of said vertical scanning line conversion means.

19. The image reproduction apparatus of claim 16, further comprising:

data conversion means for converting three-point data of the luminance signal and the color difference signal to four points by linear interpolation of several adjacent points in order to set the horizontal effective points to 748 and approximate the field frequency to 60 Hz.

20. The image reproduction apparatus of claim 19, further comprising:

means for compensating for the horizontal high-frequency component after conversion by said data conversion means.

21. The image reproduction apparatus of claim 15, further comprising:

means for producing a read enable signal for the time-axis conversion memory in order to read out nine data in 16 cycles where the data in said time-axis conversion memory are written in a predetermined sequence in combinations of two luminance signals and one color difference signal.

22. The image reproduction apparatus of claim 2, further comprising:

two-dimensional interpolation means for performing two-dimensional interpolation of said television signal, a signal obtained by delaying the television signal by one field and a signal obtained by delaying said television signal by one frame;

decision means for deciding whether an aliasing component represents a field or a frame from the two-dimensional interpolation of said television signal by said two-dimensional interpolation means;

control signal generator means for generating a control signal in accordance with a result obtained by said decision means; and mixing means for mixing the interframe-interpolated signal and said first-frequency interfield-interpolated signal adaptively based on the control signal output from said control signal generator means after processing by said first and second linear interpolation means and said zeroth-order holding means.

* * * * *